US012683382B2

(12) United States Patent (10) Patent No.: US 12,683,382 B2

Dellaripa (45) Date of Patent: Jul. 14, 2026

(54) VEHICLE BATTERY PROTECTION DEVICE, AND METHOD FOR THERMAL MANAGEMENT OF SAME

(71) Applicant: Clarity Development LLC, Los Angeles, CA (US)

(72) Inventor: Brian Thomas Dellaripa, Los Angeles, CA (US)

(73) Assignee: Clarity Development LLC, Los Angeles, CA (US)

( * ) Notice: Subject to any disclaimer, the term of this patent is extended or adjusted under 35 U.S.C. 154(b) by 0 days.

(21) Appl. No.: 19/121,732

(22) PCT Filed: Aug. 28, 2024

(86) PCT No.: PCT/US2024/044146

§ 371 (c)(1),
(2) Date: Apr. 16, 2025

(87) PCT Pub. No.: WO2025/049546

PCT Pub. Date: Mar. 6, 2025

(65) Prior Publication Data

US 2026/0112882 A1 Apr. 23, 2026

Related U.S. Application Data

(60) Provisional application No. 63/593,862, filed on Oct. 27, 2023, provisional application No. 63/535,279, filed on Aug. 29, 2023.

(51) Int. Cl.
*B60L 58/13* (2019.01)
*B60L 58/24* (2019.01)
(Continued)

(52) U.S. Cl.
CPC ........... *H02H 5/047* (2013.01); *B60R 16/033* (2013.01); *H01M 10/425* (2013.01);
(Continued)

(58) Field of Classification Search
CPC ........ H02H 5/047; H02H 3/08; B60R 16/033; H01M 10/425; H01M 10/488; H01M 50/581; H01M 2220/20
(Continued)

(56) References Cited

U.S. PATENT DOCUMENTS

| | | | |
|---|---|---|---|
| 5,140,250 | A | 8/1992 | Morland |
| 5,691,619 | A | 11/1997 | Vingsbo |
| 6,320,351 | B1 | 11/2001 | Ng et al. |
| 7,129,598 | B2 | 10/2006 | Wagner et al. |

(Continued)

FOREIGN PATENT DOCUMENTS

JP 2013195183 A 9/2013

*Primary Examiner* — Elim Ortiz
(74) *Attorney, Agent, or Firm* — Lance M. Pritikin

(57) ABSTRACT

A vehicle battery protection device for preserving the charge of the vehicle battery is electrically connectable between a vehicle battery and a vehicle electrical system. The device includes a solid-state switch commandable between an on state and an off state. A thermal safety algorithm executable by the device may include a switch derating process, a thermal analysis calibration, a vehicle profile function, and a data reconciliation function. The device employs hardware and software solutions to reduce the risk of thermal runaways and component failures in the device, while maximizing its useful operating envelope. The software solutions may include predicting future thermal loads for the device based on vehicle usage patterns specific to the vehicle within which the device is installed. Those predictions may be used to generate risk datasets which influence whether and to what extent thermal mitigation measures will be employed by the device at any point in time.

34 Claims, 43 Drawing Sheets

(51) Int. Cl.

| | |
|---|---|
| *B60R 16/033* | (2006.01) |
| *H01M 10/42* | (2006.01) |
| *H01M 10/48* | (2006.01) |
| *H01M 50/581* | (2021.01) |
| *H02H 3/08* | (2006.01) |
| *H02H 5/04* | (2006.01) |

(52) U.S. Cl.
CPC ....... *H01M 10/488* (2013.01); *H01M 50/581* (2021.01); *H02H 3/08* (2013.01); *H01M 2220/20* (2013.01)

(58) Field of Classification Search
USPC .............. 307/9.1, 10.1; 361/103, 104, 93.1; 320/136, 150; 429/99, 90, 61, 120, 163, 429/62, 7
See application file for complete search history.

(56) References Cited

U.S. PATENT DOCUMENTS

| | | | |
|---|---|---|---|
| 7,460,344 | B2 | 12/2008 | Hastings et al. |
| 7,508,091 | B2 | 3/2009 | Binder |
| 7,821,227 | B2 | 10/2010 | Howell et al. |
| 8,473,114 | B2 | 6/2013 | Bauerle et al. |
| 9,393,920 | B2 | 7/2016 | Hosey et al. |
| 9,849,850 | B2 | 12/2017 | Iwai |
| 10,035,517 | B2 | 7/2018 | Lovett et al. |
| 10,112,502 | B2 | 10/2018 | Buckhout |
| 10,170,804 | B2 | 1/2019 | Kawauchi et al. |
| 2009/0147427 | A1 | 6/2009 | Levinas et al. |
| 2011/0178654 | A1 | 7/2011 | Bauerle et al. |
| 2015/0358013 | A1* | 12/2015 | Sakai ...................... H03K 17/14 327/109 |
| 2018/0167013 | A1 | 6/2018 | Xu et al. |
| 2021/0384753 | A1 | 12/2021 | Kozuma et al. |
| 2022/0111751 | A1* | 4/2022 | Kim ........................ B60L 53/63 |
| 2022/0200319 | A1* | 6/2022 | Öhman ................... B60L 58/10 |
| 2023/0226915 | A1* | 7/2023 | Alvi ...................... B60L 3/0046 307/10.7 |

* cited by examiner

Hardware Architecture  Block Diagram

Hardware Architecture Block Diagram

----- Dashed Line Signifies Possible Feature

Hardware Architecture Block Diagram

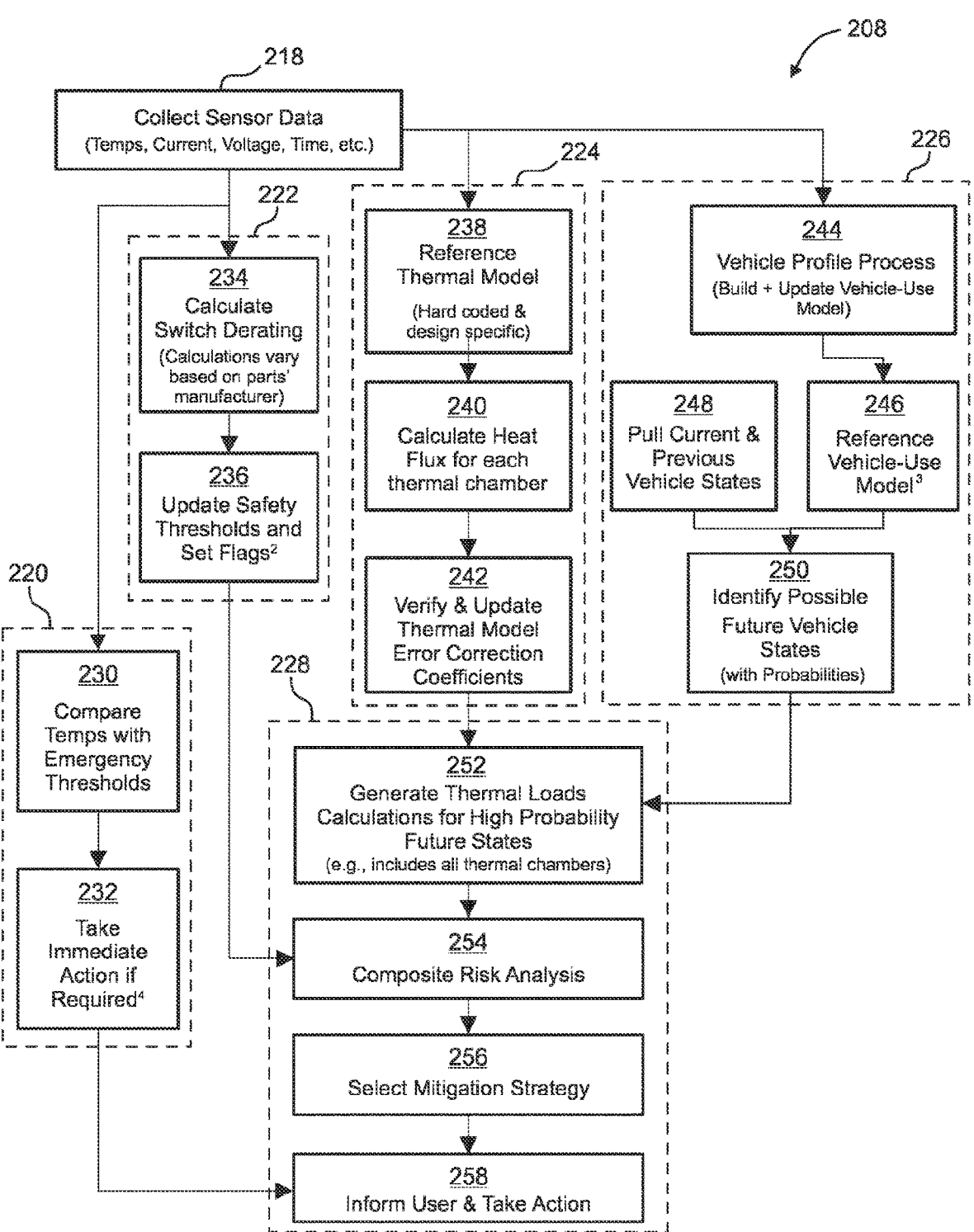

218
Collect Sensor Data
(Temps, Current, Voltage, Time, etc.)

208

226

224

222

234
Calculate
Switch Derating
(Calculations vary
based on parts'
manufacturer)

236
Update Safety
Thresholds and
Set Flags²

238
Reference
Thermal Model
(Hard coded &
design specific)

240
Calculate Heat
Flux for each
thermal chamber

242
Verify & Update
Thermal Model
Error Correction
Coefficients

244
Vehicle Profile Process
(Build + Update Vehicle-Use
Model)

248
Pull Current &
Previous
Vehicle States

246
Reference
Vehicle-Use
Model³

250
Identify Possible
Future Vehicle
States
(with Probabilities)

220

230
Compare
Temps with
Emergency
Thresholds

232
Take
Immediate
Action if
Required⁴

228

252
Generate Thermal Loads
Calculations for High Probability
Future States
(e.g., includes all thermal chambers)

254
Composite Risk Analysis

256
Select Mitigation Strategy

258
Inform User & Take Action

² Electrical Management System manages over-current scenarios
³ Vehicle-Use Model is derived from trend and pattern analysis of vehicle time series database
⁴ Thermal Safety Algorithm should result in this step being rarely required

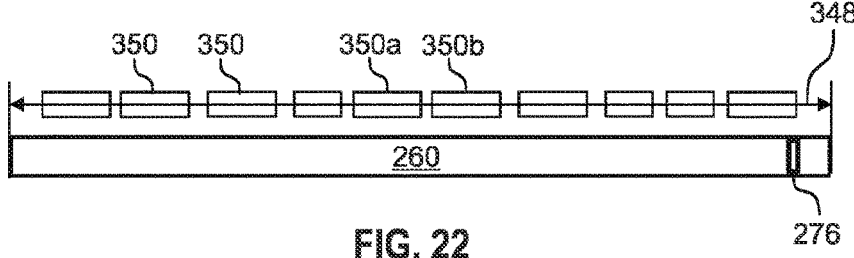

State Sensor Parameter Database
for Identifying Distinct Vehicle State Events 328                                                      314

| Event Type | General Description | Switch Sensor Current Readings (amperes) | | Battery Voltage Reading (volts) | |
|---|---|---|---|---|---|
| | | Low | High | Low | High |
| A | "Vehicle at rest" | 0.0 | 0.5 | -- | 13.3 |
| B | "engine off, low load" | 0.5 | 7.5 | -- | 13.3 |
| C | "starter engaged" | 150 | +900 | -- | 13.3 |
| D | "engine on, high charge rate" | -30 | -150 | 13.3 | 14.5 |
| E | "engine on, medium charge rate" | -7.5 | -30 | 13.3 | 14.5 |
| F | "engine on, low charge rate" | -1 | -7.5 | 13.3 | 14.5 |
| G | "engine on, alternator weak" | 7.5 | 30 | 12.2 | 13.7 |
| H | "engine off, medium load" | 7.5 | 30 | -- | 13.3 |
| I | "engine on, battery full" | -0.1 | -0.3 | 13.3 | 14.5 |
| J | "engine off, high load" | 30 | 150 | -- | 13.3 |

274
274 positive number = energy out of battery
negative number = energy into battery

FIG. 23

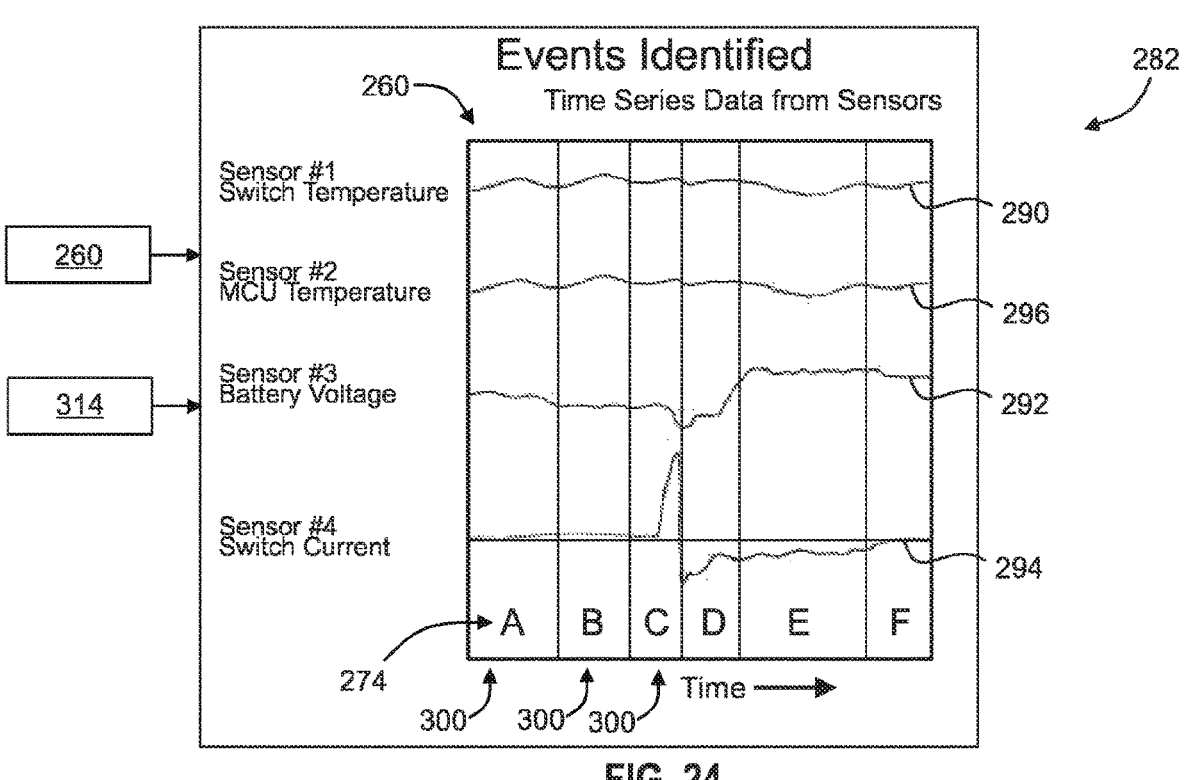
FIG. 24
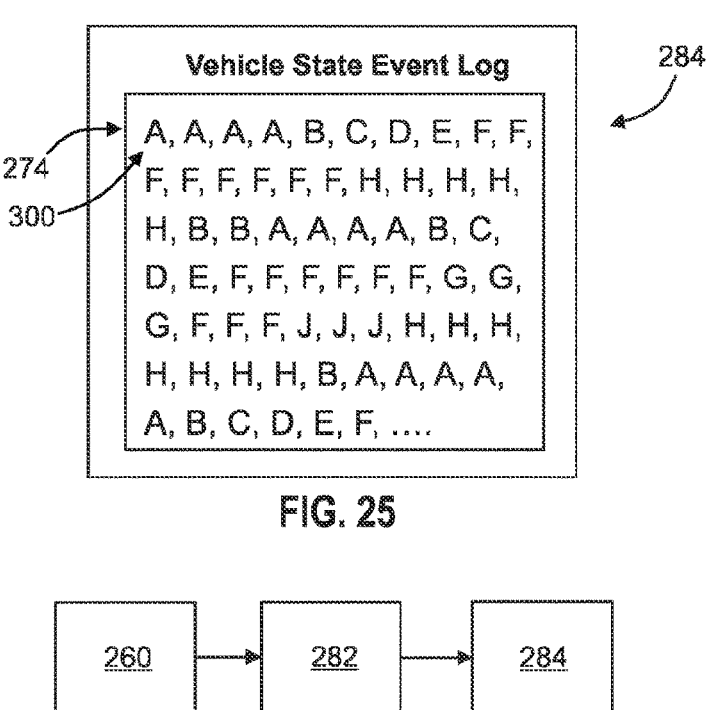
FIG. 25
FIG. 26

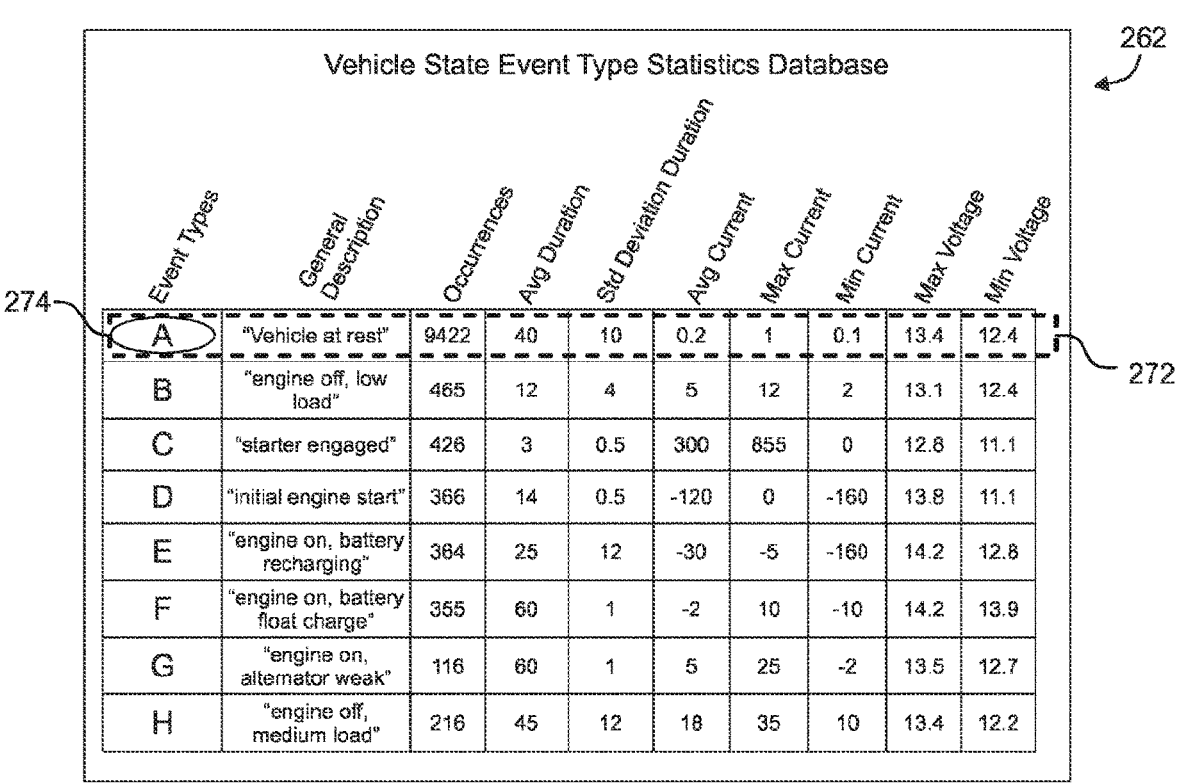

FIG. 27

Vehicle State Event Type Statistics Database

| Event Types | General Description | Occurrences | Avg Duration | Std Deviation Duration | Avg Current | Max Current | Min Current | Max Voltage | Min Voltage |
|---|---|---|---|---|---|---|---|---|---|
| A | "Vehicle at rest" | 9422 | 40 | 10 | 0.2 | 1 | 0.1 | 13.4 | 12.4 |
| B | "engine off, low load" | 465 | 12 | 4 | 5 | 12 | 2 | 13.1 | 12.4 |
| C | "starter engaged" | 426 | 3 | 0.5 | 300 | 855 | 0 | 12.8 | 11.1 |
| D | "initial engine start" | 366 | 14 | 0.5 | -120 | 0 | -160 | 13.8 | 11.1 |
| E | "engine on, battery recharging" | 364 | 25 | 12 | -30 | -5 | -160 | 14.2 | 12.8 |
| F | "engine on, battery float charge" | 355 | 60 | 1 | -2 | 10 | -10 | 14.2 | 13.9 |
| G | "engine on, alternator weak" | 116 | 60 | 1 | 5 | 25 | -2 | 13.5 | 12.7 |
| H | "engine off, medium load" | 216 | 45 | 12 | 18 | 35 | 10 | 13.4 | 12.2 |

Vehicle Event Pattern Database

| Event Pattern | Occurrence | Confidence Level | Probability of Next Vehicle Event | | | | | | | |
|---|---|---|---|---|---|---|---|---|---|---|
| | | | A | B | C | D | E | F | G | H |
| AAAA | 8691 | 4 | 79% | 20% | 0% | 0% | 0% | 0% | 0% | 1% |
| AABC | 1391 | 4 | 0% | 0% | 1% | 99% | 0% | 0% | 0% | 0% |
| ABCD | 1377 | 4 | 0% | 10% | 0% | 0% | 90% | 0% | 0% | 0% |
| BCDE | 1239 | 4 | 2% | 0% | 0% | 0% | 30% | 68% | 0% | 0% |
| BCDB | 138 | 1 | 12% | 40% | 45% | 0% | 0% | 0% | 0% | 3% |
| CDEE | 372 | 2 | 0% | 0% | 0% | 0% | 40% | 60% | 0% | 0% |
| DEFF | 758 | 3 | 12% | 8% | 0% | 0% | 0% | 73% | 0% | 7% |

FIG. 28

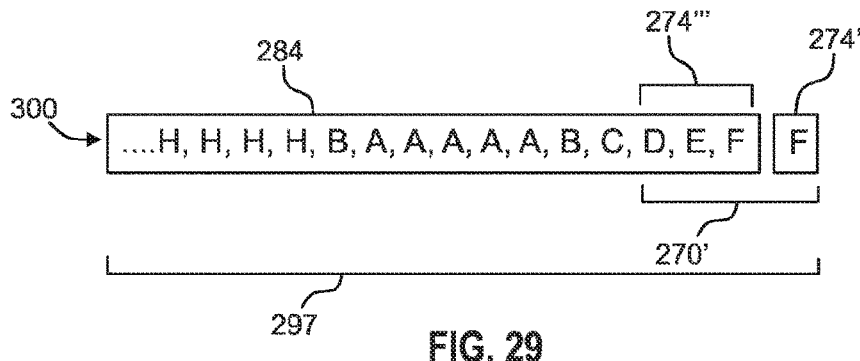

274'''
Sequentially Preceding
Vehicle State Event Types
(e.g., DEF)

274'
Present Vehicle State Event Type
(e.g., F)

270'
Present Event Pattern
(e.g., DEFF)

Vehicle Event Pattern Database

| Event Pattern | Occurrence | Confidence Level | Probability of Next Vehicle Event Type | | | | | | | |
|---|---|---|---|---|---|---|---|---|---|---|
| | | | A | B | C | D | E | F | G | H |
| AAAA | 8691 | 4 | 79% | 20% | 0% | 0% | 0% | 0% | 0% | 1% |
| AABC | 1391 | 4 | 0% | 0% | 1% | 99% | 0% | 0% | 0% | 0% |
| ABCD | 1377 | 4 | 0% | 10% | 0% | 0% | 90% | 0% | 0% | 0% |
| BCDE | 1239 | 4 | 2% | 0% | 0% | 0% | 30% | 68% | 0% | 0% |
| BCDB | 138 | 1 | 12% | 40% | 45% | 0% | 0% | 0% | 0% | 3% |
| CDEE | 372 | 2 | 0% | 0% | 0% | 0% | 40% | 60% | 0% | 0% |
| DEFF | 758 | 3 | 12% | 8% | 0% | 0% | 0% | 73% | 0% | 7% |

FIG. 30

Cross-section of Model with two thermal isolation chambers

Thermal model for a single plane
with two thermal isolation chambers

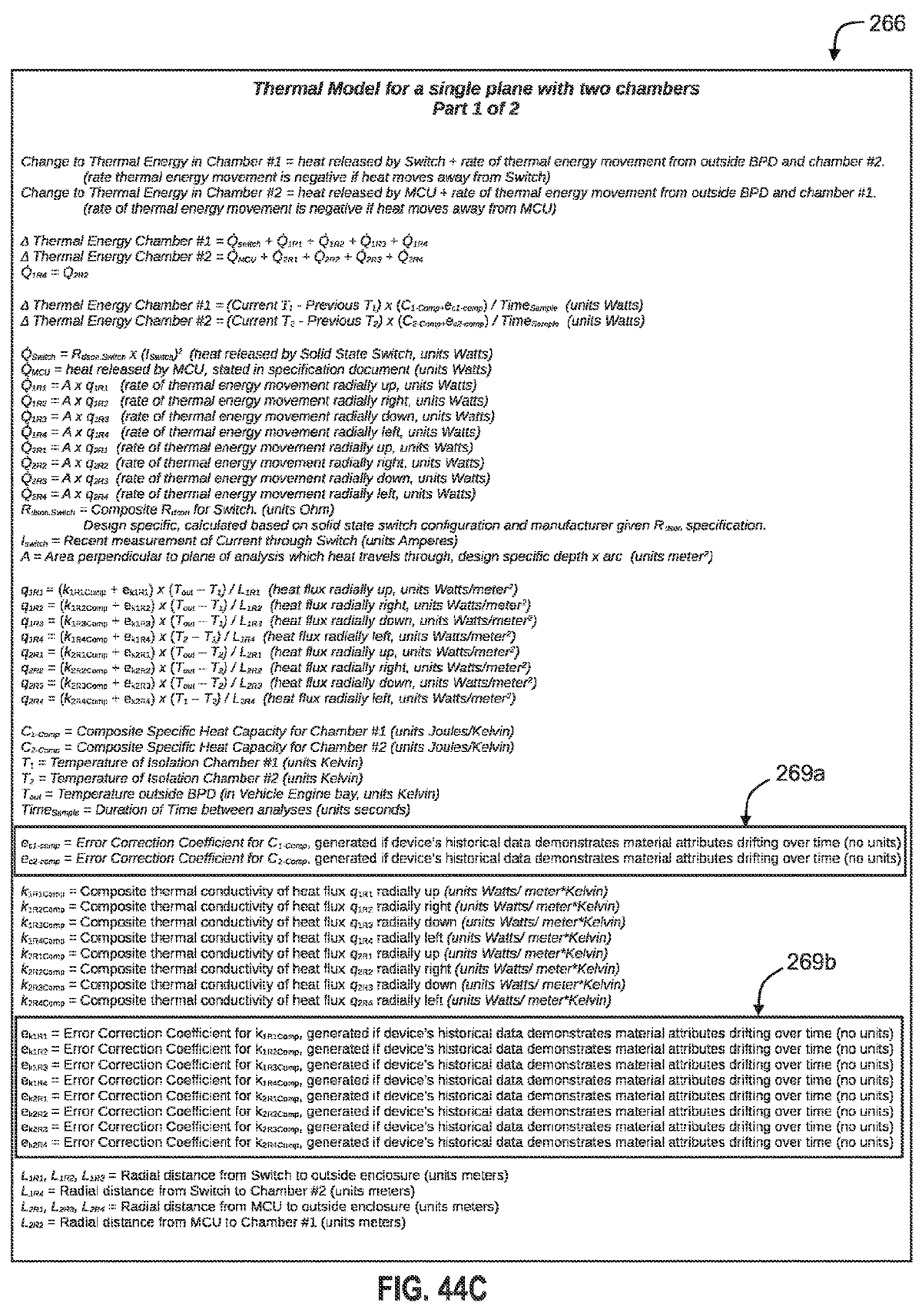

266

Thermal Model for a single plane with two chambers
Part 1 of 2

Change to Thermal Energy in Chamber #1 = heat released by Switch + rate of thermal energy movement from outside BPD and chamber #2.
(rate thermal energy movement is negative if heat moves away from Switch)
Change to Thermal Energy in Chamber #2 = heat released by MCU + rate of thermal energy movement from outside BPD and chamber #1.
(rate of thermal energy movement is negative if heat moves away from MCU)

$\Delta$ Thermal Energy Chamber #1 = $\dot{Q}_{switch} + \dot{Q}_{1R1} + \dot{Q}_{1R2} + \dot{Q}_{1R3} + \dot{Q}_{1R4}$
$\Delta$ Thermal Energy Chamber #2 = $\dot{Q}_{MCU} + \dot{Q}_{2R1} + \dot{Q}_{2R2} + \dot{Q}_{2R3} + \dot{Q}_{2R4}$
$\dot{Q}_{1R4} = \dot{Q}_{2R2}$ $\Delta$ Thermal Energy Chamber #1 = (Current $T_1$ - Previous $T_1$) x $(C_{1-Comp} + e_{c1-comp})$ / $Time_{Sample}$  (units Watts)
$\Delta$ Thermal Energy Chamber #2 = (Current $T_2$ - Previous $T_2$) x $(C_{2-Comp} + e_{c2-comp})$ / $Time_{Sample}$  (units Watts)

$\dot{Q}_{Switch} = R_{dson.Switch}$ x $(I_{Switch})^2$  (heat released by Solid State Switch, units Watts)
$\dot{Q}_{MCU}$ = heat released by MCU, stated in specification document (units Watts)
$\dot{Q}_{1R1} = A$ x $q_{1R1}$  (rate of thermal energy movement radially up, units Watts)
$\dot{Q}_{1R2} = A$ x $q_{1R2}$  (rate of thermal energy movement radially right, units Watts)
$\dot{Q}_{1R3} = A$ x $q_{1R3}$  (rate of thermal energy movement radially down, units Watts)
$\dot{Q}_{1R4} = A$ x $q_{1R4}$  (rate of thermal energy movement radially left, units Watts)
$\dot{Q}_{2R1} = A$ x $q_{2R1}$  (rate of thermal energy movement radially up, units Watts)
$\dot{Q}_{2R2} = A$ x $q_{2R2}$  (rate of thermal energy movement radially right, units Watts)
$\dot{Q}_{2R3} = A$ x $q_{2R3}$  (rate of thermal energy movement radially down, units Watts)
$\dot{Q}_{2R4} = A$ x $q_{2R4}$  (rate of thermal energy movement radially left, units Watts)
$R_{dson.Switch}$ = Composite $R_{dson}$ for Switch. (units Ohm)
Design specific, calculated based on solid state switch configuration and manufacturer given $R_{dson}$ specification.
$I_{Switch}$ = Recent measurement of Current through Switch (units Amperes)
A = Area perpendicular to plane of analysis which heat travels through, design specific depth x arc  (units $meter^2$)

$q_{1R1} = (k_{1R1Comp} + e_{k1R1})$ x $(T_{out} - T_1)$ / $L_{1R1}$  (heat flux radially up, units Watts/$meter^2$)
$q_{1R2} = (k_{1R2Comp} + e_{k1R2})$ x $(T_{out} - T_1)$ / $L_{1R2}$  (heat flux radially right, units Watts/$meter^2$)
$q_{1R3} = (k_{1R3Comp} + e_{k1R3})$ x $(T_{out} - T_1)$ / $L_{1R3}$  (heat flux radially down, units Watts/$meter^2$)
$q_{1R4} = (k_{1R4Comp} + e_{k1R4})$ x $(T_2 - T_1)$ / $L_{1R4}$  (heat flux radially left, units Watts/$meter^2$)
$q_{2R1} = (k_{2R1Comp} + e_{k2R1})$ x $(T_{out} - T_2)$ / $L_{2R1}$  (heat flux radially up, units Watts/$meter^2$)
$q_{2R2} = (k_{2R2Comp} + e_{k2R2})$ x $(T_{out} - T_2)$ / $L_{2R2}$  (heat flux radially right, units Watts/$meter^2$)
$q_{2R3} = (k_{2R3Comp} + e_{k2R3})$ x $(T_{out} - T_2)$ / $L_{2R3}$  (heat flux radially down, units Watts/$meter^2$)
$q_{2R4} = (k_{2R4Comp} + e_{k2R4})$ x $(T_1 - T_2)$ / $L_{2R4}$  (heat flux radially left, units Watts/$meter^2$)

$C_{1-Comp}$ = Composite Specific Heat Capacity for Chamber #1 (units Joules/Kelvin)
$C_{2-Comp}$ = Composite Specific Heat Capacity for Chamber #2 (units Joules/Kelvin)
$T_1$ = Temperature of Isolation Chamber #1 (units Kelvin)
$T_2$ = Temperature of Isolation Chamber #2 (units Kelvin)
$T_{out}$ = Temperature outside BPD (in Vehicle Engine bay, units Kelvin)
$Time_{Sample}$ = Duration of Time between analyses (units seconds)

269a $e_{c1-comp}$ = Error Correction Coefficient for $C_{1-Comp}$, generated if device's historical data demonstrates material attributes drifting over time (no units)
$e_{c2-comp}$ = Error Correction Coefficient for $C_{2-Comp}$, generated if device's historical data demonstrates material attributes drifting over time (no units)

$k_{1R1Comp}$ = Composite thermal conductivity of heat flux $q_{1R1}$ radially up (units Watts/ meter*Kelvin)
$k_{1R2Comp}$ = Composite thermal conductivity of heat flux $q_{1R2}$ radially right (units Watts/ meter*Kelvin)
$k_{1R3Comp}$ = Composite thermal conductivity of heat flux $q_{1R3}$ radially down (units Watts/ meter*Kelvin)
$k_{1R4Comp}$ = Composite thermal conductivity of heat flux $q_{1R4}$ radially left (units Watts/ meter*Kelvin)
$k_{2R1Comp}$ = Composite thermal conductivity of heat flux $q_{2R1}$ radially up (units Watts/ meter*Kelvin)
$k_{2R2Comp}$ = Composite thermal conductivity of heat flux $q_{2R2}$ radially right (units Watts/ meter*Kelvin)
$k_{2R3Comp}$ = Composite thermal conductivity of heat flux $q_{2R3}$ radially down (units Watts/ meter*Kelvin)
$k_{2R4Comp}$ = Composite thermal conductivity of heat flux $q_{2R4}$ radially left (units Watts/ meter*Kelvin)

269b $e_{k1R1}$ = Error Correction Coefficient for $k_{1R1Comp}$, generated if device's historical data demonstrates material attributes drifting over time (no units)
$e_{k1R2}$ = Error Correction Coefficient for $k_{1R2Comp}$, generated if device's historical data demonstrates material attributes drifting over time (no units)
$e_{k1R3}$ = Error Correction Coefficient for $k_{1R3Comp}$, generated if device's historical data demonstrates material attributes drifting over time (no units)
$e_{k1R4}$ = Error Correction Coefficient for $k_{1R4Comp}$, generated if device's historical data demonstrates material attributes drifting over time (no units)
$e_{k2R1}$ = Error Correction Coefficient for $k_{2R1Comp}$, generated if device's historical data demonstrates material attributes drifting over time (no units)
$e_{k2R2}$ = Error Correction Coefficient for $k_{2R2Comp}$, generated if device's historical data demonstrates material attributes drifting over time (no units)
$e_{k2R3}$ = Error Correction Coefficient for $k_{2R3Comp}$, generated if device's historical data demonstrates material attributes drifting over time (no units)
$e_{k2R4}$ = Error Correction Coefficient for $k_{2R4Comp}$, generated if device's historical data demonstrates material attributes drifting over time (no units)

$L_{1R1}, L_{1R2}, L_{1R3}$ = Radial distance from Switch to outside enclosure (units meters)
$L_{1R4}$ = Radial distance from Switch to Chamber #2 (units meters)
$L_{2R1}, L_{2R3}, L_{2R4}$ = Radial distance from MCU to outside enclosure (units meters)
$L_{2R2}$ = Radial distance from MCU to Chamber #1 (units meters)

FIG. 44C

Thermal Model for single plane with two chambers
Part 2

$k_{1R1Comp} = k_{pot} \times (L_{pot1R1} \times Z_{pot1R1} / L_{1R1}) + k_{enclosure} \times (L_{enclosure1R1} \times Z_{enclosure1R1} / L_{1R1}) + BPD_{Convection1R1} + BPD_{Radiation1R1}$ $k_{1R2Comp} = k_{pot} \times (L_{pot1R2} \times Z_{pot1R2} / L_{1R2}) + k_{insulation} \times (L_{insulation1R2} \times Z_{insulation1R2} / L_{1R2}) + k_{heatsink} \times (L_{heatsink1R2} \times Z_{heatsink1R2} / L_{1R2}) + BPD_{Convection1R2} + BPD_{Radiation1R2}$ $k_{1R3Comp} = k_{thermalbank} \times (L_{thermalbank1R3} \times Z_{thermalbank1R3} / L_{1R3}) + k_{peltier-OFF} \times (1 - PD_{flag}) \times Z_{peltier1R3} + k_{peltier-ON} \times (PD_{flag}) \times Z_{peltier1R3} + k_{heatsink} \times (L_{heatsink1R3} \times Z_{heatsink1R3} / L_{1R3}) + BPD_{Conduction1R3}$ $k_{1R4Comp} = k_{pcb} \times (L_{pcb1R4} \times Z_{pcb1R4} / L_{1R4}) + k_{insulation} \times (L_{insulation1R4} \times Z_{insulation1R4} / L_{1R4})$ $k_{2R1Comp} = k_{pot} \times (L_{pot2R1} \times Z_{pot2R1} / L_{2R1}) + k_{enclosure} \times (L_{enclosure2R1} \times Z_{enclosure2R1} / L_{2R1}) + BPD_{Convection2R1} + BPD_{Radiation2R1}$ $k_{2R2Comp} = k_{pcb} \times (L_{pcb2R2} \times Z_{pcb2R2} / L_{2R2}) + k_{insulation} \times (L_{insulation1R4} \times Z_{insulation2R2} / L_{2R2})$ $k_{2R3Comp} = k_{pot} \times (L_{pot2R3} \times Z_{pot2R3} / L_{2R3}) + k_{insulation} \times (L_{insulation1R3} \times Z_{insulation2R3} / L_{2R3}) + k_{heatsink} \times (L_{heatsink2R3} \times Z_{heatsink2R3} / L_{2R3}) + BPD_{Conduction2R3}$ $k_{2R4Comp} = k_{pot} \times (L_{pot2R4} \times Z_{pot2R4} / L_{2R4}) + k_{enclosure} \times (L_{enclosure2R4} \times Z_{enclosure2R4} / L_{2R4}) + BPD_{Convection2R4} + BPD_{Radiation2R4}$ $PD_{flag} = $ peltier device "on" flag (if "on" = 1, if "off" = 0)

$k_{pot} = $ thermal conductivity of potting solution, stated in specification document (units Watts/meter*Kelvin)

$k_{enclosure} = $ thermal conductivity of enclosure material, stated in specification document (units Watts/meter*Kelvin)

$k_{insulation} = $ thermal conductivity of insulation material, stated in specification document (units Watts/meter*Kelvin)

$k_{peltier-OFF} = $ thermal conductivity of peltier material in "off" state, stated in specification document (units Watts/meter*Kelvin)

$k_{peltier-ON} = $ thermal conductivity of peltier material in "on" state, stated in specification document (units Watts/meter*Kelvin)

$k_{thermalbank} = $ thermal conductivity of thermal bank material, Aluminum 6061T6 (units Watts/meter*Kelvin)

$k_{heatsink} = $ thermal conductivity of heat sink material, Aluminum 6061T6 (units Watts/meter*Kelvin)

$k_{pcb} = $ thermal conductivity of pcb material, FR4 stated in specification documents (units Watts/meter*Kelvin)

$L_{pot1R1}, L_{pot1R2}, L_{pot2R1}, L_{pot2R3}, L_{pot2R4} = $ thickness of potting material radially (units meters)

$L_{enclosure1R1}, L_{enclosure2R1}, L_{enclosure2R4} = $ thickness of enclosure material radially (units meters)

$L_{insulation1R2}, L_{insulation1R4}, L_{insulation1R3} = $ thickness of insulation material radially (units meters)

$L_{heatsink1R2}, L_{heatsink1R3}, L_{heatsink2R3} = $ thickness of heat sink radially (units meters)

$L_{thermalbank1R3} = $ thickness of thermal bank radially (units meters)

$L_{pcb1R4}, L_{pcb2R2} = $ thickness of pcb radially (units meters)

$Z_{pot1R1}, Z_{pot1R2}, Z_{pot2R1}, Z_{pot2R3}, Z_{pot2R4} = $ constant based on the amount of potting material in radial arc, design specific percent of Area (units %)

$Z_{enclosure1R1}, Z_{enclosure2R1}, Z_{enclosure2R4} = $ constant based on the amount of enclosure material in radial arc, design specific percent of Area (units %)

$Z_{insulation1R2}, Z_{insulation1R4}, Z_{insulation2R2}, Z_{insulation2R3} = $ constant based on the amount of insulation material in radial arc, design specific percent of Area (units %)

$Z_{heatsink1R2}, Z_{heatsink1R3}, Z_{heatsink2R3} = $ constant based on the amount of heat sink material in radial arc, design specific percent of Area (units %)

$Z_{thermalbank1R3} = $ constant based on the amount of thermal bank material in radial arc, design specific percent of Area (units %)

$Z_{peltier1R3} = $ constant based on the amount of peltier material in radial arc, design specific percent of Area (units %)

$Z_{pcb1R4}, Z_{pcb2R2} = $ constant based on the amount of pcb material in radial arc, design specific percent of Area (units %)

$BPD_{Convection1R1} = $ natural convection from horizontal top of chamber #1 enclosure out to environment (units Watts/meter*Kelvin)

$BPD_{Radiation1R1} = $ radiation from top of chamber #1 enclosure out to environment (units Watts/meter*Kelvin)

$BPD_{Convection1R2} = $ natural convection from vertical side of heat sink out to environment (units Watts/meter*Kelvin)

$BPD_{Radiation1R2} = $ radiation from vertical side of heat sink out to environment (units Watts/meter*Kelvin)

$BPD_{Conduction1R3} = $ conduction from bottom of heat sink out to vehicle battery (units Watts/meter*Kelvin)

$BPD_{Convection2R1} = $ natural convection from horizontal top of chamber #2 enclosure out to environment (units Watts/meter*Kelvin)

$BPD_{Radiation2R1} = $ radiation from top of chamber #2 enclosure out to environment (units Watts/meter*Kelvin)

$BPD_{Conduction2R3} = $ conduction from bottom of heat sink out to vehicle battery (units Watts/meter*Kelvin)

$BPD_{Convection2R4} = $ natural convection from vertical side of chamber #2 enclosure out to environment (units Watts/meter*Kelvin)

$BPD_{Radiation2R4} = $ radiation from vertical side of chamber #2 enclosure out to environment (units Watts/meter*Kelvin)

FIG. 44D

VEHICLE BATTERY PROTECTION DEVICE, AND METHOD FOR THERMAL MANAGEMENT OF SAME

RELATED APPLICATIONS

This application is a U.S. national stage of PCT International Patent Application No. PCT/US2024/044146 having an international filing date of Aug. 28, 2024, which claims the benefit of U.S. Provisional Application No. 63/535,279 filed Aug. 29, 2023 and U.S. Provisional Application No. 63/593,862 filed Oct. 27, 2023. The contents of each of the above-identified applications are incorporated by this reference in their entireties for all purposes as if fully set forth herein.

TECHNICAL FIELD

The present disclosure relates to devices for protecting the charge in vehicle batteries, including car and truck batteries.

BACKGROUND

Conventional battery protection devices are designed to prevent vehicle batteries from being drained to the point that the battery cannot start the vehicle. They may contain a microcontroller and electrical sensors to gather data and enable decision making regarding the control of current flow to the vehicle. The microcontroller then uses this data to enable or disable a switch to allow current to flow to or from the vehicle and the battery.

Battery protection devices are generally preferred by vehicle owners over alternative solutions because once installed, they may act automatically. Battery protection devices are typically set-and-forget solutions. Other solutions, such as battery chargers or manual battery disconnects, require the vehicle user to be proactive and to always take preventative actions. Conventional jump packs and jump services may be unreliable and typically fail to prevent battery drain. Rather, they only attempt to mitigate the dead battery outcome.

Modern combustion engines tend to require significant electrical power to turn over and start. This creates a huge electrical and consequently thermal challenge for conventional battery protection devices that isolate the battery from all of the vehicle circuits. In some vehicles, electrical loads can spike over 1,000 amps. In battery protection devices that use solid state switches, like MOSFETs or insulated-gate bipolar transistors (IGBTs), the corresponding short duration thermal loads can be, for example, 2-9 kilowatts. Historically, thermal solutions have been too large or impractical to fit in a typical consumer vehicle. Therefore, what is needed, at least in part, is a thermal management solution for solid state battery protection devices that are useful in most if not all categories of vehicle, large and small.

SUMMARY

Certain deficiencies of the prior art are overcome by the provision of vehicle battery protections device, and method for thermal management of same, as disclosed herein.

BRIEF DESCRIPTION OF THE DRAWINGS

Further advantages of the present invention may become apparent to those skilled in the art with the benefit of the following detailed description of the preferred embodiments and upon reference to the accompanying drawings in which:

FIG. 19 is a diagrammatic flow chart illustrating a thermal safety algorithm in one non-limiting example vehicle battery protection device in accordance with the present disclosure;

FIG. 22 is a diagrammatic illustration of one example of a relationship between an implementation time interval, a time series database, and operating periods;

FIG. 23 is one example of a state sensor parameter database in accordance with aspects of the present disclosure;

FIG. 24 is a diagrammatic flow chart illustrating one example of how vehicle state events may be categorically identified as vehicle state event types by comparing a time series database to state sensor parameters, in accordance with aspects of the present disclosure;

FIG. 25 illustrates one example of an event history dataset logged by a processor in accordance with aspects of the present disclosure;

FIG. 26 is a flow chart illustrating one example of an event history dataset being generated based on the identification of vehicle state events within a time series database, in accordance with aspects of the present disclosure;

FIG. 27 illustrates one example of a vehicle state event type statistics database, in accordance with aspects of the present disclosure;

FIG. 28 illustrates one example of a vehicle event pattern database, in accordance with aspects of the present disclosure;

FIG. 29 illustrates one example of a sequence of vehicle state events, in accordance with aspects of the present disclosure;

FIG. 30 illustrates one example of a present event pattern dataset being referenced due to the fact that it corresponds to the present event pattern, in accordance with aspects of the present disclosure;

FIG. 44C illustrates a first set of equations of the thermal model diagrammatically depicted in FIG. 44B;

FIG. 44D illustrates a second set of equations of the thermal model diagrammatically depicted in FIG. 44B;

DETAILED DESCRIPTION OF THE PREFERRED EMBODIMENTS

Figure 1A:
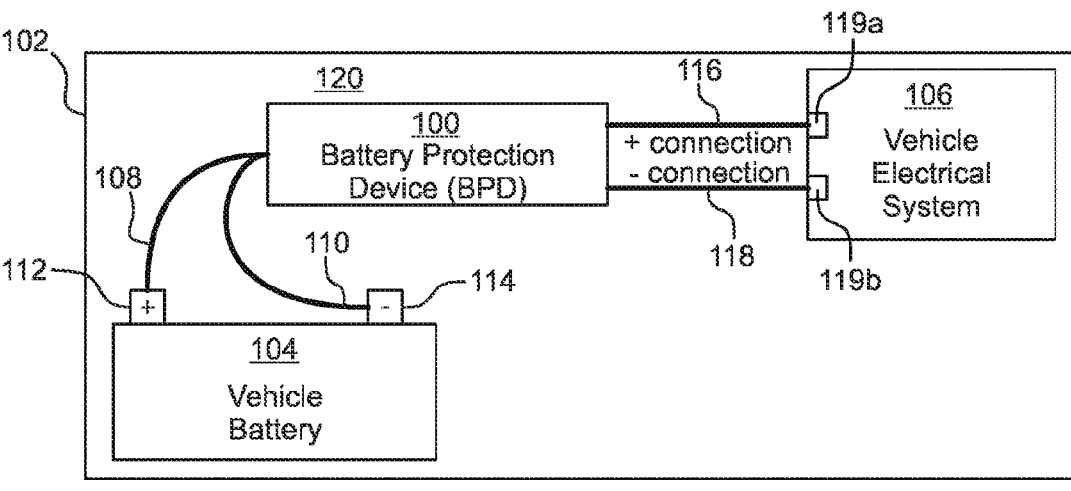
FIG. 1A is a diagrammatic view of one non-limiting example of a vehicle battery protection device electrically connected between the vehicle battery and the vehicle electrical system.

Referring now to the drawings, like reference numerals designate identical or corresponding features throughout the several views. Example embodiments of a vehicle battery protection device in accordance with the present disclosure (otherwise referred to herein as a BPD) are shown generally at 100.

Figure 1B:
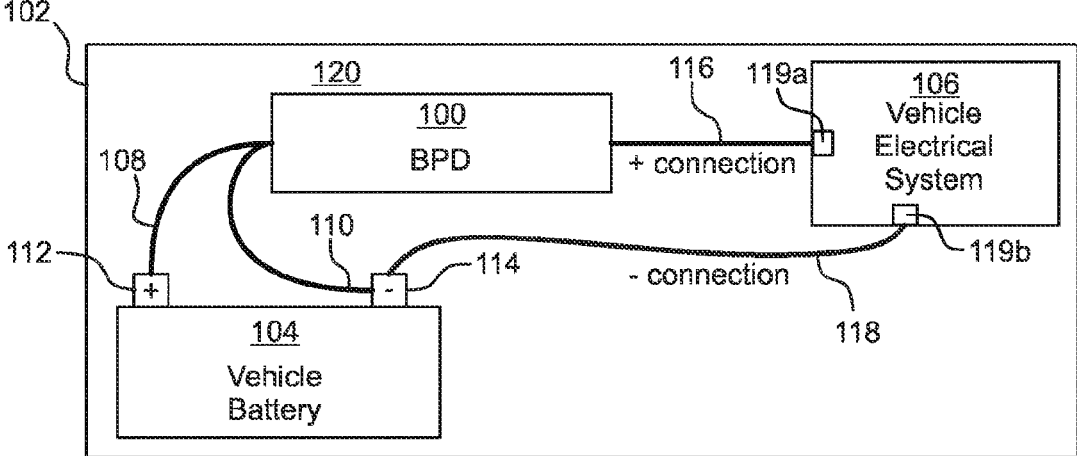
FIG. 1B is a diagrammatic view of a second non-limiting example of a vehicle battery protection device electrically connected between the vehicle battery and the vehicle electrical system.
Figure 1C:
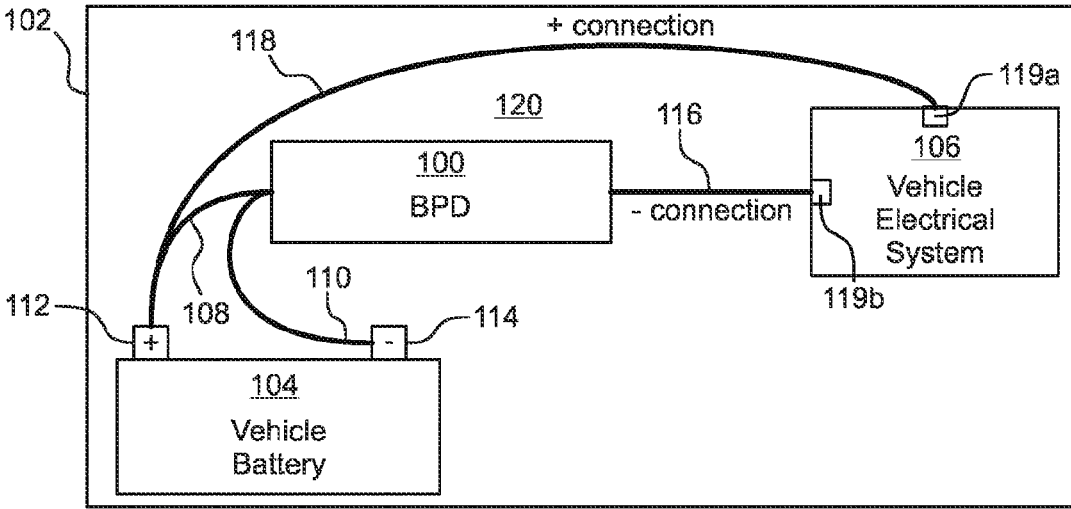
FIG. 1C is a diagrammatic view of a third non-limiting example of a vehicle battery protection device electrically connected between the vehicle battery and the vehicle electrical system.
Figure 2A:
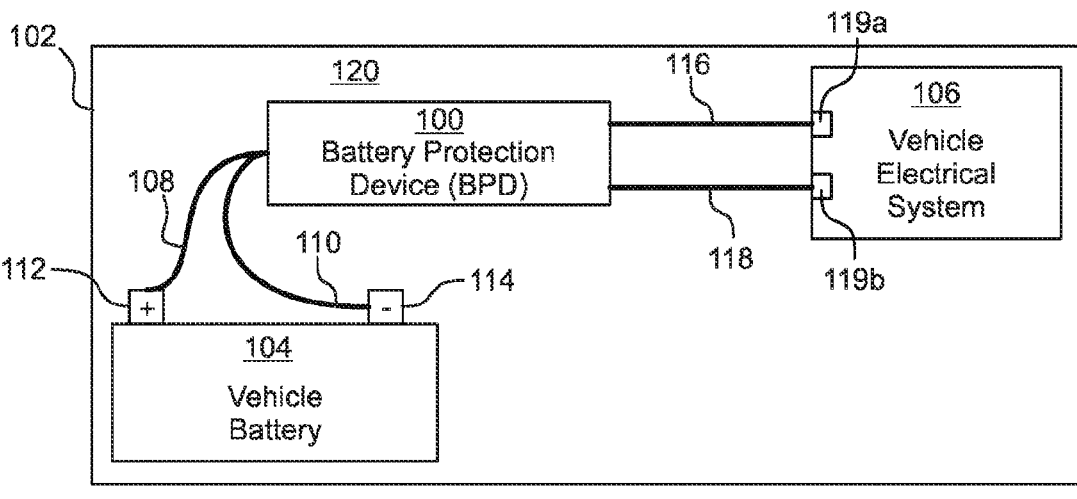
FIG. 2A is a diagrammatic view of a first non-limiting configuration of a vehicle battery protection device electrically connected between the vehicle battery and the vehicle electrical system, wherein the vehicle battery protection device is disposed within the vehicle separately from the vehicle battery and the vehicle electrical system.
Figure 2B:
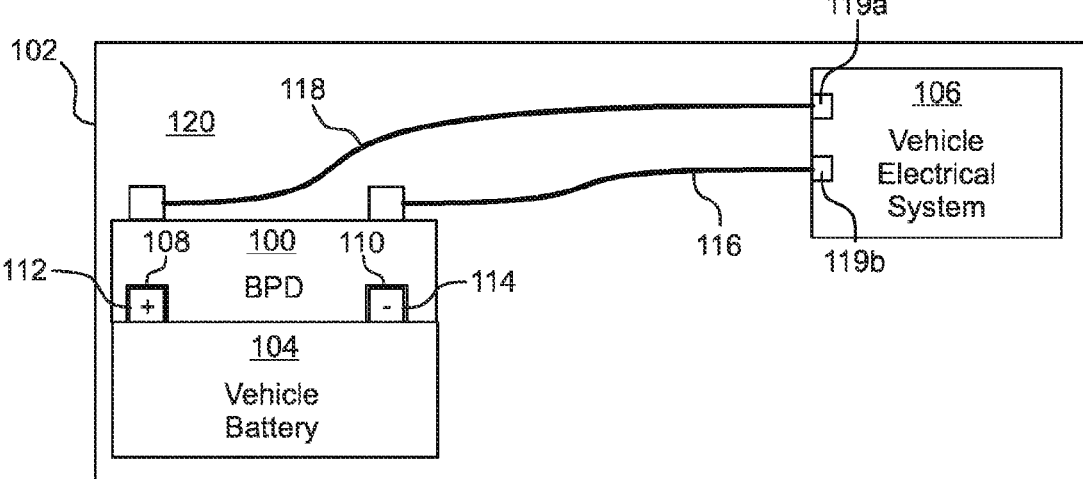
FIG. 2B is a diagrammatic view of a second non-limiting configuration of a vehicle battery protection device electrically connected between the vehicle battery and the vehicle electrical system, wherein the housing of the vehicle battery protection device is mounted to the vehicle battery.
Figure 2C:
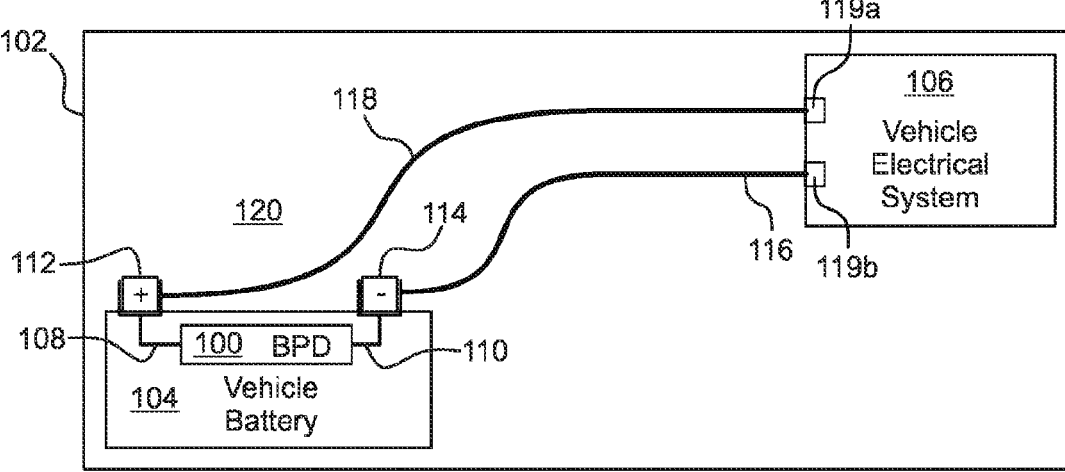
FIG. 2C is a diagrammatic view of a third non-limiting configuration of a vehicle battery protection device electrically connected between the vehicle battery and the vehicle electrical system, wherein the vehicle battery protection device is mounted within the vehicle battery.
Figures 3, 4, 5:
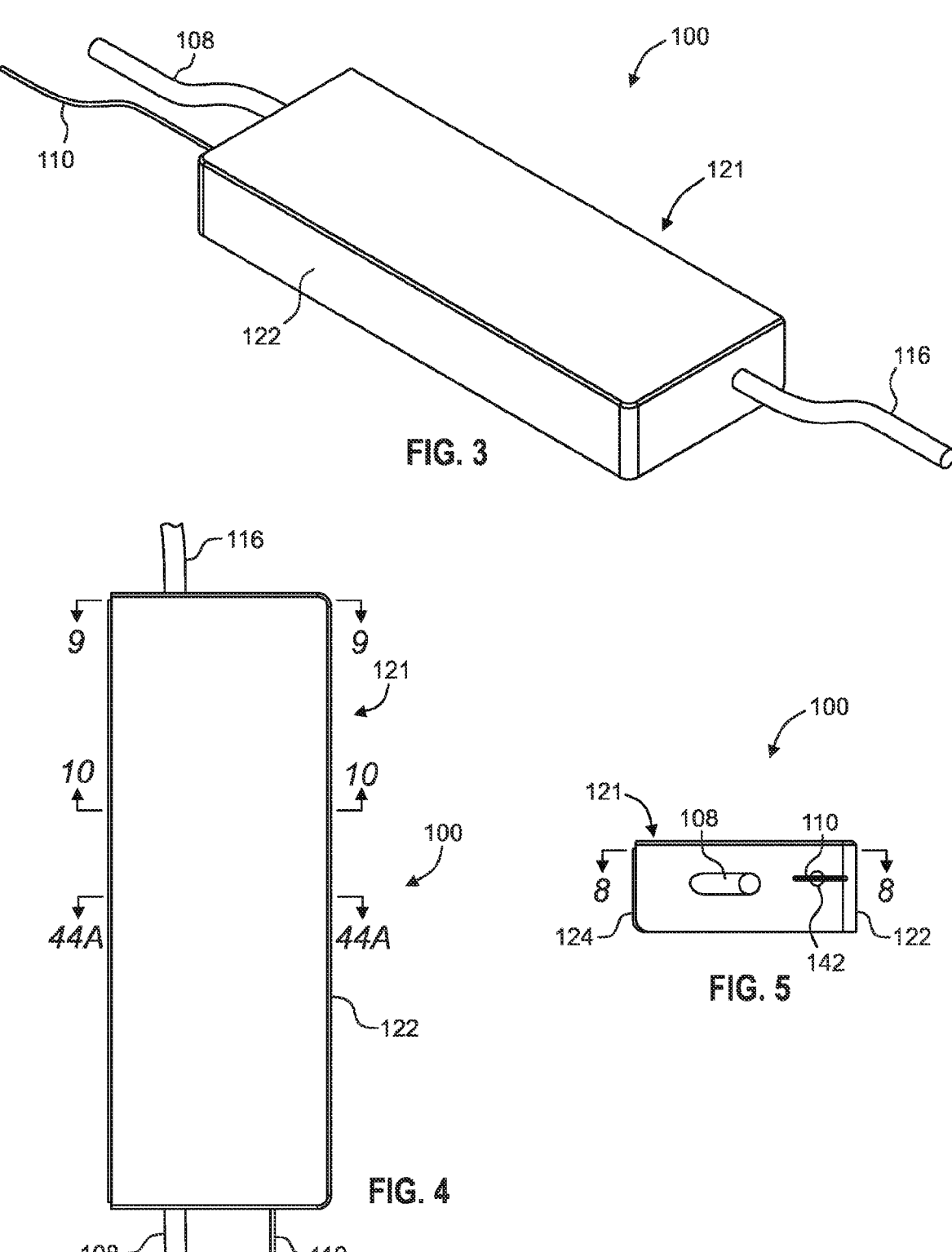
FIG. 3 is a diagrammatic perspective view of one non-limiting example of a vehicle battery protection device in accordance with the present disclosure.
FIG. 4 is a diagrammatic top view of the example vehicle battery protection device of FIG. 3.
FIG. 5 is a diagrammatic end view of the example vehicle battery protection device of FIG. 3.

Referring to FIGS. 1A-1C and 2A-2C, installation of preferred embodiments of a BPD 100 with respect to a vehicle 102 should be straightforward to the average do-it-yourself person. For example, the BPD 100 would generally be installed between the vehicle battery 104 and the vehicle wiring harness of a vehicle electrical system 106. A switch inside the BPD 100 has the ability to electrically disconnect either the battery's positive lead, negative lead or both from the vehicle wiring harness to thereby prevent the flow of electricity. FIGS. 1A-1C illustrate possible wiring configurations. The BPD 100 could be a standalone device or incorporated into the fuse box or the battery. Either configuration would not change the functionality of the device. FIGS. 2A-2C illustrate possible BPD 100 packaging configurations.

Figure 15:
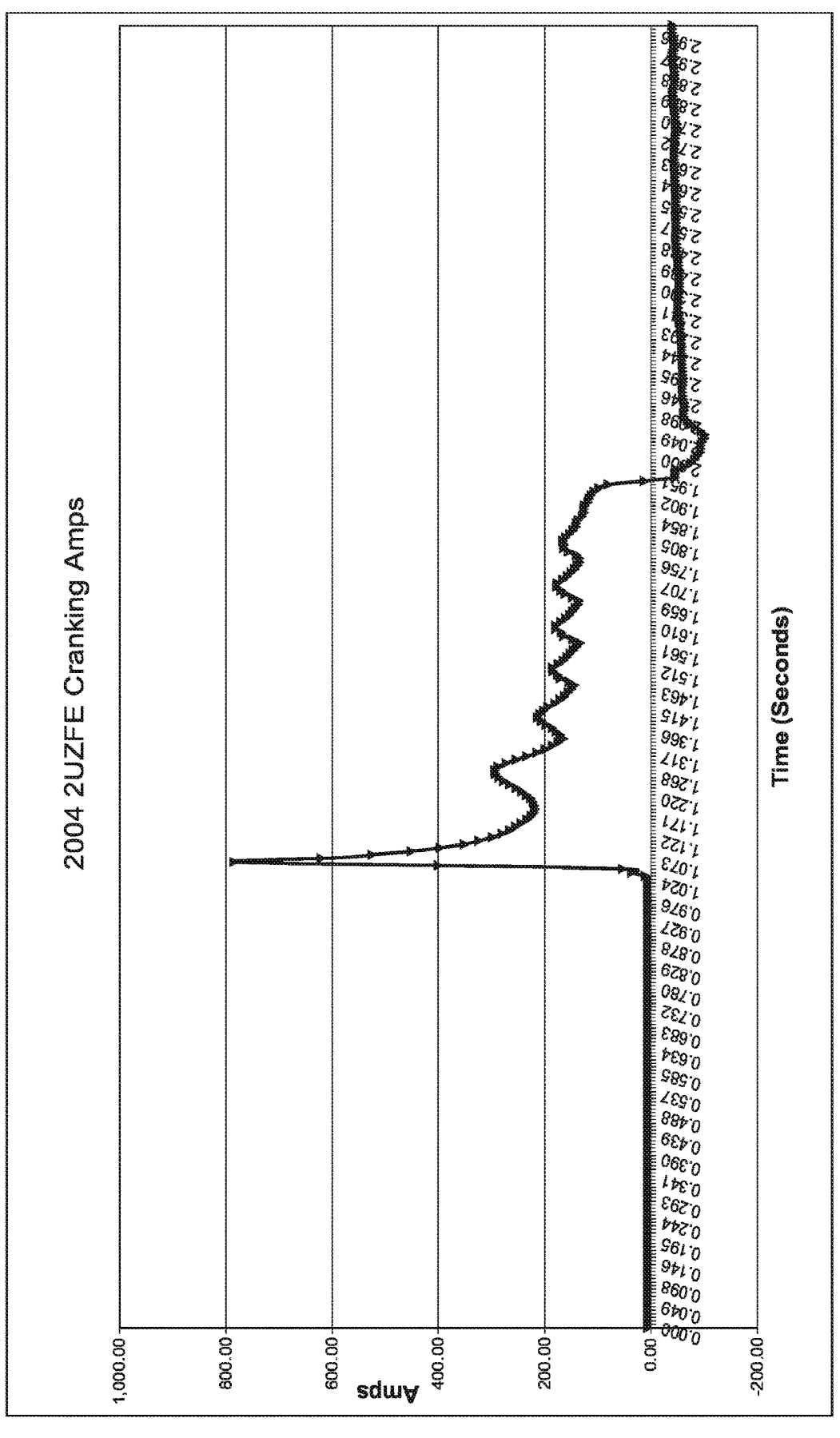
FIG. 15 is a chart illustrating experimentally determined electrical current required for starting a 2UZFE 2004 Toyota 4.7L V8 with a compression ratio of 9.5:1.

Very few, if any, other low voltage applications experience such extreme dynamic electrical loads as a starting battery in a vehicle. Large displacement modern engines with high compression are especially known for their extremely large electrical loads. By way of example, FIG. 15 is a graph tracing the electrical current required for starting a 2UZFE 2004 Toyota 4.7L V8 with a compression ratio of 9.5:1. This engine is a relatively efficient large engine and yet requires 700-800 amperes peak to initially turn over and start the engine. Engines like the Dodge 6.2L V8 Hemi, with a compression ratio of 9.5:1 and a belt driven super charger, requires 1000 cranking amps to turn over and start. Engines in poor condition or with a variety of issues can experience 4-8 times longer duration cranking cycles with higher peak loads than even the graph in FIG. 15 illustrates.

These electrical loads explain why some conventional battery protection devices exclude the starter motor from their load path design, and require the user to make major wiring changes to their vehicle or have relegated to only OEM level solutions. In order for a battery protection device to be an economically viable aftermarket product, it must be easy to install and require minimal vehicle modifications. These installation requirements frequently if not always dictate that all electrical loads of the vehicle should pass through the battery protection device.

From a reliability standpoint, solid state switches are preferable to electromechanical switches (i.e., relays) such as electromagnetic relays, latching relays, and other types of switching devices that rely on physically moving electrical contacts. Relays are generally susceptible to spark events and degradation due to carbon buildup. Both of which are unavoidable and reduce cycle life and reliability. Relays require moving parts to operate, and they are also required to have an air chamber with ample room for the contacts to move within. Consequently, relays are more susceptible to corrosion based failures, like oxidation, and are more prone to failure in high vibration environments.

Figure 16:
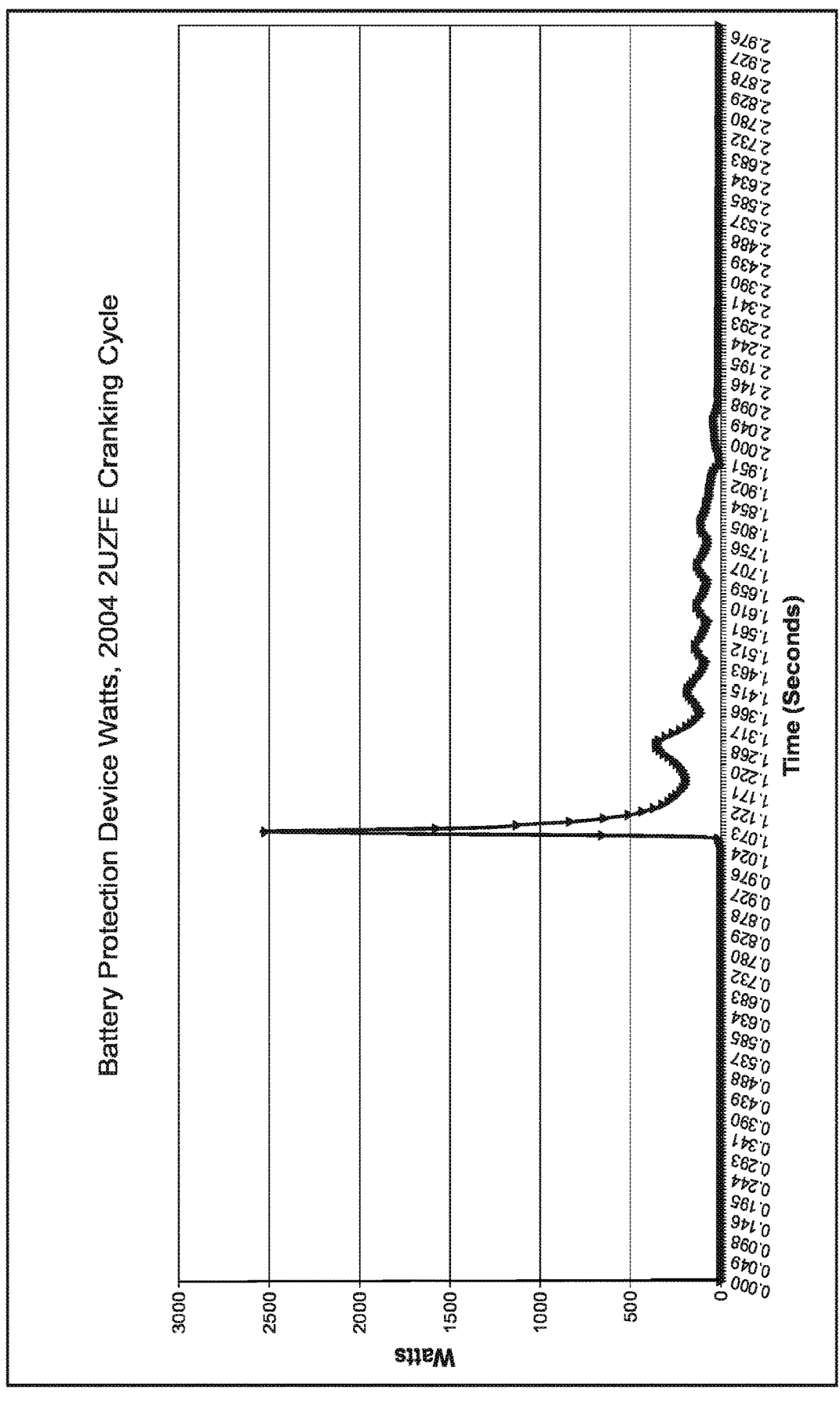
FIG. 16 is a chart illustrating experimentally determined heat generated in a prototype of one example of a vehicle battery protection device in accordance with the present disclosure during cranking of a 2UZFE 2004 Toyota 4.7L V8.

All types of solid state switches are transistor based and have no moving parts and no air chambers. Solid state switches can be sealed and isolated from the environment in potting solution and are extremely tolerant of harsh vibrations. They are the ideal choice for every type of application. The only negative characteristic of solid state switches is their heat generation. They generate heat in proportion to the current being transferred. Mitigating high heat generation has caused most solid state switch based battery protection devices to be excessively large and commercially nonviable, and thus, unsuccessful. The graph in FIG. 16 shows the heat generated in a prototype battery protection device, measured in watts, on 2UZFE 2004 Toyota 4.7L V8. The heat load is short in duration, but intense at 2,500 watts. If a battery protection device does not have a reliable and robust thermal solution, failure is highly likely.

The above-identified issues have prompted us to develop a thermal solution framework applicable in electronic battery protection devices that employ a solid state switch. Preferred implementations of the thermal solution disclosed herein are both proactive and aware. Aspects of the presently-disclosed BPD 100 reduce and manage the risks relating to thermal runaways and failure modes, while maximizing the useful operating envelope of the BPD 100 as a system. Preferred implementations of the BPD 100 rely upon hardware and software solutions to maximize results.

Hardware Aspects and Architecture

FIGS. 3-12 and 13A-13B illustrate certain hardware aspects of particular preferred implementations of the BPD 100. Moreover, FIGS. 14A and 14B illustrate two example BPD 100 hardware architecture system block diagrams. Additional hardware-based disclosure is provided below.

Multiple Thermal Isolation Chambers

A successful thermal design begins with managing heat movement passively through isolation. Preferred implementations of our solution focus, in part, on the internal components and their individual specifications. It is rare that all components in a battery protection device have the same heat tolerance. Solid state switches will be the main heat source inside the BPD 100, and the corresponding heat should preferably be insulated and shielded from other heat-sensitive components. For example, particular implementations of the BPD 100 may have a microcontroller, dc/dc's, discrete memory chips, signal conditioning circuits and sensors with their own operating temperature ranges and heat release. As an example, typical industrial microcontrollers, like STM32F103CBT7, have a thermal operating tolerance of 105° C. while some industrial MOSFETs, like IRF520NPBF, can operate up to 175° C. Responsive to this issue, referring to FIGS. 8 and 10, in preferred implementations of the BPD 100, internal components may preferably be separated into two or more thermal isolation chambers (otherwise referred to herein as thermal chambers, or first thermal chamber 150 and second thermal chamber 152), each with their own thermal solution. Depending on vehicle design requirements and supply chain restrictions, certain implementations of the BPD 100 may include three or four thermal isolation chambers. A Thermal Safety Algorithm of the BPD 100, described in more detail below, should be aware of each thermal chamber. The respective thermal tolerances and material makeups of each of the thermal chambers are preferably included in a Thermal Model employed by the Thermal Safety Algorithm.

For compact or high temperature engine bays, temperatures may be consistently high, and thermal chambers for electrical subsystems may have to be heavily shielded from the ambient engine bay radiation and from the solid state switch 126 heat. Therefore, referring to FIGS. 6-10, certain implementations of the BPD 100 may include one or more thermal insulation members (e.g., 154a, 154b, 154c). Insulation, such as the aforementioned thermal insulation members, may be comprised of, for example, a high temperature silicate based ceramic fiber, flame-retardant Garolite, thermally non-conductive silicone potting solution, some combination thereof, or the like. Alternatively, or in addition, one or more vacuum gaps may be employed as an insulation member or feature. Depending on space requirements, a large thermal mass, such as a thermal bank 156, could be utilized to stabilize the internal temperature of certain thermal chambers.

Once properly isolated, each thermal chamber (e.g., 150, 152) may have its own solution to remove excess heat. A typical heat sink design, that relies on natural convection, may work for most small isolation chambers. However, the thermal chamber housing the solid state switch 126 may require a more complex design.

As described above, solid state switches would likely be the main heat source inside the BPD 100. The peak rates of heat generation, typical during engine start cycles, can be exponentially higher than the steady state heat generation rates. Older and poorly maintained vehicles will have the longest duration and highest peak loads in a given vehicle category. Also, multi-start attempts will be more likely in these vehicles.

Figure 17:
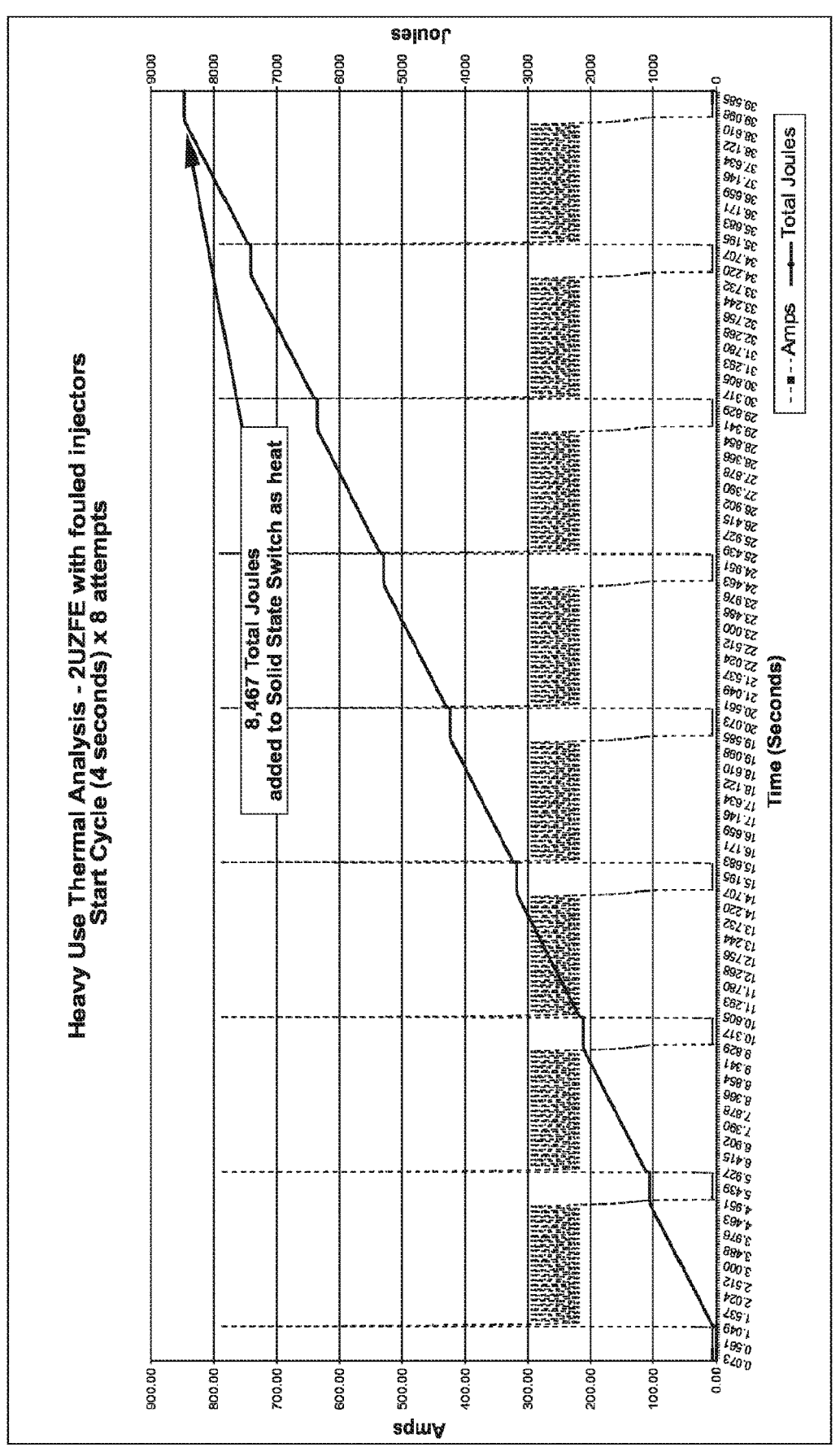
FIG. 17 is a chart illustrating results of a thermal-analysis exercise wherein a solid state switch is modeled without cooling throughout eight attempts at four-second start cycles on a 2UZFE 2004 Toyota 4.7L V8 with fouled injector plugs.

The graph in FIG. 17 illustrates the results of a worst-case thermal analysis exercise. A solid state switch is modeled without cooling on a 2UZFE 2004 Toyota 4.7L V8 with fouled injector plugs. The start cycle duration is four seconds and is attempted eight times. The solid state switch received 8,467 Joules and an average heat load of 213 watts. This combination of long duration and multi-starts creates a worst case scenario that drives sizing of the thermal design solution for certain preferred implementations of the BPD 100.

Active Thermal Management

For high demand applications, be it tight packaging, low air flow, sustained high temperatures or a combination thereof, a passive thermal solution is not enough. If only passive solutions are considered, then the final packaging will be prohibitively large and economically nonviable because the solution will be required to cover all outlier occasions, regardless of how rare.

Figure 9:
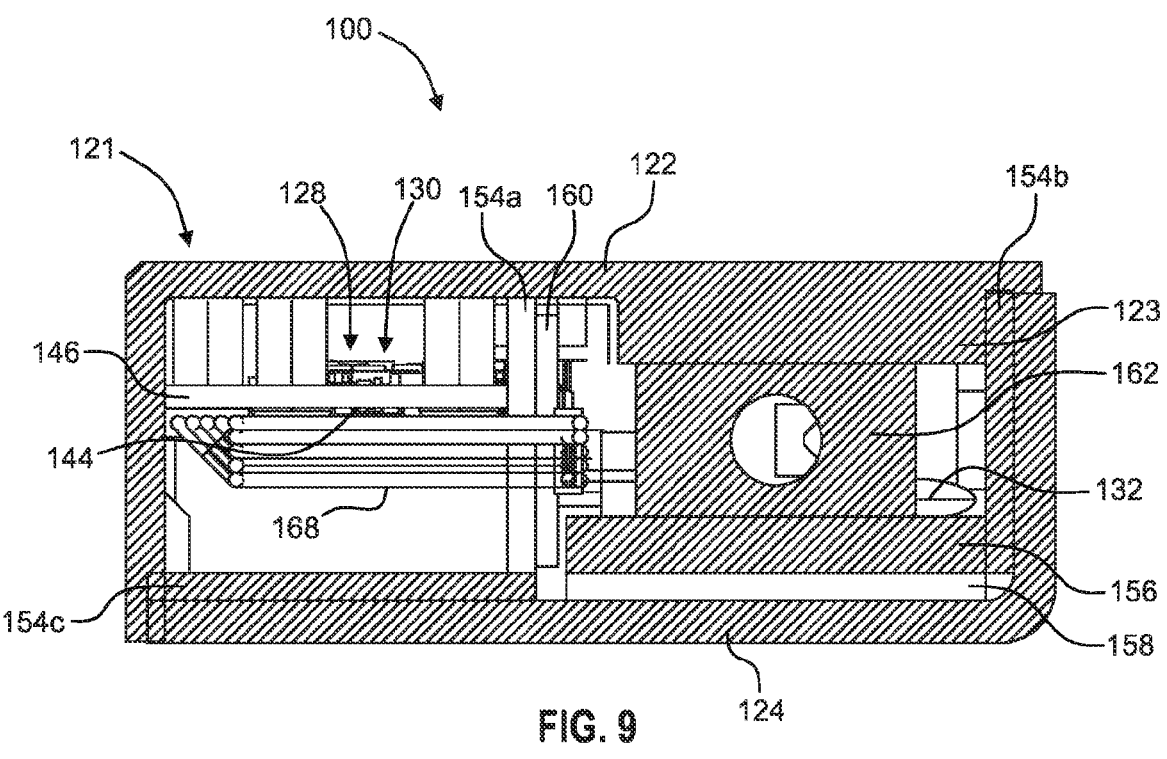
FIG. 9 is a diagrammatic cross-sectional view taken along lines 9-9 in FIG. 4.
Figure 10:
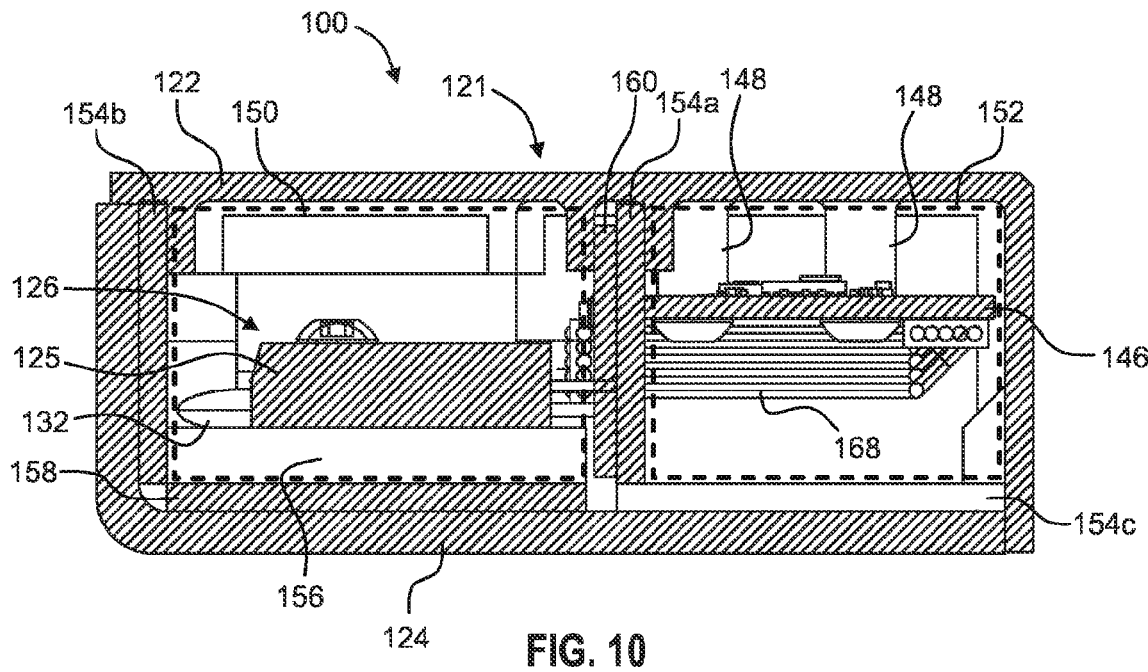
FIG. 10 is a diagrammatic cross-sectional view taken along lines 10-10 in FIG. 4.
Figure 11:
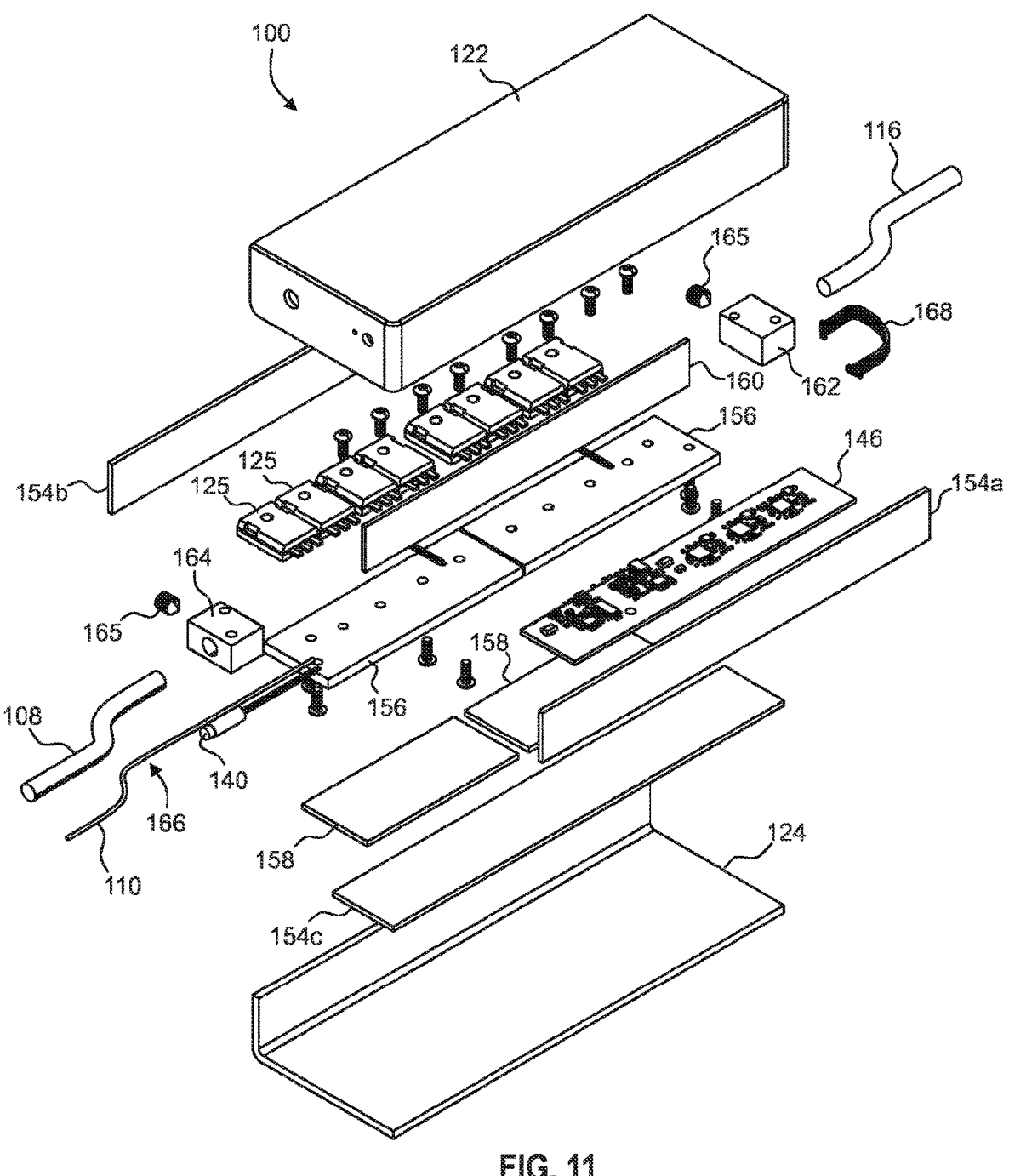
FIG. 11 is a diagrammatic exploded view of the example vehicle battery protection device of FIG. 3.
Figure 12:
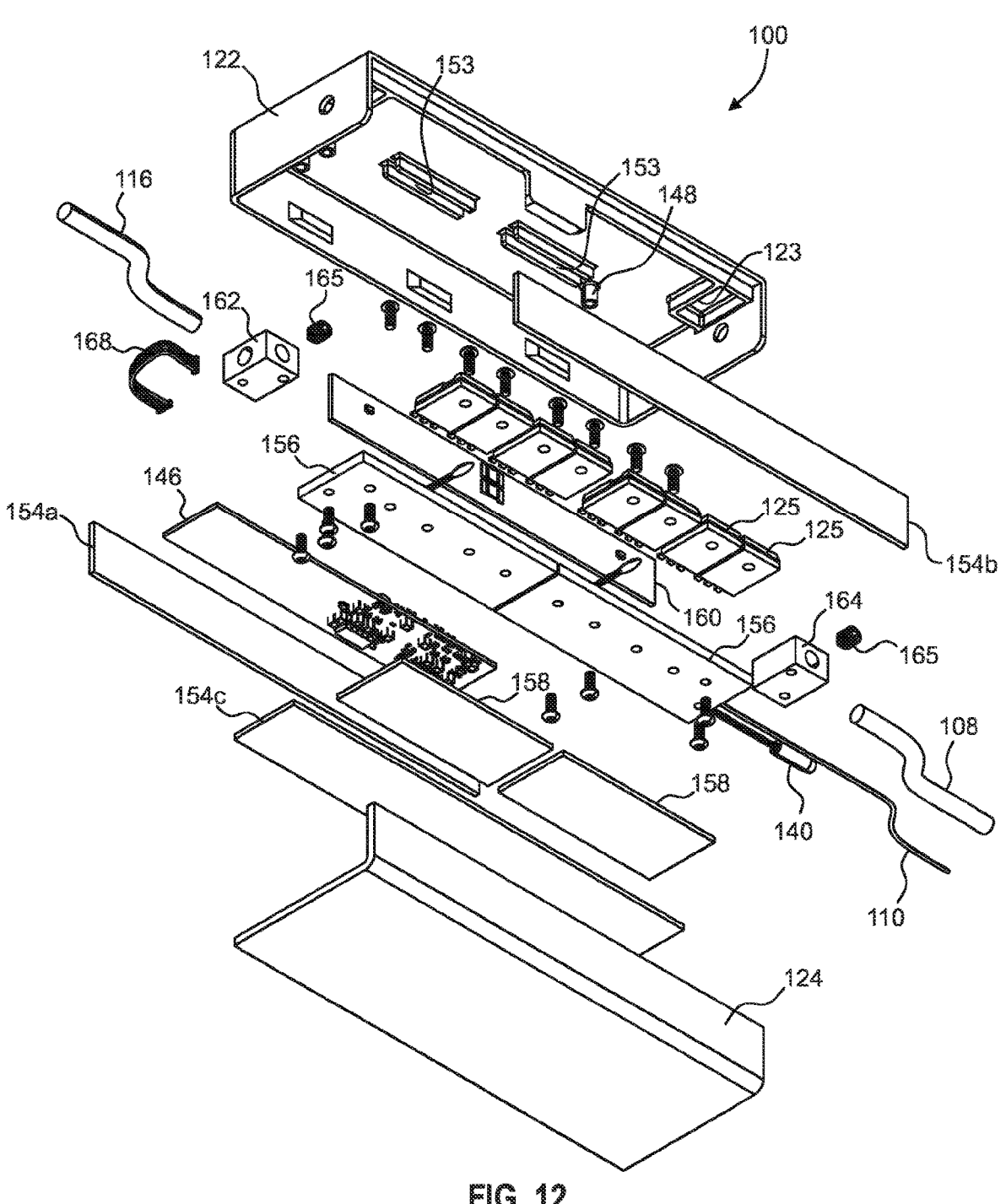
FIG. 12 is a further diagrammatic exploded view of the example vehicle battery protection device of FIG. 3.

Referring to FIGS. 9 and 10, in high demand applications, thermal loads will most likely require a separate or secondary heatsink 124 away from the solid state switch 126. In this configuration, a small conduction path paired with an active conduction path (e.g., Peltier device 158) could allow for slow and fast methods of heat transfer. The secondary heatsink 124 will also be free to rise to a higher temperature, like 225° C., without jeopardizing the integrity of the solid state switch 126. In the example BPD 100 implementation shown in FIGS. 3-12, the small thermal conduction path is through potting solution surrounding the MOSFETs, and can transfer, for example, 9 watts continuous. The active thermal conduction path may be, for example, through the Peltier device 158 and the external "L" shaped heatsink 124. This can transfer, for example, 140 watts continuous. In this scenario, the Thermal Safety Algorithm would be responsible for monitoring all relevant temperatures and managing the active thermal conduction. Other active devices could be utilized besides a Peltier material, such as a mems-based active cooling devices or an electric fan. In a cold environment, a resistive heater or Peltier material wired in reverse could be used to maintain minimum operating temperatures.

Notably, the underlying goal of a battery protection device is to preserve the state of charge (SOC) of the battery. Consequently, battery protection devices must be designed to be low energy consuming products. If a battery protection device consumes too much energy in order to operate then it will contribute to battery SOC reduction and exasperate the problem instead of preventing it. Conventionally, the use of active devices will be counter to the general battery protection device goal of low energy consumption. Use of these solutions could be delayed by the Thermal Safety Algorithm disclosed herein until the vehicle engine is running or a battery charger is attached. In one possible scenario, a vehicle may have a documented history (e.g., documented in the Vehicle-Use Model disclosed herein) of starting with a short duration load, the battery SOC is low, as the vehicle has been sitting for a prolonged period of time so heat loads are low. The user activates the BPD 100, and the dynamic electrical loads indicate an engine start is being attempted. This delay would obviously cause increased switch temperatures, but would be reasonable and align with vehicle-use patterns recorded in the vehicle-use model of the present disclosure.

Safety Comparator for Active Safe Operating Area (SOA) Enforcement

In an effort to maximize the operating window of the BPD 100 system, while controlling risk, the most critical elements need to be allowed to operate safely near their respective limits. The most critical element is the solid state switch 126 and maximum electrical power, or more usually maximum electrical current, is the key limiting factor. A main software module, the Thermal Safety Algorithm 208, operates as a forward-looking process to predict loads and proactively respond, however this software takes time to process and loop. Depending on the MCU 128 in the BPD 100 and which power mode the MCU 128 is operating in, this process loop can take, for example, 10 ms to 250 ms. A hardware safety measure is needed to ensure safety between MCU process cycles. A high-speed comparator circuit (e.g., shown at 149), built around a common conventional chip such as the LM139, could have a response time of less than 2 μs or 5,000× faster. A comparator circuit 149 acting as a safety comparator would actively compare electrical current passing through the switch 126 with an MCU-given reference setpoint. The Thermal Safety Algorithm 208 may be configured to update and adjust the safe operating area (SOA) safety thresholds up and down, including the maximum switch current 278, based on the thermal environment and design specifications given by the solid state switch 126 manufacturers. The safety comparator circuit 149 should disable the solid state switch 126 if the electrical current load crosses the given setpoint and should notify the MCU 128 that an intervention scenario happened. Thus, in preferred implementations of a BPD 100 having a safety comparator 149, the key responsibilities of that safety comparator 149 are (a) actively compare the switch current to the most recent MCU reference setpoint; (b) disable the solid state switch if the electrical switch current is greater than the reference setpoint; (c) signal the MCU 128 that an intervention scenario has taken place; and (d) enable the solid state switch 126 only when an "all clear" signal is given by the MCU Electrical Management System.

Software Aspects and Functional Design

Figure 18:
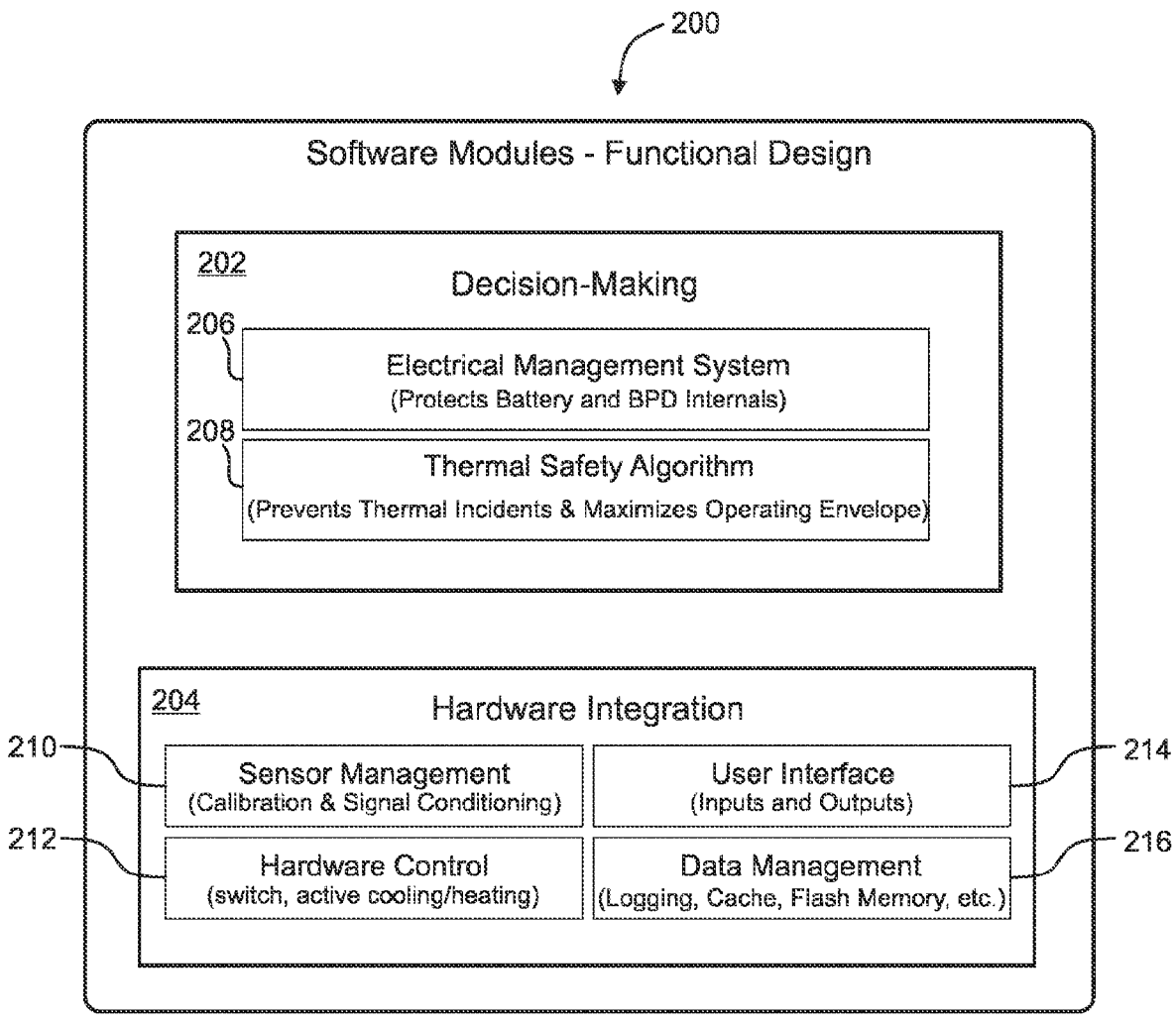
FIG. 18 is a block diagram illustrating software module organization in one non-limiting example vehicle battery protection device in accordance with the present disclosure.

Referring to FIG. 18, software modules may be organized into two main groups: one which supports specific hardware integration and one that interprets data and makes decisions. The decision-making group 202, which may be comprised of the Electrical Management System (EMS) 206 and the Thermal Safety Algorithm (TSA) 208, has particularly unique abilities and attributes. More details of the EMS 206 and TSA 208 are described below.

Electrical Management System (EMS)

Referring to FIG. 18, in preferred implementations of the BPD 100, the Electrical Management System (EMS) 206 may be responsible for making basic logic decisions and may have code similar to a typical advanced battery protection device. For example, the EMS 206 may be configured to monitor voltage and current sensors and make decisions to enable or disable the solid state switch 126. In particular preferred implementations of the BPD 100, the EMS 206 may have the following four key responsibilities: (a) protect the vehicle battery 104 from overdraw (e.g., monitor battery energy state and disconnect before the vehicle 102 overdraws the battery 104); (b) interpret user input requests and execute those requests if safe (e.g., startup, shutdown, override shutdown, etc.); (c) verify with the TSA 208 that temperatures are nominal and authorized to operate; and (d) enforce safety thresholds received from TSA 208, for voltage and current parameters.

Battery Health and Charge Status

The Electrical Management System (EMS) 206 may be configured to track the electrical energy going into and out of the vehicle battery 104. Using a combination of battery voltage, electrical current flow, and ambient temperature, the EMS is able to identify when the vehicle battery 104 is charging, discharging, estimations of total energy capacity, changes to total energy capacity, energy available in the battery as a percent of capacity, peak power output capacity, and changes to peak power output capacity.

Figure 49:
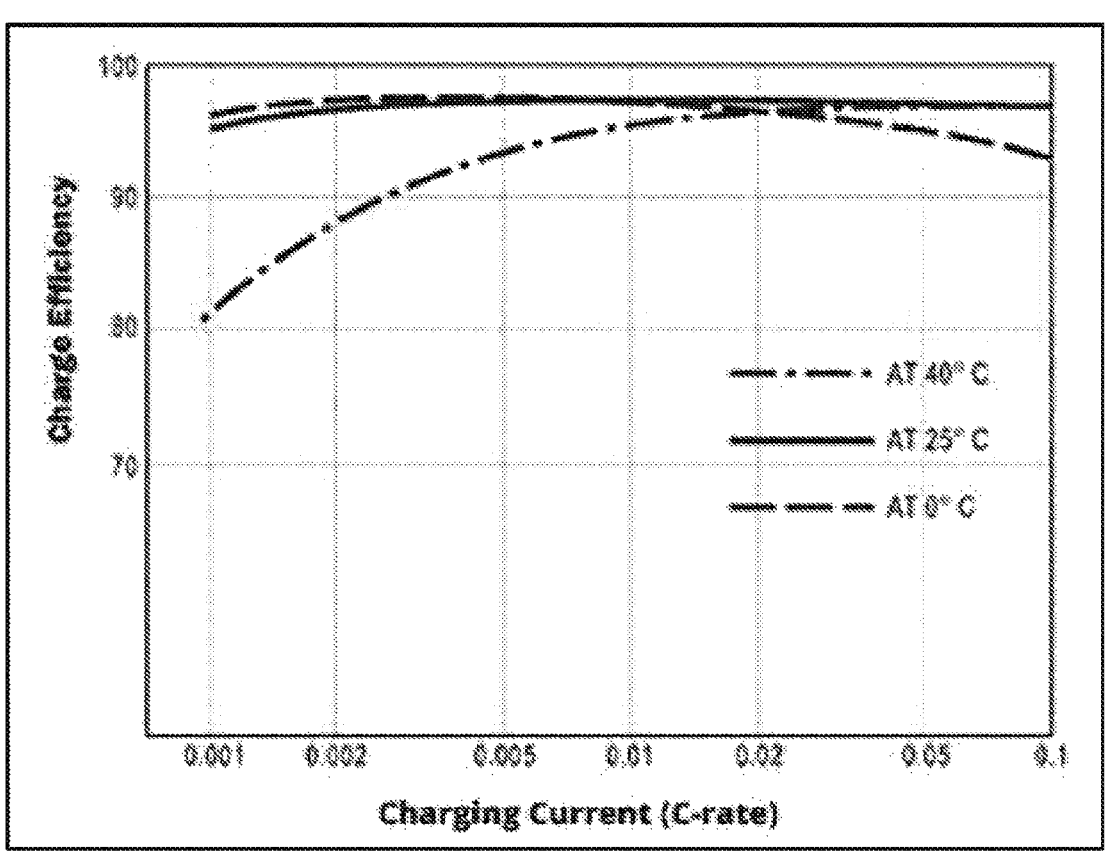
FIG. 49 is a chart illustrating the charge efficiency of a lead-acid battery.

Vehicles are typically designed to fully charge their batteries during use. At full charge, a common lead-acid 12 v battery, held at a float charge voltage (e.g., commonly between 13.5 to 14.1 volts), will have less than 0.2 amps of current consumption. This allows the EMS 206 to have a frequently occurring data point to compare battery historical statistics to. The EMS 206 may be configured to monitor energy flow out of the vehicle battery 104 over time to estimate energy loss and battery voltage sag under multiple vehicle loads to estimate peak power capacity. Battery voltage sag under load is the standard test protocol for verifying a battery's peak power output capacity or "health" in relation to original specification. The ambient temperature 312 and battery charging current rate must be considered when calculating the efficiency of the charge process, since the efficiency can vary greatly. See FIG. 49 for charge efficiency of conventional lead-acid batteries.

Alternator Health

A vehicle alternator is designed to generate enough electrical power to meet the demands of the vehicle and to recharge the vehicle battery. A common automotive test for alternator functionality is to test the output voltage. On a vehicle with the engine running, battery voltage will typically be within 2% of the alternator voltage, and thus alternator voltage can be derived if not measured directly. An alternator voltage between 14.0 to 14.5 volts is considered nominal. An output below 14.0 volts but above 13.5 volts is acceptable, for short intervals of 5 minutes or less, and only if the electrical current is near full output. Alternator voltage between 14.5 to 15.0 volts or 13.0 to 13.5 volts would indicate an alternator in "fair health" and in need of service. Alternator voltage above 15.0 volts or below 13.0 volts thresholds would indicate an alternator in "poor health" and in need of replacement.

Vehicle Wiring Health

The EMS 206 may be configured to monitor the battery voltage 292 and identify if the alternator or engine or both are stopped. The EMS 206 may also be configured to monitor the current leaving the vehicle battery 104 and track the current draw of the vehicle 102 over time after the vehicle engine is stopped and the vehicle is locked (also known as, a locked vehicle at rest.) The EMS 206 may be configured to track what is a nominal draw for the locked vehicle at rest and set this as a baseline. The EMS 206 may also be configured to register a change or increase in draw which would indicate an issue with the vehicle wiring or electrical system.

A vehicle with an electrical system or wiring problem, such as a corroded ground wire, a light that won't turn off, a computer that won't switch to low power mode, or a door sensor that incorrectly registers the door as open will all cause a locked vehicle at rest to draw more electrical current than usual. A modern vehicle, with a vehicle alarm and a wireless remote locking ability, has multiple computers as part of the vehicle electrical system. These computers typically require 5-10 minutes to switch to a low power mode for a locked vehicle at rest. A modern vehicle with a "good" vehicle wiring system will draw less than 0.3 amps of current 10 minutes after being locked for a vehicle at rest. A vehicle with a "good" vehicle wiring system and zero computers onboard will draw less than 0.1 amps of current within 1 minute after being locked for a vehicle at rest. A locked vehicle at rest with a current draw of 101-150% of nominal is "OK." A locked vehicle at rest with a current draw of 151-200% of nominal is "Fair" and may need service. A locked vehicle at rest with a current draw of more than 200% of nominal is "Poor" and in need of repair.

Thermal Safety Algorithm (TSA)

Conventionally, temperature-only disabling is referenced with simplistic thermostatic binary controls. This solution can lead to over cautious disabling of the battery protection device and reduce customer satisfaction. Referring to FIG. 19, a Thermal Safety Algorithm (TSA) 208 in accordance with the present disclosure is preferably configured to monitor, predict, maximize operating envelope, prevent thermal incidents and limit reactive controls. The TSA 208 actively considers design limitations from solid state switch 126 manufactures. It maintains an accurate thermal model 266 for forward-looking thermal analysis. It builds an intuitive vehicle-use model 246 to predict future vehicle states. The TSA 208 performs thorough analysis to predict high probability thermal risks, and chooses mitigation measures to proactively resolve and prevent thermal risks from becoming unrecoverable failures. Specific aspects of the TSA 208 are described in more detail below.

TSA Emergency Function

Referring to block 220 in FIG. 19, in preferred implementations of the BPD 100, if any temperature sensor (e.g., switch temperature sensor 132 or processor temperature sensor 134) crosses an emergency threshold, the solid state switch 126 is shut down and the emergency function 220 waits for temperatures to reduce to safe levels. This function essentially provides a safety backstop. The rest of the TSA 208 is preferably designed to prevent this path from needing to be utilized. Two key temperature sensitive components are the solid state switch 126 and the processor 128 (otherwise referred to herein as a microcontroller or MCU). This is because over temperature of the switch can result in thermal runaway and permanent damage, and over temperature of the MCU or EEPROM can result in random and erratic code execution.

TSA Switch Derating and Safe Operating Area (SOA) Assessment

Referring to block 222 in FIG. 19, this switch derating process software function actively monitors the environment and adjusts the safety parameters associated with the solid state switches 126. This type of active monitoring and parameter adjusting is extremely rare in the prior art. Typically, solid state switch manufacturers develop specification sheets with a 25° C. Safe Operating Area (SOA) graph, and engineers design a fixed environment around said specification. In reality, the usable SOA "shrinks" as temperatures increase. Ignoring the new limits of the SOA increases the risk of chip failure and thermal runaway. When a MOSFET fails, it internally welds the connection and is permanently on. There are limits to the SOA that are specific to the chip's design and the physical internal layout, but a large portion of the SOA "shrinking" can be uniquely managed or reversed by preferred implementations of the BPD 100 in according to the present disclosure due to its physical thermal design and novel system management. This aspect of the TSA 208, in preferred implementations of the BPD 100, is responsible for monitoring the switch temperatures, interpreting the SOA and adjusting safety thresholds, i.e., derating, for the EMS 206 to enforce. Three key responsibilities of this function 222 may be, for example, (a) protecting the BPD 100 from operating if sensed battery voltage 292 is above safe parameters. (e.g., 12v BPD connected to a 24v battery); (b) protecting the BPD 100 from operating if sensed battery voltage 292 is below safe parameters. (e.g., protects solid state switch 126 from thermal instability inside the advertised SOA); and (c) updating the electrical current safety thresholds based on temperature-dependent SOA curves for the solid state switch 126.

TSA Thermal Modeling

Referring to block 224 in FIG. 19, a thermal analysis calibration portion of the TSA 208 may be responsible for maintaining the model that is used to predict heat generation and movement throughout the BPD 100. This corresponds with how the BPD 100 is currently working. A hard coded thermal model 266, that is unique to the mechanical design and material characteristics of the BPD 100, is utilized. Referring to FIGS. 44A-44D, the thermal model 266 is preferably built using Fourier's Law of Thermal Conduction, Newtons' Law of Cooling, and Stefan-Boltzmann law. This model can be built by hand or built in a thermal finite element modeling software (i.e., Ansys®, Simulia®, Abaqus® FEA, Autodesk® Simulation, FreeFEM, etc.).

The thermal model 266 and current temperature sensor data may be utilized, and heat flux values calculated, for each of the thermal clambers (e.g., first thermal chamber 150 and second thermal chamber 152). Heat flux values may then be compared to previously predicted outcomes and any unexpected results may then be logged and flagged for incorporation into error correction coefficients 269 (e.g., 269a, 269b). Each error correction coefficient may be recomputed once statistically significant data exists. Data anomalies indicating possible sensor errors may be flagged and handled by the hardware integration functions. Manufacturing defects that can risk thermal stability (i.e., cold solder joints, missing thermal paste, voids in potting solution, etc.) can also be identified in this thermal modeling and flagged or corrected prior to major ramifications. Two key responsibilities of the thermal analysis calibration 224 function are (a) updating the thermal model's error correction coefficients 269 to maintain accuracy as materials age and thermal conductivity degrades; and (b) flagging data anomalies that could indicate hardware or manufacturing failures.

Regarding temperature sensor data anomalies, there are several data anomalies, with regard to a temperature sensor, that could trigger the TSA to flag it as "untrustworthy." For example, if the temperature sensor reading (a) oscillated faster than an expected range, as it would imply a wire or sensor failure; (b) went above or below an expected calibration range, as it would imply a sensor failure; or (c) changed more aggressively than expected, as it would imply a movement of heat not congruent with the thermal model or outside the laws of thermodynamics.

A switch temperature sensor 132 is a required item for safe operation. Unless there are redundant switch temperature sensors 132, preferred implementations of the BPD 100 may be configured to register a critical failure, disable the switch 126 and itself from use, and notify the user. If there are redundant switch temperature sensors 132, the software module "Sensor Management" 210 within "Hardware Integration" 204 may be configured to replace the data stream of the flagged sensor with data matching a redundant sensor or data approximated from a redundant sensor. The approximation may preferably be a predetermined formula based on the BPD 100 physical design and the thermal model 266. If a processor temperature sensor 134 or ambient temperature sensor 142 are flagged as "untrustworthy," the sensor data may be disregarded and the "Hardware Integration" 204 software module may be configured to replace the data stream of the flagged sensor with data approximated from a predetermined formula based on the BPD 100 physical design and the thermal model 266.

TSA Vehicle Profile System

Referring to block 226 in FIG. 19, a vehicle profiling function portion of the TSA 208 may be responsible for building and maintaining a tailored vehicle-use model. This model corresponds to how the customer uniquely uses their vehicle 102 and BPD 100. Utilizing time series database modeling techniques, this portion of the TSA 208 may be configured to gather data and predict how the customer will use the vehicle in the immediate near term. Over time, as patterns are identified, the prediction probabilities will increase to high confidence levels. If patterns shift drastically, the vehicle-use model 246 will purge older less relevant data.

Figure 50:
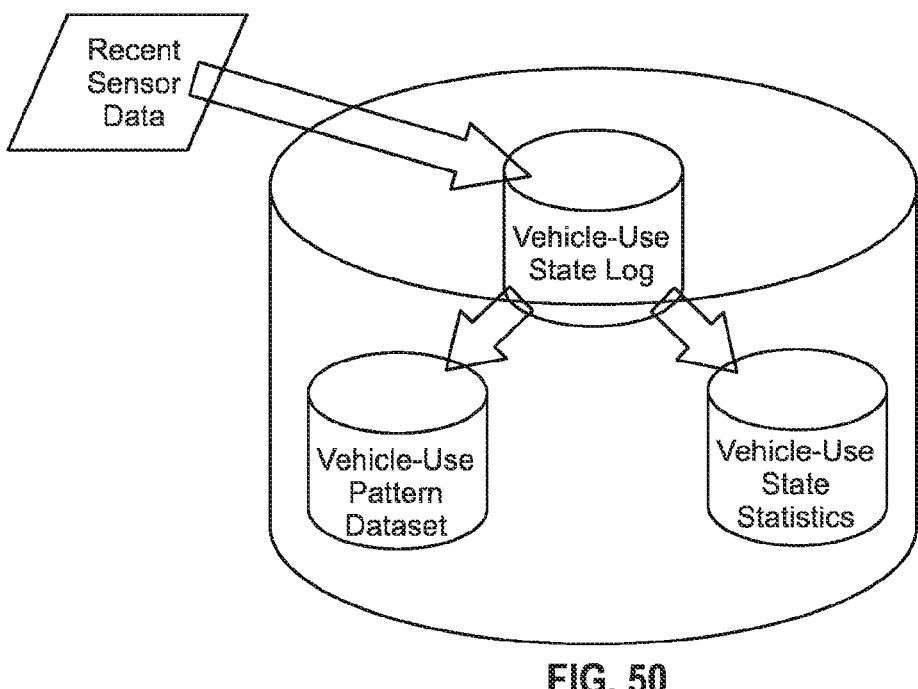
FIG. 50 is a data flow diagram illustrating one example vehicle profile system.

Referring to FIG. 50, the vehicle-use model 246 may be comprised of three different datasets or databases: a vehicle-use log (otherwise referred herein as an event history dataset 284), a vehicle-use state statistics database (otherwise referred to herein as a vehicle state event type statistics database 262), and a vehicle-use pattern database (otherwise referred to herein as a vehicle event pattern database 264). Current vehicle status and previous vehicle states are used to identify patterns and frequency of patterns. This data, when consolidated, results in high probability identification, or prediction, of the next vehicle-use state. Our confidence in the probability statistics are linked to the size and quality of the supporting dataset or database. The vehicle profile function 226 assigns confidence level scores to each vehicle-use pattern dataset (otherwise referred to herein as an event pattern dataset 271). There are many methods for calculating a confidence level. However, in general, the more data the higher confidence level scores assigned. Identifying which use state is expected next, with high confidence, will allow other TSA functions to identify corresponding thermal loads also with high probability. Key responsibilities for the vehicle profiling function may include, for example, (a) consolidating time series data and categorically flag vehicle-use states (see, e.g., FIG. 24); (b) consolidating associated sensor data for current vehicle-use state statistics (see, e.g., FIG. 27); (c) assigning confidence level scores to each pattern dataset within the vehicle-use model (see, e.g., FIG. 28); and (d) appending and updating the vehicle-use model 246.

TSA Reconciliation

Referring to block 228 of FIG. 19, a data reconciliation function of the TSA 208 may be provided. This function essentially combines data from the other functions together in order to predict, analyze and mitigate future thermal conditions of the BPD 100. The data reconciliation function 228 may comprise, for example, (a) at block 252, a process of generating future thermal loads calculations for high-probability future states; (b) at block 254, a composite risk analysis; (c) at block 256, selecting a mitigation strategy; and (d) at block 258, a process of informing the user and taking action.

TSA Thermal Predictions

Figure 31:
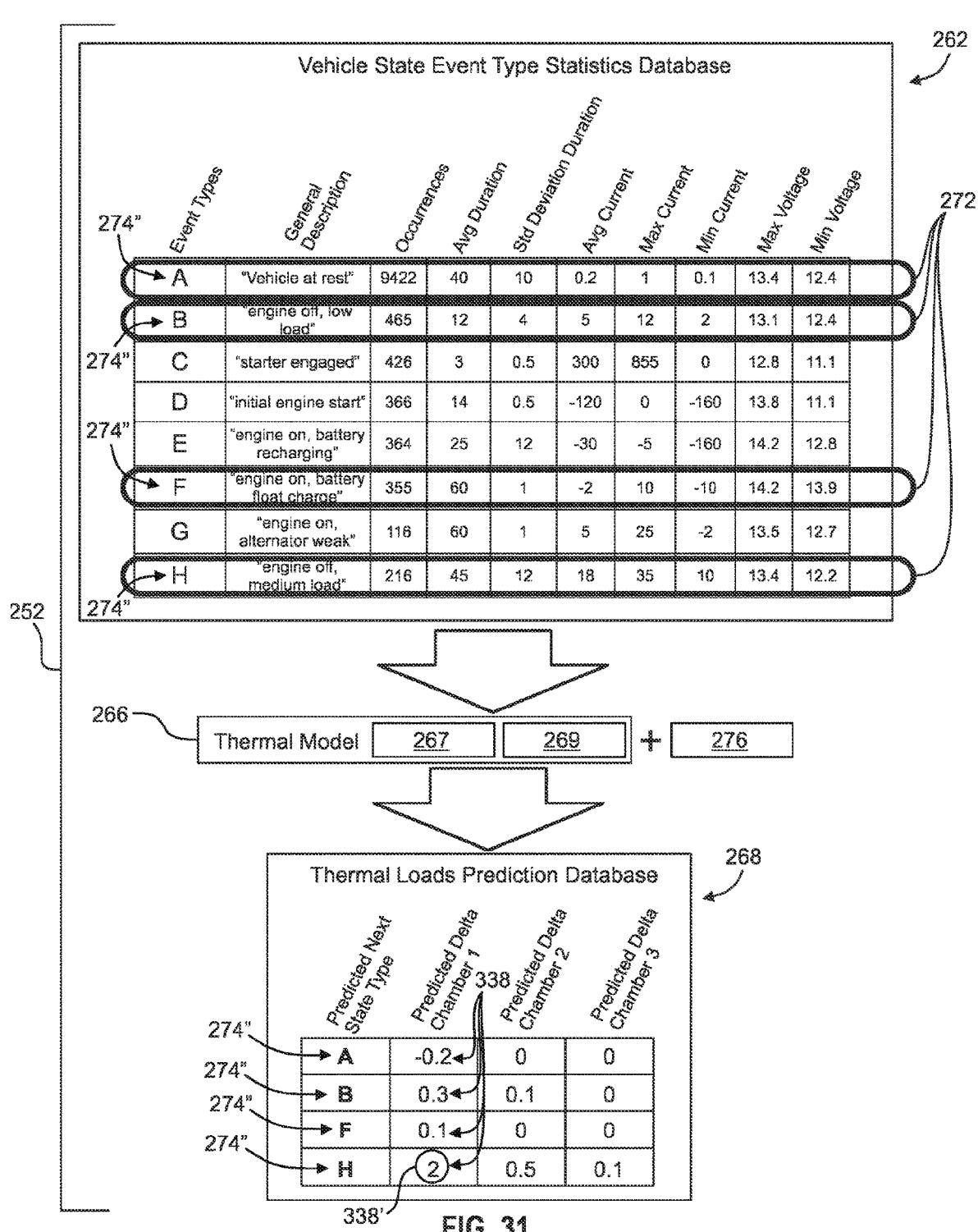
FIG. 31 illustrates one example of a process of generating a thermal loads prediction database based on referenced event type statistics datasets, recent sensor data, and the thermal model of the vehicle battery protection device, in accordance with aspects of the present disclosure.

Referring to block 252 in FIG. 19, this portion of the TSA combines recent data with both the thermal model 266 and the vehicle-use model 246. This function pulls the high probability future vehicle states and cross references those possible states with vehicle-use statistics to identify corresponding electrical load requirements, for the vehicle at the switch. Electrical loads and recent temperature readings are put into the thermal model. Referring to FIGS. 30 and 31, this yields multiple thermal predictions each with a probability score. One key responsibility of this function is to calculate multiple thermal predictions utilizing tailored models.

TSA Composite Risk

Referring to block 254 of FIG. 19, this portion of the TSA 208 executes a composite risk analysis. This is inspired by a business tool for risk management which graphs risk severity versus probability, or in this case thermal risk versus probability.

Figure 32:
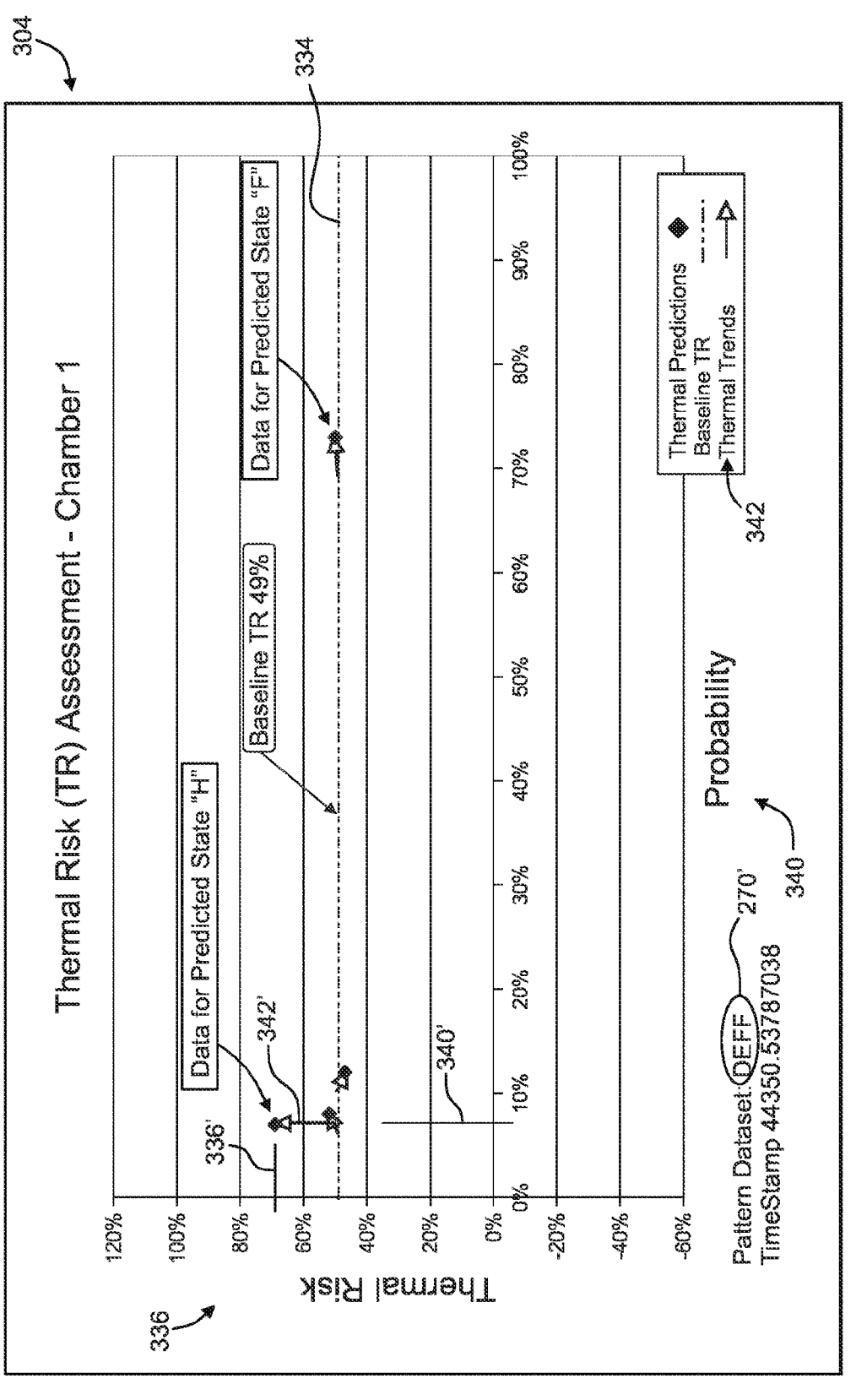
FIG. 32 illustrates one example of a thermal risk dataset for a corresponding thermal chamber of the vehicle battery protection device, shown in graphical form, in accordance with aspects of the present disclosure.
Figure 33:
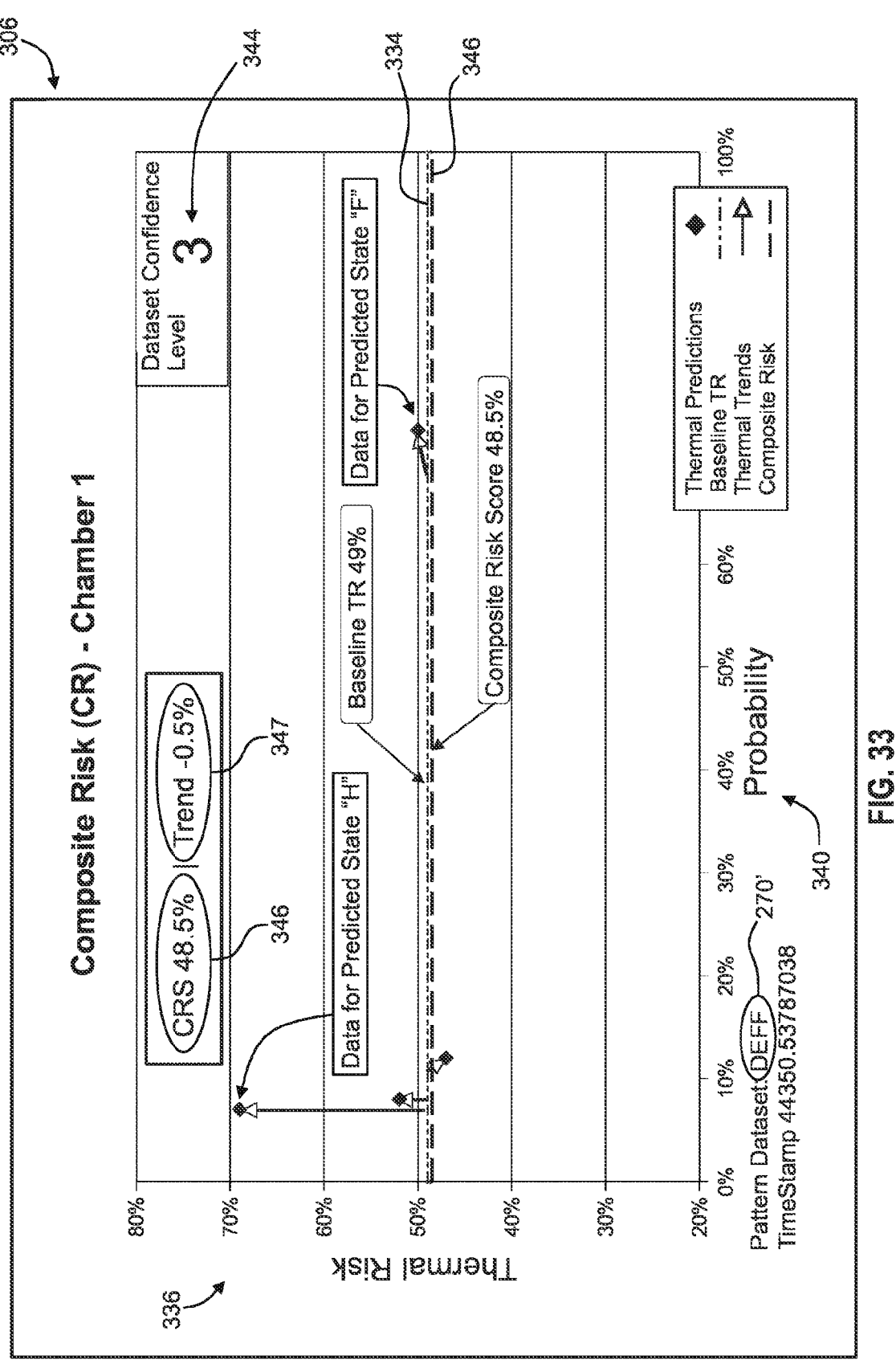
FIG. 33 illustrates one example of a composite risk dataset corresponding to the thermal risk dataset of FIG. 32, shown in graphical form, in accordance with aspects of the present disclosure.
Figure 34:
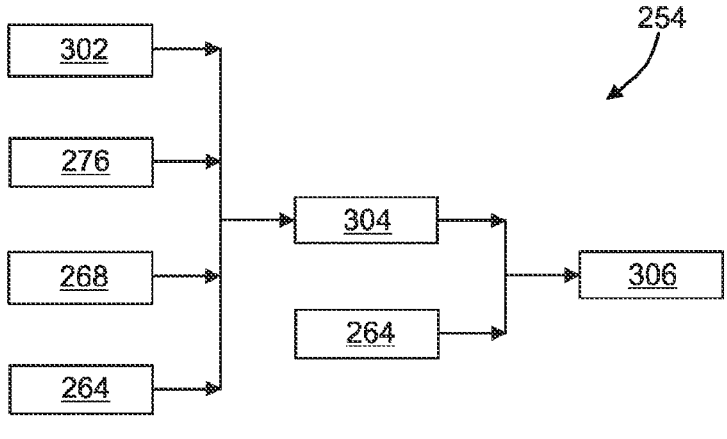
FIG. 34 illustrates one example of a process for conducting a composite risk analysis, in accordance with aspects of the present disclosure.

The thermal predictions, from the prior function block 252, along with updated SOA safety thresholds are used to generate predicted thermal risk scores 336 in percent. A large percentage indicates lack of margin remaining and a higher risk of thermal runaway. A small percentage indicates plenty of margin remaining and a lower risk of thermal runaway. Referring to FIGS. 32 and 33, current thermal data is used to generate a baseline thermal risk score 334. The baseline thermal risk score 334 is compared to the thermal risk predictions 336 to generate thermal trend predictions 342 for each predicted next state event type 274″.

This analysis may then be reduced to one composite risk score 346. The confidence level 344 is used to determine how the composite risk score 346 will be defined, either based on the thermal risk prediction 336 of one of the predicted next state event types 274″, or a combination of two or more of the next state event types 274″. The confidence level scores may vary from high to low. For example, referring to FIG. 28, the confidence level 344 in particular implementations of the BPD 100 may include levels 1-4. Confidence level 1 may indicate a poor (e.g., unreliable) dataset and confidence level 4 may indicate a good (e.g., highly reliable) dataset. In such a scenario, the breakdown may follow, for example, the following scheme: If the confidence level is level 4, define the composite risk score 346 as the thermal risk prediction 336 corresponding to the next state event type 274″ having the highest probability of occurring next; If the confidence level is level 3, define the composite risk score 346 as the average of the thermal risk predictions 336 corresponding to the two next state event types 274″ having the highest probabilities of occurring next; If the confidence level is level 2, define the composite risk score 346 as the average of the two highest thermal risk predictions 336 regardless of their respective probabilities; If the confidence level is level 1, define the composite risk score 346 as the thermal risk prediction 336 corresponding to the highest thermal risk prediction 336, regardless of probability of the corresponding next state event type 274″. Once calculated, the new composite risk score 346 will also have a corresponding composite thermal trend 347. An example graph of a composite risk analysis (dataset) shown in FIG. 33. Key responsibilities of the composite risk analysis 254 may include (a) reconciling the SOA safety thresholds, thermal analysis and probabilities; and (b) generating one composite risk score 346 and composite thermal trend 347 for use in selecting mitigation actions.

TSA Mitigation Strategy and Implementation

Referring to blocks 256 and 258 of FIG. 19, the TSA 208 may include selecting a mitigation strategy and informing user and taking action. This portion of the TSA 208 is configured to evaluate which mitigation measures will be enabled or disabled, and set the appropriate flags for the Hardware Integration function to execute. Referring to FIGS. 36-40 for some examples, each mitigation measure may have a corresponding dataset that identifies the parameter limits for enabling and disabling. The composite risk score 346 and composite thermal trend 347 are the main parameters considered, but other input parameters may be considered. These datasets may preferably be hard coded and establish at the time the thermal and mechanical designs for the BPD 100 are established. FIGS. 36-40 provide non-exhaustive examples of mitigation measures (in the form of dataset graphs) for the following: active thermal device full; active thermal device pulse or partial; disconnect solid state switch; enable user thermal warnings; and prevent MCU deep sleep mode. Notably, hysteresis errors can be a problem with fast acting systems. Accordingly, when appropriate, mitigation measures may have different setpoints for rising triggers versus falling triggers. Consequently, falling triggers will typically be set at lower set points to prevent these errors.

Figure 35:
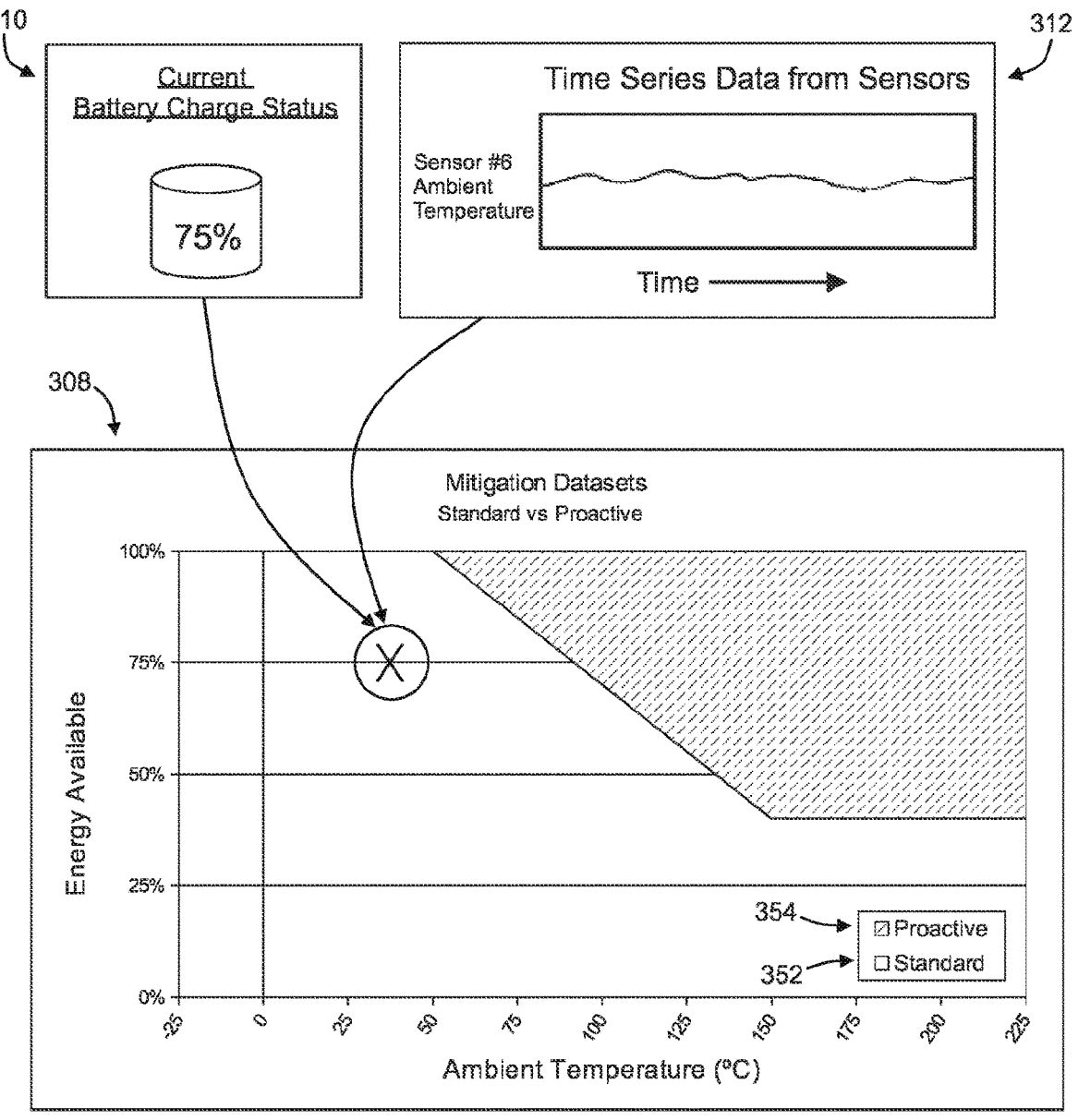
FIG. 35 illustrates one example of a process for selecting a mitigation dataset strategy based on present vehicle battery charge status and temperature sensor data, in accordance with aspects of the present disclosure.
Figure 36:
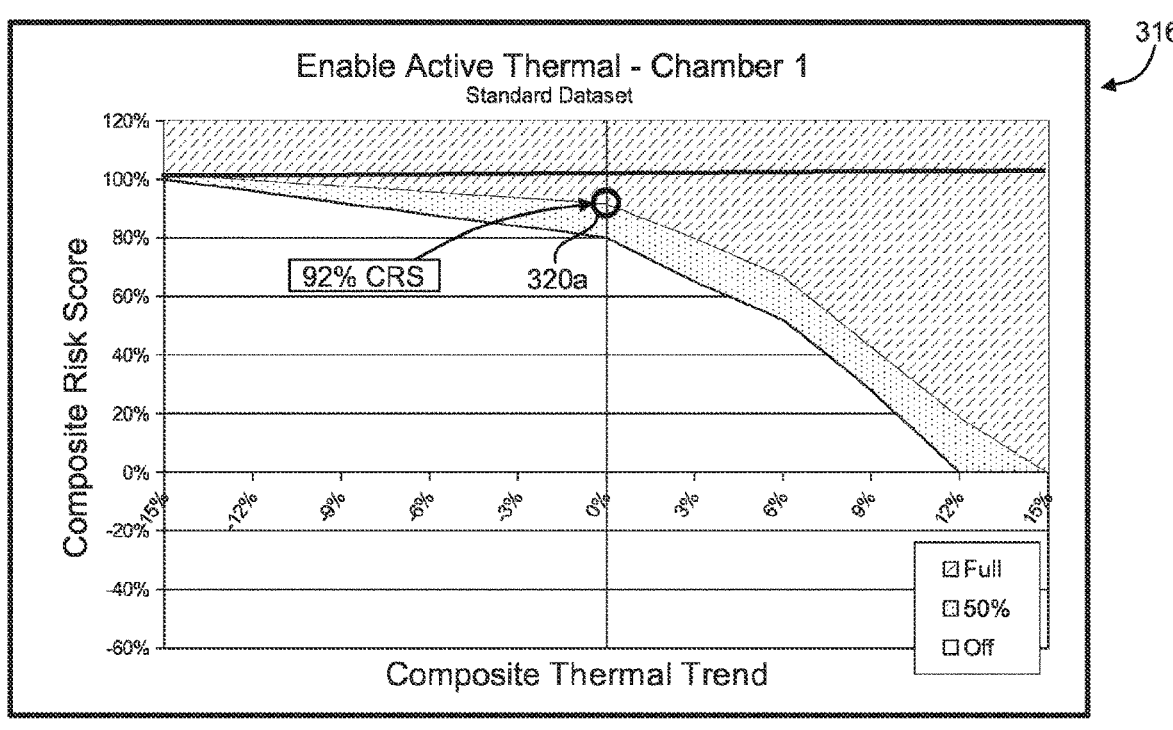
FIG. 36 illustrates one example of a baseline (standard) thermal mitigation dataset for a respective thermal isolation chamber, whereby the composite risk score and composite thermal trend dictate whether and to what extent activatable thermal devices of the vehicle battery protection device will be activated for that chamber.
Figure 37:
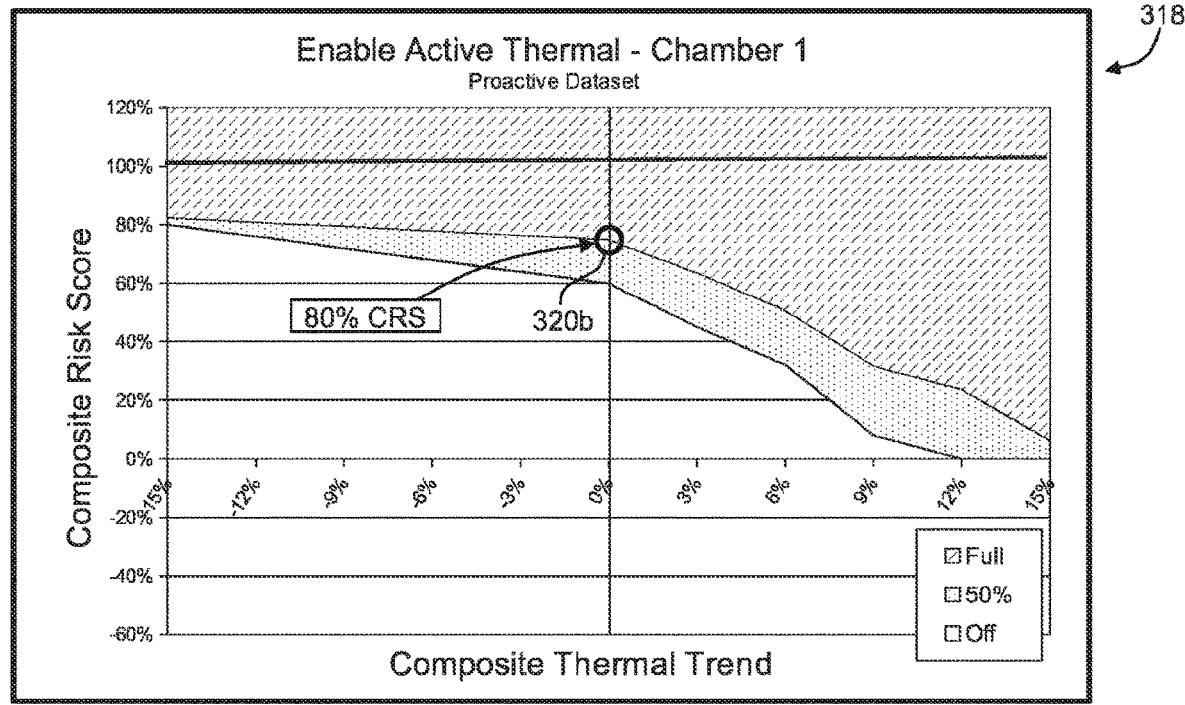
FIG. 37 illustrates one example of a proactive thermal mitigation dataset for the same thermal isolation chamber as in FIG. 36, whereby composite risk score and composite thermal trend still dictate whether and to what extent activatable thermal devices will be activated for that chamber, but wherein the proactive thermal mitigation dataset cases activation of activatable thermal devices at a lower composite risk score compared to the baseline thermal mitigation dataset.

The composite risk score 346 is a predicted future, and reacting to this prediction is a proactive action. Further proactive measures can be taken. Referring to FIG. 35, if patterns indicate a benefit, a proactive flag may be set that selects a nonstandard dataset with different thresholds for activating control measures. Many triggers could be used to set the flag. One example, illustrated in FIGS. 35-37, is a trigger to enable active cooling sooner. The triggers are high ambient temperature, outside the BPD 100, and abundant energy available at the battery 104.

Key responsibilities for using the composite risk score 346 and composite risk trend 347 as part of the reconciliation function 228 may include: (a) setting flags to execute in a highly proactive manner; (b) downselecting which mitigation measures will be enabled or disabled; and (c) setting flags for Hardware Integration functions to execute.

The following are summaries of certain non-exhaustive aspects which may optionally be included in certain preferred implementations of the BPD 100 disclosure herein:

Temperature information may be utilized by a microcontroller or a discrete circuit to inform a thermal safety algorithm Use of at least one temperature sensor to monitor active temperature of the switch.

If required, use additional temperature sensors, to monitor any additional temperature sensitive components that may have different temperature tolerances (e.g., the microcontroller or discrete memory chips, display screen, etc.)

May use temperature sensors inside and/or outside the battery protection device to give environmental awareness A temperature sensor could be a digital sensor, an analog sensor, a thermistor, or a derived signal possibly from monitoring resistance or voltage change in a thermally sensitive device.

A clock or timer could be utilized by the microcontroller or a discrete circuit to inform a thermal safety algorithm of user and vehicle-use patterns Vehicle-use patterns may be so transitory and extreme, vehicle impulse loads may require the thermal safety algorithm to temporarily lower temperature thresholds to ensure safe operation The thermal safety algorithm may also identify enough thermal margin exists such that it may be safe and necessary for the algorithm to temporarily overlook or discredit vehicle impulse loads.

A thermal safety algorithm could: disconnect the switch, warn the user, activate an active cooling device, develop an environment baseline for future actions, or inform an electrical safety algorithm to derate the current carrying capacity of the switch.

The thermal safety algorithm should preferably not be disabled by the user or overruled by any other system inside the battery protection device.

The thermal safety algorithm should preferably re-enable use after the thermal environment reduces to a safe level.

The thermal safety algorithm could calculate and consider the rate and impact of any active or passive cooling components.

An active cooling device could be a Peltier type device or a cooling fan.

An active cooling device could be used to actively move heat energy: either away from sensitive components, out of the enclosure, or into or out of a heat storage device.

A passive cooling component could be a heat storage device, heat sink, thermally conductive potting, wiring or PCB, metallic connectors, thermally conductive enclosure or mounting plate, etc, The thermal safety algorithm could consider the thermal rate of change and might predict a thermal incident is eminent and may preemptively command a disconnect of the switch.

It may be necessary to isolate temperature sensitive components or systems into Thermal Isolation Chambers.

Two or more Thermal Isolation Chambers may be employed, inside the battery protection device enclosure, to isolate components with a lower working temperature range, like a microcontroller, from heat sources or components with a higher working temperature range like switching components (e.g., MOSFETs or IGBTs.)

A thermal shield or a divider of low thermal conductivity may be utilized to separate or define the Thermal Isolation Chambers and ensure reduced heat transfer between chambers.

The thermal safety algorithm should preferably be configured to be aware of each thermal isolation chamber, their respective thermal tolerance as well as their current and possibly future thermal load.

It may be necessary or preferably for separate temperature data for each thermal chamber, either from discrete sensors or derived.

Referring to FIGS. 1A-1C, and FIGS. 2A-2C, a vehicle battery protection device 100 may be electrically connectable between a vehicle battery 104 and a vehicle electrical system 106 of a vehicle 102 for preserving the state of charge of the vehicle battery 104. Referring to FIGS. 6-9, preferred embodiments of a vehicle battery protection device 100 may comprise, for example, a positive connector 108, a negative connector 110, a primary vehicle connector 116, a solid state switch 126, a switch temperature sensor 132, a battery voltage sensor 136, a current sensor 138, one or more processors 128 and memory 130.

Referring to FIGS. 1A-1C, the positive connector 108 may be configured to be placed in electrical communication with a positive terminal 112 of the vehicle battery 104. The negative connector 110 may be configured to be placed in electrical communication with a negative terminal 114 of the vehicle battery 104. This electrical communication may be by way of, for example, clips, clamps, screws, press-fit, some combination thereof, or the like.

The primary vehicle connector 116 may be configured to be placed in electrical communication with a vehicle terminal of the vehicle electrical system 106, such as a positive vehicle terminal 119a or negative vehicle terminal 119b. Referring to FIGS. 1A and 2A-2C, certain embodiments of the vehicle battery protection device 100 may also include a secondary vehicle connector 118.

Figure 6:
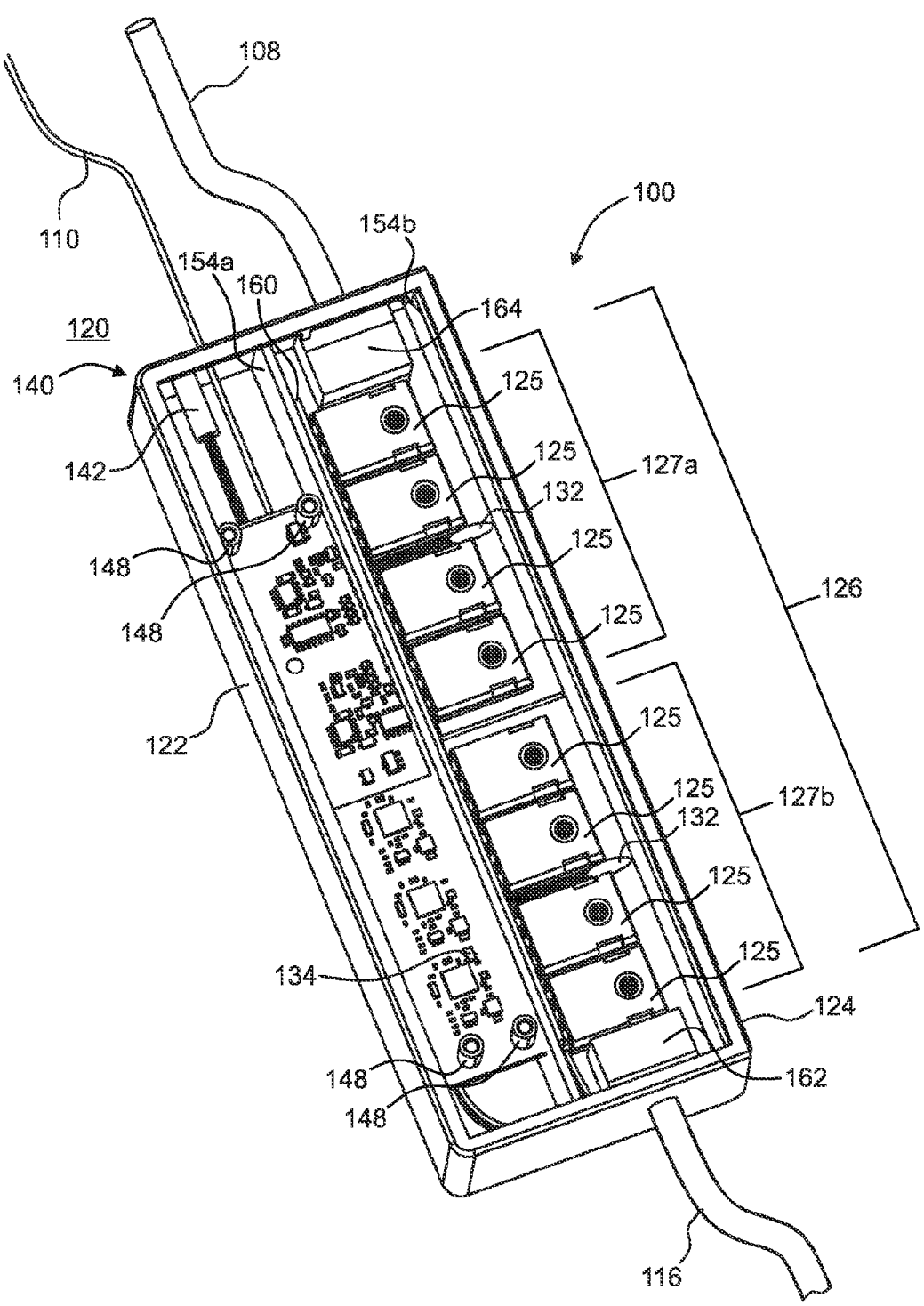
FIG. 6 is a diagrammatic perspective view of the example vehicle battery protection device of FIG. 3, with the top of the main enclosure removed to expose the internal features.

Referring to FIG. 6, the solid state switch 126 may be commandable between an on state and an off state. Referring to FIG. 1A, the on state allows current to flow between the vehicle battery 104 and the vehicle electrical system 106 through the solid state switch 126. Contrastingly, the off state prevents current from flowing between the vehicle battery 104 and the vehicle electrical system 106 through the solid state switch 126.

Referring again to FIG. 6, the solid state switch 126 may be comprised of one or more solid state switching devices 125 such as MOSFETs or IGBTs. Moreover, the solid state switch 126 may preferably be comprised of two groupings (127a and 127b) of solid state switching devices 125. The two groupings of solid state devices are preferably connected back-to-back allowing for bidirectional blocking or conduction of electricity. Solid state devices act similarly to a one-way valve and always allow some flow in one direction. However, unlike a one-way valve, solid state devices can be energized to allow better flow or two-way flow. Since each grouping (127a, 127b) has asymmetrical control, each is responsible for allowing or blocking flow from one direction. Combined, they allow for bidirectional control of electricity. One grouping blocks or allows energy flow from the battery 104, and the second grouping blocks or allows energy flow from the vehicle 102.

Figure 20:
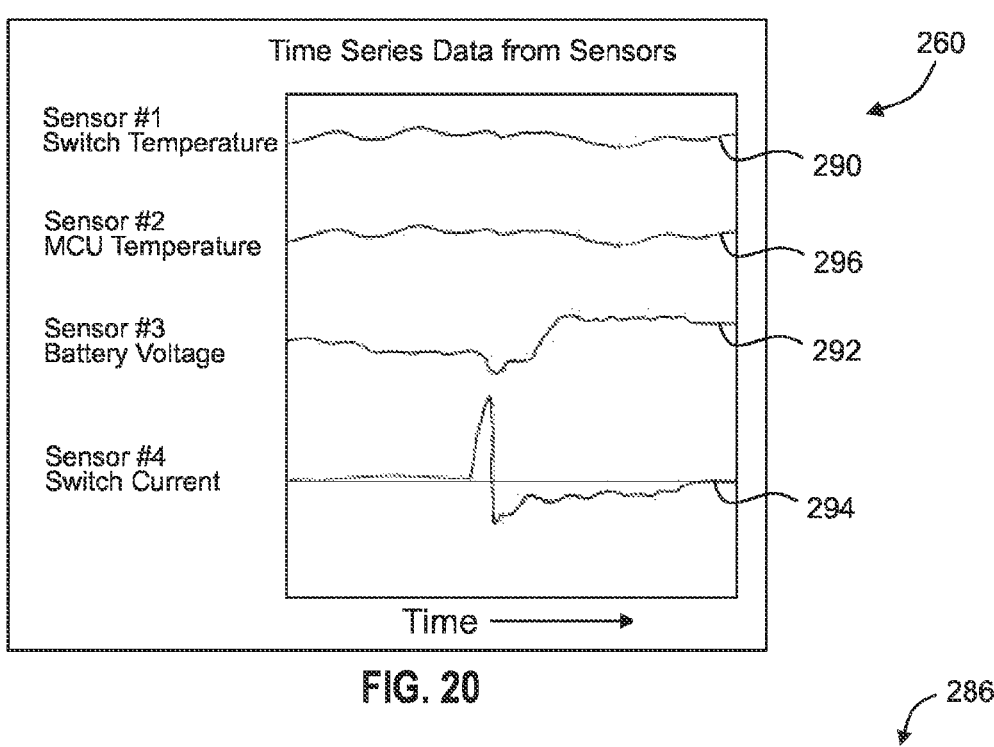
FIG. 20 is one example of a time series database illustrated in graphical form, reflecting sensor data logged by a processor in accordance with aspects of the present disclosure.

Referring to FIGS. 6 and 20, the switch temperature sensor 132, which may comprise two or more discrete sensors placed along the switch 126, may be configured to measure switch temperature 290 at the solid state switch 126.

Figure 7:
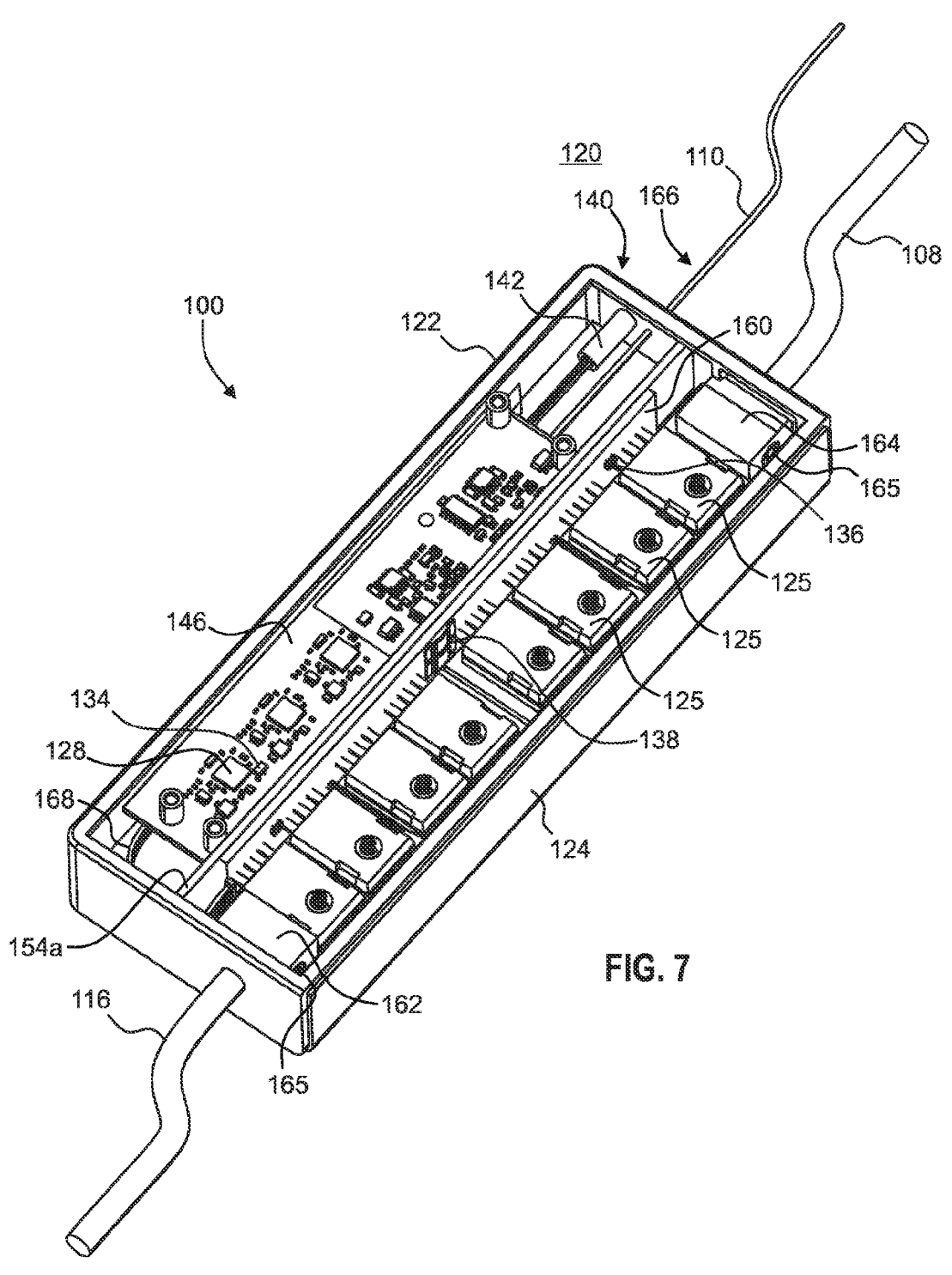
FIG. 7 is a further diagrammatic perspective view of the example vehicle battery protection device of FIG. 3, with the top of the main enclosure removed to expose the internal features.
Figure 8:
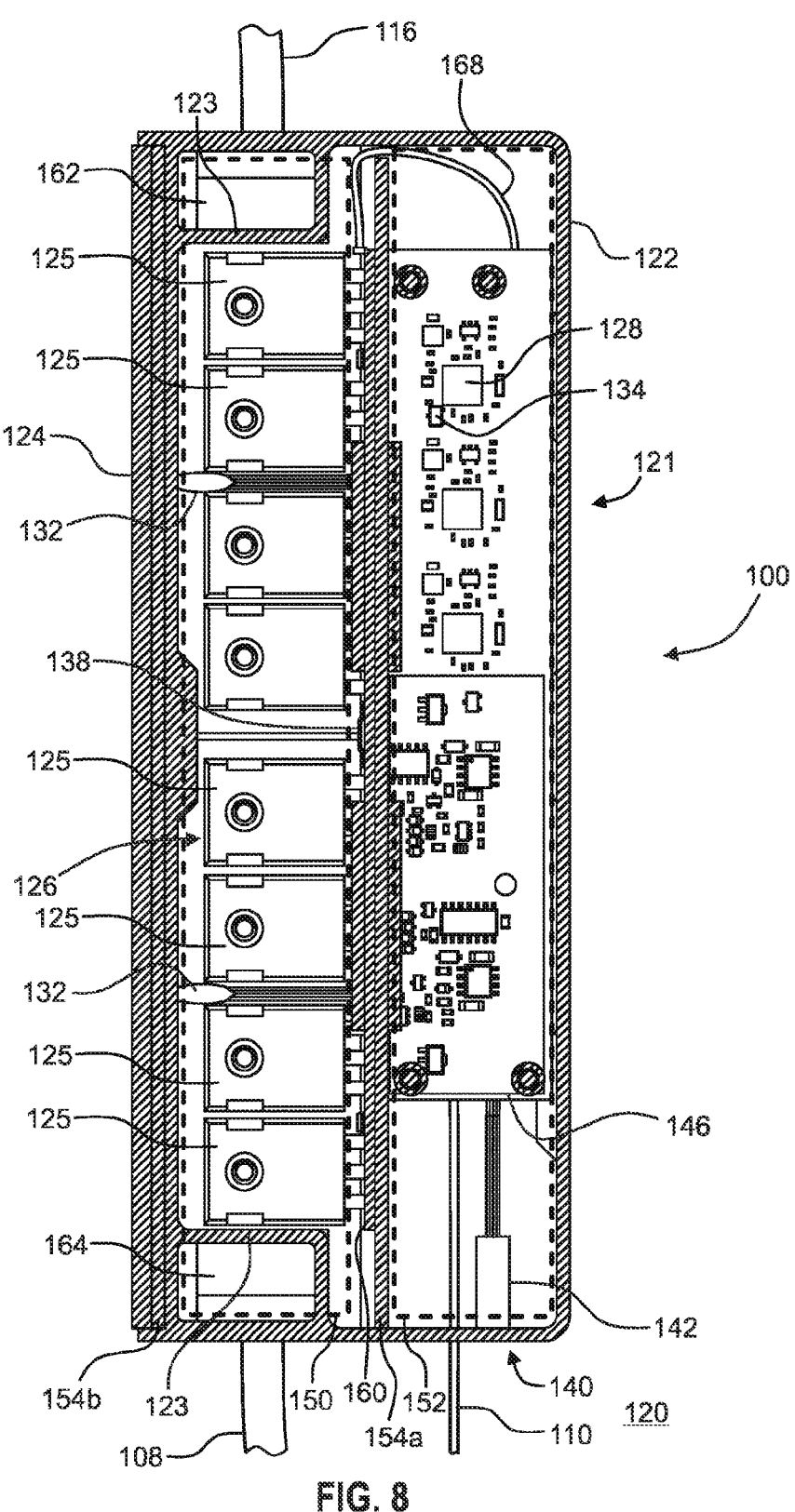
FIG. 8 is a diagrammatic cross-sectional view taken along lines 8-8 in FIG. 5.

Referring to FIGS. 7 and 20, the battery voltage sensor 136 may be configured to measure battery voltage 292 between the positive connector 108 and the negative connector 110.

Referring again to FIGS. 7 and 20, the current sensor 138 may be configured to measure switch current 294 defined by the current flowing through the solid state switch 126 Referring to FIGS. 14A, 14B and 18, the one or more processors 128 may be operably connected to the memory 130. The memory 130 may store one or more programs 200 (which may otherwise be referred to herein as software modules) configured to be executed by the one or more processors 128. Referring to FIGS. 18 and 19, the one or more programs 200 may preferably include instructions for executing a thermal safety algorithm 208.

Switch Derating Process

Figure 21:
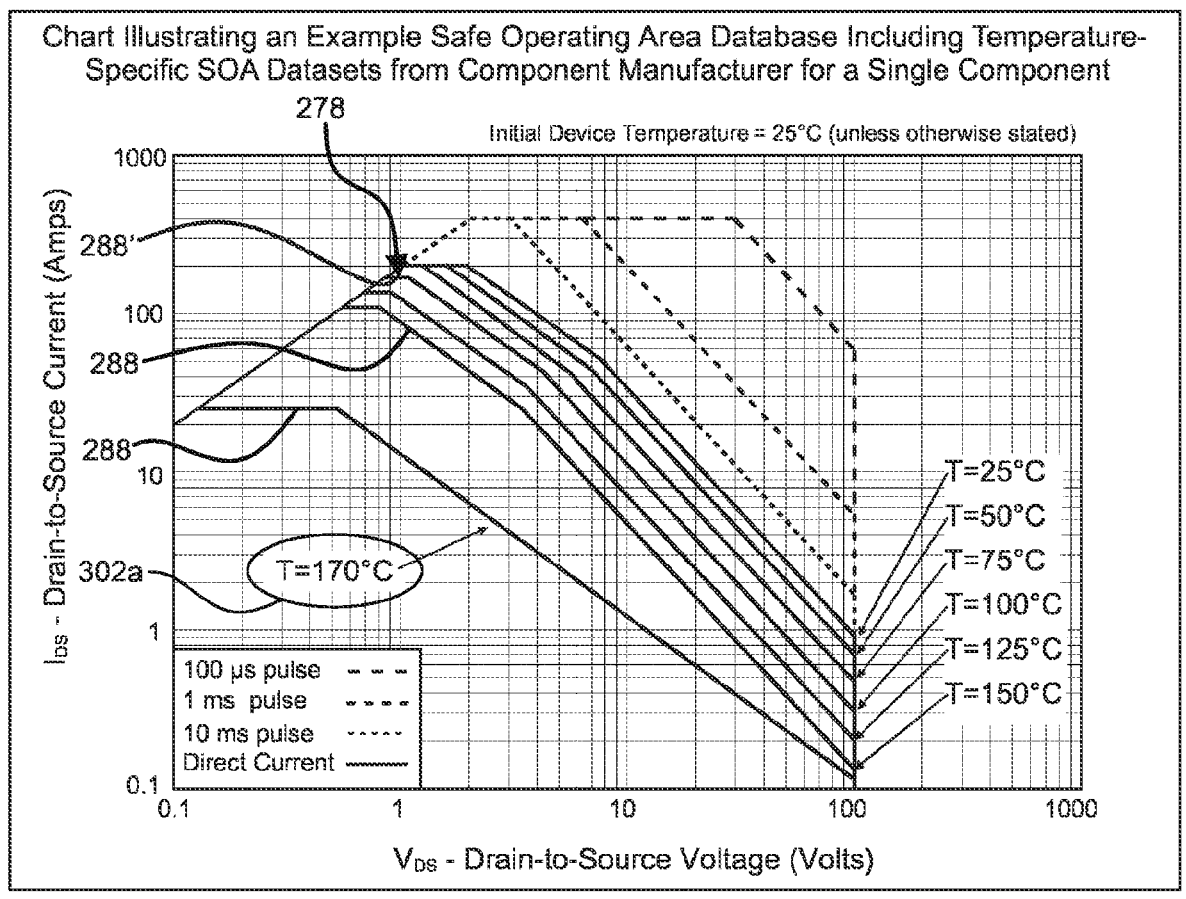
FIG. 21 is one example of a safe operating area (SOA) database illustrated in graphical form, in accordance with aspects of the present disclosure.

Referring to FIGS. 19-21, in particular preferred implementations of the vehicle battery protection device 100, the thermal safety algorithm 208 may comprise a switch derating process 222 including the steps of: (a) selecting, from a plurality of distinct safe operating area datasets 288 stored in a safe operating area database 286 pertaining to the solid state switch 126, a safe operating area dataset 288' corresponding to the switch temperature 290, and (b) limiting the on state of the solid state switch 126 based on the selected safe operating area dataset 288', the battery voltage 292, and the switch current 294. Moreover, the switch derating process 222 may preferably include changing the selected safe operating dataset 288' to another of the plurality of safe operating datasets 288 responsive to a corresponding change in the switch temperature 290.

Safety Comparator Aspects

Referring to FIG. 14B, certain preferred implementations of the vehicle battery protection device 100 may further comprise a safety comparator 149 configured to (a) compare the switch current 294 to a maximum current threshold 278 (see, e.g., FIG. 21) provided by the one or more processors 128, and (b) disable the solid state switch 126 if the switch current 294 exceeds the maximum current threshold 278, thereby preventing current from flowing through the solid state switch 126. In such implementation, the maximum current threshold 278 may be defined, at least in part, by the selected safe operating area dataset 288'. The safety comparator 149 may be further configured to send an intervention signal (e.g., by way of communications pathway 298b) to one of the one or more processors 128 indicating that the solid state switch 126 has been disabled by the safety comparator 149. Moreover, the safety comparator 149 may be further configured to re-enable the solid state switch 126 if the safety comparator 149 receives a clearance signal (e.g., by way of communications pathway 298a) from the one or more processors 128.

Thermal Analysis Calibration

Referring to FIGS. 8, 10, 44A and 44B, preferred implementations of the vehicle battery protection device 100 may comprise a main enclosure 121 having one or more thermal chambers (e.g., 150, 152) defined therein. Thermal chambers may otherwise be referred to herein as thermal isolation chambers. Each thermal chamber (e.g., 150, 152) may be in thermal communication with a corresponding sensor (e.g., 132, 134) configured to obtain chamber temperature data (e.g., 290, 296) from the respective thermal chamber. Referring to FIG. 19 and 44B-44D, in such implementations, the thermal safety algorithm 208, may further comprise a thermal analysis calibration 224 including referencing a thermal model 266. The thermal model 266 may be defined at least in part by materials-based and geometry-based thermal properties of the vehicle battery protection device 100. For each of the one or more thermal chambers (e.g., 150, 152), heat flux values may be calculated based on the thermal model 266 and the chamber temperature data (e.g., 290, 296). In preferred implementations of the vehicle battery protection device 100, the calculating of the heat flux values is further based on ambient temperature 312 of an environment 120 external to the main enclosure 121.

The thermal model 266 may preferably be built, for example, using Fourier's Law of Thermal Conduction, Newtons' Law of Cooling, and Stefan-Boltzmann law. Preferred embodiments of the thermal model 266 hard-coded to include a thermal properties model dataset 267 and variables for error correction coefficients 269. The thermal properties model 267 dataset may comprise, for example, the materials-based and geometry-based thermal properties of the vehicle battery protection device 100. Thus, the thermal model 266 may be characterized as a collection of formulas with a set of variables, such as the error correction coefficient variables. During or as a result of the thermal analysis calibration 224, variables plugged into this thermal model 266 may be changed.

Referring to FIGS. 8, 10, 44A and 44B, in certain preferred implementations of the vehicle battery protection device 100 with thermal chambers, a first thermal chamber 150 may house the solid state switch 126 and the switch temperature sensor 132, and a second thermal chamber 152 may house at least one of the one or more processors 128 and a processor temperature sensor 134. In such implementations, the switch temperature sensor 132 may be configured to measure switch temperature 290 from the solid state switch 126, and may also be the sensor configured to obtain the chamber temperature data from the first thermal chamber 150. Similarly, the processor temperature sensor 134 may be configured to measure processor temperature 296 from at least one of the one or more processors 128, and may also be the sensor configured to obtain the chamber temperature data from the second thermal chamber 152.

In particular implementations of the vehicle battery protection device 100, the one or more processors 128 may be configured to derive the ambient temperature 312 from the chamber temperature data obtained from the second thermal chamber 152.

Certain implementations of the vehicle battery protection device 100 may further comprise an ambient temperature sensor 142 for measuring the ambient temperature 312 from an environment 120 external to the main enclosure 121. The ambient temperature sensor 142 may be, for example, disposed within or attached to the main enclosure 121. Alternately or in addition, the ambient temperature sensor 142 may be configured to be positioned remotely to the main enclosure 121, and configured to be in wired or wireless communication with the one or more processors 128.

Figure 43:
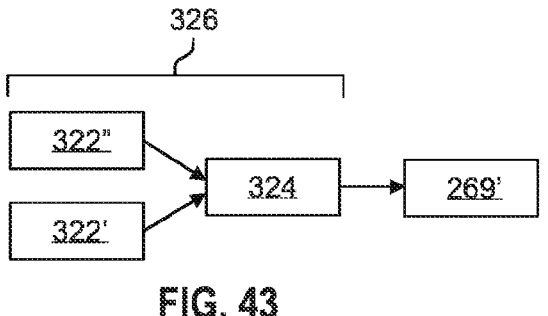
FIG. 43 illustrates one example of a process of updating thermal model error correction coefficients by way of comparing heat flux values calculated during a first operating period to heat flux values calculated during a second operating period.
Figure 44A:
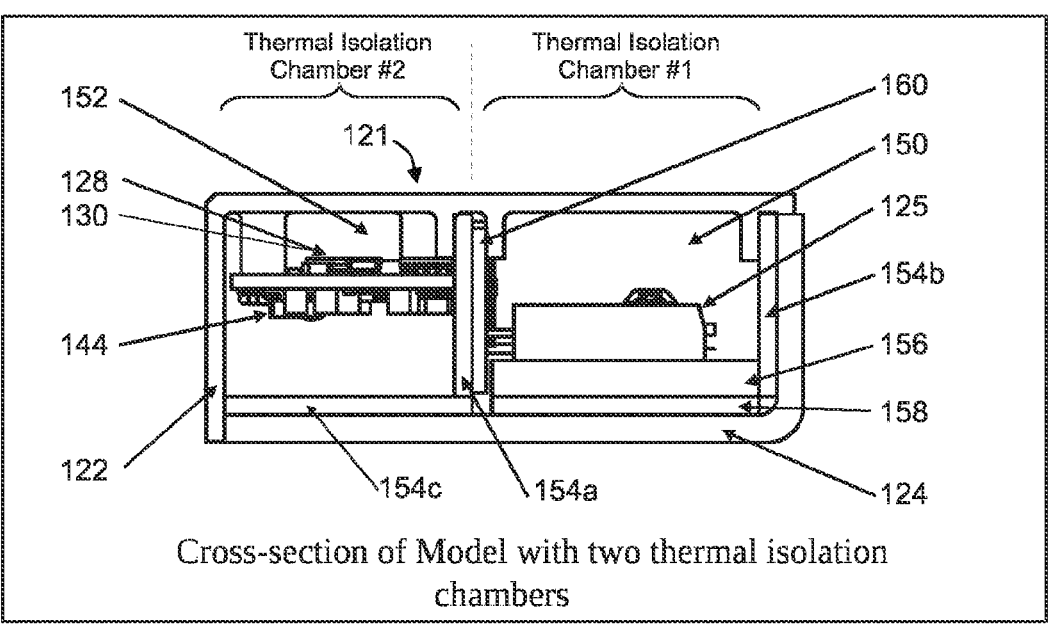
FIG. 44A illustrates one example of a cross-sectional model of a vehicle battery protection device with two thermal isolation chambers for use in developing and updating a corresponding thermal model, wherein this cross-section is taken along lines 44A-44A in FIG. 4.
Figure 44B:
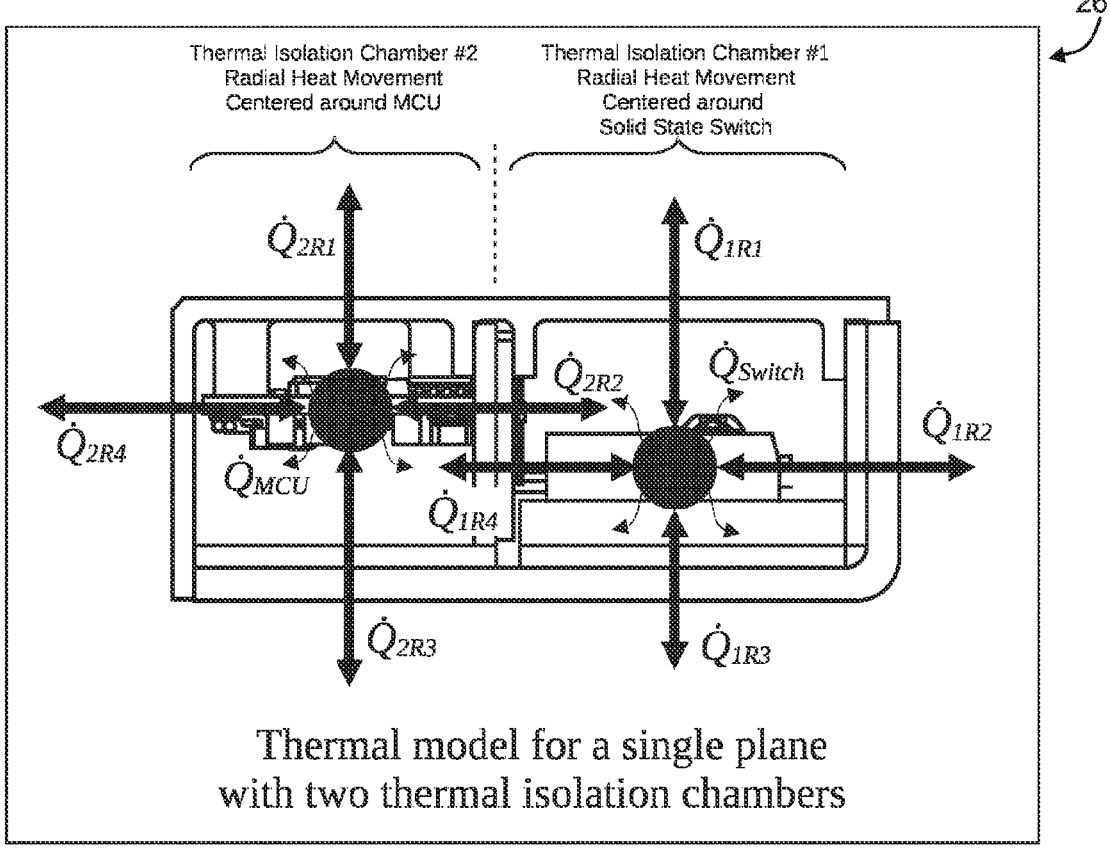
FIG. 44B is a diagram of an example thermal model based on the cross-sectional model of FIG. 44A.

Referring to FIGS. 22 and 43, in particular implementations of the vehicle battery protection device 100, the thermal analysis calibration 224 may further include, for each of the thermal chambers (e.g., 150, 152), calculating a heat flux differential 324 by comparing the heat flux values 322" calculated during a first operating period 350a to heat flux values 322' calculated during a second operating period 350b. One or more error correction coefficients 269 of the thermal model 266 may then be updated (see, e.g., 269') based on the heat flux differentials. Moreover, the thermal analysis calibration 224 may further include flagging the switch temperature sensor 132, the processor temperature sensor 134, or the ambient temperature sensor 142 if the flagged temperature sensor produces data outside of (a) a rated range for the flagged temperature sensor, or (b) a computed operating range for the flagged temperature sensor. The computed operating range may be, for example, dependent upon the concurrent temperature data of one or more of the non-flagged temperature sensors. Furthermore, the thermal analysis calibration 224 may further include (a) disabling the vehicle battery protection device 100 if the switch temperature sensor 132 is flagged, (b) disregarding measured processor temperature 296 if the processor temperature sensor 134 is flagged, and (c) disregarding measured ambient temperature 312 if the ambient temperature sensor 142 is flagged.

Referring to FIGS. 6-10, in certain implementations of the vehicle battery protection device 100, at least one thermal insulation member 154a may be disposed between the first thermal chamber 150 and the second thermal chamber 152.

Vehicle Profiling Process

Referring to FIG. 19, in particular implementations of a vehicle battery protection device 100, the thermal safety algorithm 208 may further comprise a vehicle profiling process 244. Referring to FIGS. 20 and 22, this process may include generating a time series database 260. The time series database 260 may include sensor data (e.g., 290, 292, 294, 296) measured from a plurality of sensors (e.g., 132, 134, 136, 138) during an implementation time interval 348. Referring to FIG. 23, state sensor parameters 314 corresponding to a plurality of distinct vehicle state event types 274 may be referenced, for example, from a state sensor parameter database 328. Notably, in certain implementations of the vehicle profiling process 244, the state sensor parameters 314 may initially be recorded as baseline parameters that can thereafter be overwritten by vehicle state event type statistics database 262 values once the average of the confidence level scores 344 for all event pattern dataset 271 in vehicle event pattern database 264 are sufficiently high (e.g., averaging level 3 or above).

Referring to FIGS. 23 and 24, as part of the vehicle profiling process 244, vehicle state events 300 may be identified by comparing the time series database 260 to the state sensor parameters 314. Each vehicle state event 300 is defined by an occurrence of one of the vehicle state event types 274. Referring to FIGS. 25 and 26, the vehicle state events 300 may then be recorded in an event history dataset 284, for example, by the one or more processors 128. Referring to FIG. 28, occurrences of event patterns 270 may be detected from the event history dataset 284. Each event pattern 270 may be defined by a distinct combination of a fixed number of sequential vehicle state event types 274. In the example event patterns 270 shown in FIG. 28, this fixed number of sequential vehicle states is 4. However, in alternate embodiments of the device 100, this fixed number may optionally be programmed to be greater than or less than 4.

Referring again to FIG. 28, as part of the vehicle profiling process 244, an event pattern database 264 may be generated. The event pattern database 264 may include, for each event pattern 270 detected within the event history dataset 284, an event pattern dataset 271. Each event pattern dataset 271 may include the number of occurrences 280 of the respective event pattern 270, and relative probabilities 340 for each of the vehicle state event types 274 to occur immediately after the event pattern 270. The number of occurrences 280 may be based, for example, on the number of instances of the respective event pattern 270 detected throughout an implementation interval 348. The implementation time interval 348 may be defined, for example, as being within the time the vehicle battery protection device 100 is electrically connected between the vehicle battery 104 and the vehicle electrical system 106.

Moreover, a confidence level 344 may be established for each event pattern 270. The confidence level 344 may be based on, for example, the number of occurrences 280 of the respective event pattern 270. As an example, referring to FIG. 28, confidence level 1 corresponds to the number of occurrences of the respective pattern being less than 200, level 2 corresponds to the number of occurrences of the respective pattern being from 200 to 599, level 3 corresponds to the number of occurrences the respective pattern being from 600 to 999, and level 4 corresponds to the number of occurrences of the respective pattern being 1000 or over. It is envisioned that, as the implementation time interval 348 gets longer, the initial confidence level thresholds may optionally grow, for example, proportionately with one another.

Referring to FIG. 27, the vehicle profiling process 244 may further include generating an event type statistics database 262 including, for each of the vehicle state event types 274 occurring in the event history dataset 284, an event type statistics dataset 272. The event type statistics dataset 272 may each comprise (a) average duration of the vehicle state event type, (b) average switch current, and (c) maximum switch current. The average switch current and the maximum switch current may correspond to the switch current data 294 of the solid state switch 126.

Referring to FIGS. 29 and 30, the vehicle profiling process 244 may further include determining a present event pattern 270'. The present event pattern 270' may be defined by a combination of a present vehicle state event type 274' and two or more sequentially preceding vehicle state event types 274'''. The sequentially preceding vehicle state event types 274''' may be defined as a sequence of vehicle state event types 274 which occurred immediately prior to the present vehicle state event type 274'. Referring to FIG. 30, the event pattern dataset 271 corresponding to the present event pattern 270' may be referenced, and may be referred to herein as the present event pattern dataset 271'. Predicted next state event types 274'' may then be identified. The predicted next state event types 274'' may be defined, for example, by state event types 274 in the referenced event pattern dataset 271' having a non-zero probability 340 of occurring immediately after the present event pattern 270'. It is envisioned that, in alternate implementations of the vehicle profiling process 244, a different threshold other than non-zero may be applied in defining the predicted next state event types 274''.

Thermal Load Prediction

Referring to FIGS. 19 and 31, in particular preferred implementations of the vehicle battery protection device 100, the thermal safety algorithm 208 comprises a thermal loads prediction process 252. The thermal loads prediction process 252 may include referencing the event type statistics datasets 272 corresponding to each of the predicted next state event types 274'', and generating a thermal loads prediction database 268. The thermal load prediction database 268 may be based on the referenced event type statistics datasets 272, the thermal model 266, and the recent sensor data 276. The thermal loads prediction database may include, for each of the thermal chambers, a predicted thermal load 338 corresponding to each of the predicted next state event types 274".

The thermal model 266 preferably includes the materials-based and geometry-based thermal properties of the vehicle battery protection device 100 (e.g., as coded in a thermal properties model dataset 267) and the error correction coefficients 269. Referring to FIG. 44C, certain of the error corrections coefficients (such as those shown at 269*a* for example) may be chamber-specific. Contrastingly, other error correction coefficients (such as those shown at 269*b* for example) may be material-specific. In either case, the error correction coefficients may correct for component degradation and manufacturing anomalies, and may preferably be adjusted by the one or more processors 128 (e.g., MCU) to ensure the thermal model 266 is always updated to represent real-world conditions.

Composite Risk Analysis

Referring to FIG. 19, in certain preferred implementations of the vehicle battery protection device 100, the thermal safety algorithm 208 may comprise a composite risk analysis 254. Referring to FIG. 32, the composite risk analysis 254 may include generating a first baseline thermal risk score 334 for the first thermal chamber 150. The first baseline thermal risk score 334 may be defined, for example, by a ratio of the switch temperature 290 to a first chamber temperature safety threshold (e.g., 302*a* in FIG. 21). For the first thermal chamber 150, a first thermal risk dataset 304 may be generated. The first thermal risk dataset 304 may comprise a thermal risk prediction 336 for each of the predicted next state event types 274". With reference to FIGS. 31 and 32 for example, state "H" is shown as one of the predicted next state event types 274". The thermal risk prediction may be defined, for example, by a ratio of the sum of the switch temperature 290 and the predicted thermal load (corresponding to the respective predicted next state event type) to the first chamber temperature safety threshold 302. For example, referring to FIG. 32, the thermal risk prediction for state event type "H" is illustrated at 336'. The first thermal risk dataset 304 may also comprise, for each of the predicted next state event types 274", the probability of the state event type occurring immediately after the present event pattern. For example, referring to FIG. 32, the probability for state event type "H" is illustrated at 340'. This matches the 7% probability of state event type "H" listed in the vehicle event pattern database 264 in FIG. 30. The first thermal risk dataset 304 may also comprise, for each of the predicted next state event types 274", a thermal trend prediction 342 defined by the difference between the thermal risk prediction 336 and the first baseline thermal risk score 334. For example, referring to FIG. 32, the thermal trend prediction for state event type "H" is illustrated at 342'.

Referring to FIG. 33, the composite risk analysis 254 may include setting, for the first thermal chamber 150, a first composite risk score 346 based on (i) the first thermal risk dataset 304; and (ii) the confidence level 344 corresponding to the present event pattern 270'. Moreover, a first composite thermal trend 347 may be generated for the first thermal chamber 150. The first composite thermal trend 347 may be defined by the difference between the first composite risk score 346 and the first baseline thermal risk score 334. A composite risk dataset 306, shown graphically in FIG. 33, may include the composite risk score 346 and composite thermal trend 347.

The composite risk analysis 254 may further include steps for yielding, for a second thermal chamber 152, a second composite risk score and a second composite thermal trend. These steps would be similar to those described above which yield, for the first thermal chamber 150, a first composite risk score and first composite thermal trend. Accordingly, FIGS. 32 and 33 provide analogous illustrations. For the second thermal chamber 152, a second baseline thermal risk score may be generated. The second baseline thermal risk score may be defined by a ratio of the processor temperature 296 to a second chamber temperature safety threshold. Also for the second thermal chamber 152, a second thermal risk dataset may be generated comprising for each of the predicted next state event types, (i) a thermal risk prediction defined by a ratio of the sum of the processor temperature 296 and the predicted thermal load to second chamber temperature safety threshold; (ii) the probability of the state event type occurring immediately after the present event pattern 270'; and (iii) a thermal trend prediction defined by the difference between the thermal risk prediction and the second baseline thermal risk score. For the second thermal chamber, a second composite risk score may be set based on (i) the second thermal risk dataset; and (ii) the confidence level 344 corresponding to the present event pattern 270'. For the second thermal chamber, a second composite thermal trend may be generated. The second composite thermal trend may be defined by the difference between the second composite risk score and the second baseline thermal risk score.

Referring to FIGS. 30 and 33, the confidence level 344 for the each event pattern 270 may significantly influence how a corresponding composite risk score 346 is set. For instance, in the example illustrated herein, confidence levels 344 for the event patterns 270 may be divisible into at least a level one, a level two, a level three and a level four, with level one being the lowest confidence level and level four being the highest confidence level. In such case, in setting the first composite risk score 346, if the confidence level 344 of the present event pattern 270' is a level one, the first composite risk score 346 may be defined as equivalent to the highest thermal risk prediction 336 of all of the predicted next state event types 274" in the first thermal risk dataset 304 (see, e.g., the data for predicted state "H" in FIGS. 32 and 33). If the confidence level 344 of the present event pattern 270' is a level two, the first composite risk score 346 may be defined as the average of the two highest thermal risk predictions 336 of all of the predicted next state event types 274" in the first thermal risk dataset 304. If the confidence level of the present event pattern is a level three, the first composite risk score 346 may be defined as the average of the two thermal risk predictions 336 of the predicted next state event types 274" having the two highest probabilities 340 of occurring immediately after the present event pattern 270' in the first thermal risk dataset. If the confidence level 344 of the present event pattern 270' is a level four, the first composite risk score 346 may be defined as equivalent to the thermal risk prediction 336 of the predicted next state event type 274" having the highest probability 340 of occurring immediately after the present event pattern 270' in the first thermal risk dataset (see, e.g., the data for predicted state "F" in FIGS. 32 and 33).

In certain implementations of the vehicle battery protection device 100 with a second thermal chamber 152, a process for setting the second composite risk score based on the confidence level 344 may be similar to the above-described process for setting the first composite risk score based on the confidence level 344. For example, if the confidence level of the present event pattern 270' is a level one, the second composite risk score may be defined as equivalent to the highest thermal risk prediction 336 of all of the predicted next state event types 274" in the second thermal risk dataset. If the confidence level 344 of the present event pattern 270' is a level two, the second composite risk score may be defined as the average of the two highest thermal risk predictions 336 of all of the predicted next state event types 274" in the second thermal risk dataset. If the confidence level 344 of the present event pattern 270' is a level three, the second composite risk score may be defined as the average of the two thermal risk predictions 336 of the predicted next state event types 274" having the two highest probabilities 340 of occurring immediately after the present event pattern 270' in the second thermal risk dataset. If the confidence level of the present event pattern 270' is a level four, the second composite risk score may be defined as equivalent to the thermal risk prediction 336 of the predicted next state event type 274" having the highest probability 340 of occurring immediately after the present event pattern 270' in the second thermal risk dataset.

Mitigation Strategy and Implementation

Referring to FIGS. 9-12, particular preferred implementations of the vehicle battery protection device 100 may comprise one or more activatable thermal devices. An activatable thermal device may be, for example, a Peltier module 158, a cooling fan, a microelectromechanical-system cooler, a resistive heater, some combination thereof or the like. Referring to FIGS. 36 and 37, in such implementations, the thermal safety algorithm 208 may comprise limiting activation of at least one of the one or more activatable thermal devices in, for example, the first thermal chamber 150 based on the first chamber composite risk score 346 and the first chamber composite thermal trend 347.

Moreover, referring to FIG. 19, in certain implementations of the vehicle battery protection device 100, the thermal safety algorithm 208 may comprise selecting a mitigation strategy (see, e.g., block 256 in FIG. 19). Referring to FIG. 35, selection of a mitigation strategy may include selecting between a baseline mitigation setting 352 and a proactive mitigation setting 354 based upon the state of charge 310 of the vehicle battery 104 and present measured ambient temperature 312. Referring to FIG. 36, when the baseline mitigation setting 352 is selected, a baseline set of thermal activation thresholds may be applied to the aforementioned limiting of the activation of the activatable thermal devices. FIG. 36 graphically illustrates an example dataset 316 which includes an example baseline set of thermal activation thresholds. Contrastingly, referring to FIG. 37, when the proactive mitigation setting 354 is selected, a proactive set of thermal activation thresholds may be applied to the aforementioned limiting of the activation of the activatable thermal devices. FIG. 37 graphically illustrates an example dataset 318 which includes an example proactive set of thermal activation thresholds.

Figure 38:
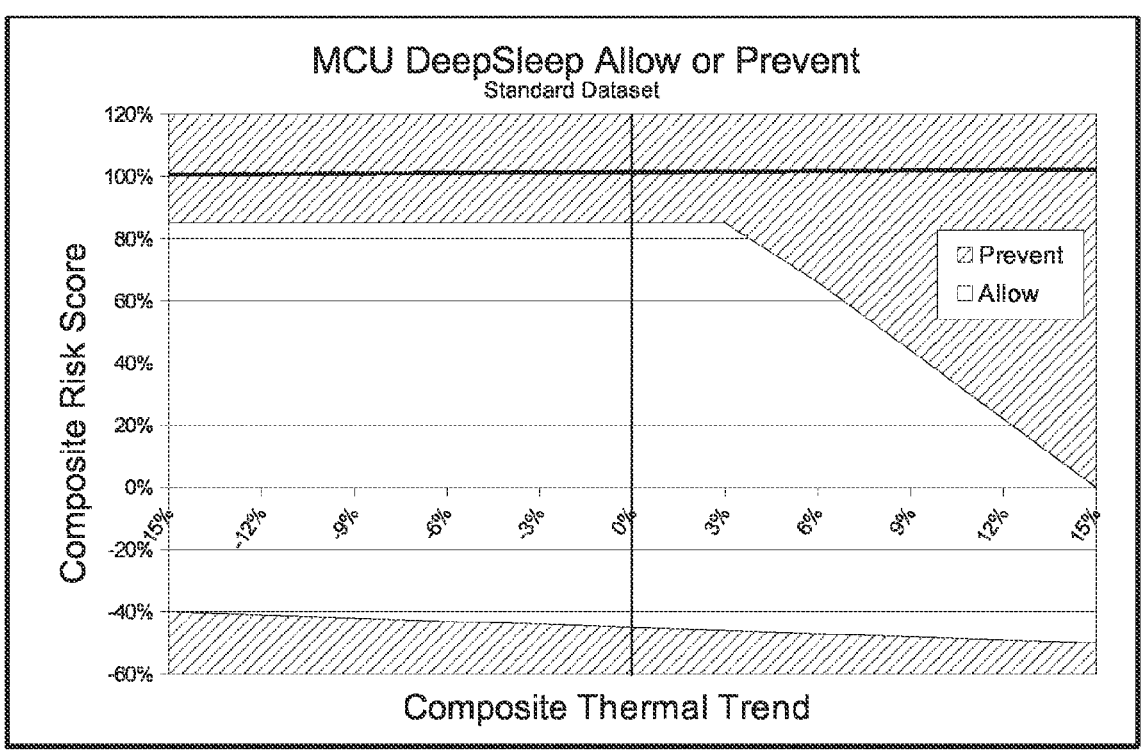
FIG. 38 illustrates one example of a baseline (standard) processor deep sleep state mitigation dataset, whereby the composite risk score and composite thermal trend of a respective thermal isolation chamber dictate whether one or more processors of the vehicle battery protection device are allowed or prevented from entering deep sleep state.

Referring to FIG. 38, in particular implementations of the vehicle battery protection device 100, the thermal safety algorithm 208 may comprise allowing or preventing a deep sleep state in at least one of the one or more processors based on (a) the first chamber composite risk score and the first chamber composite thermal trend; or (b) the second chamber composite risk score and the second chamber composite thermal trend.

Figure 39:
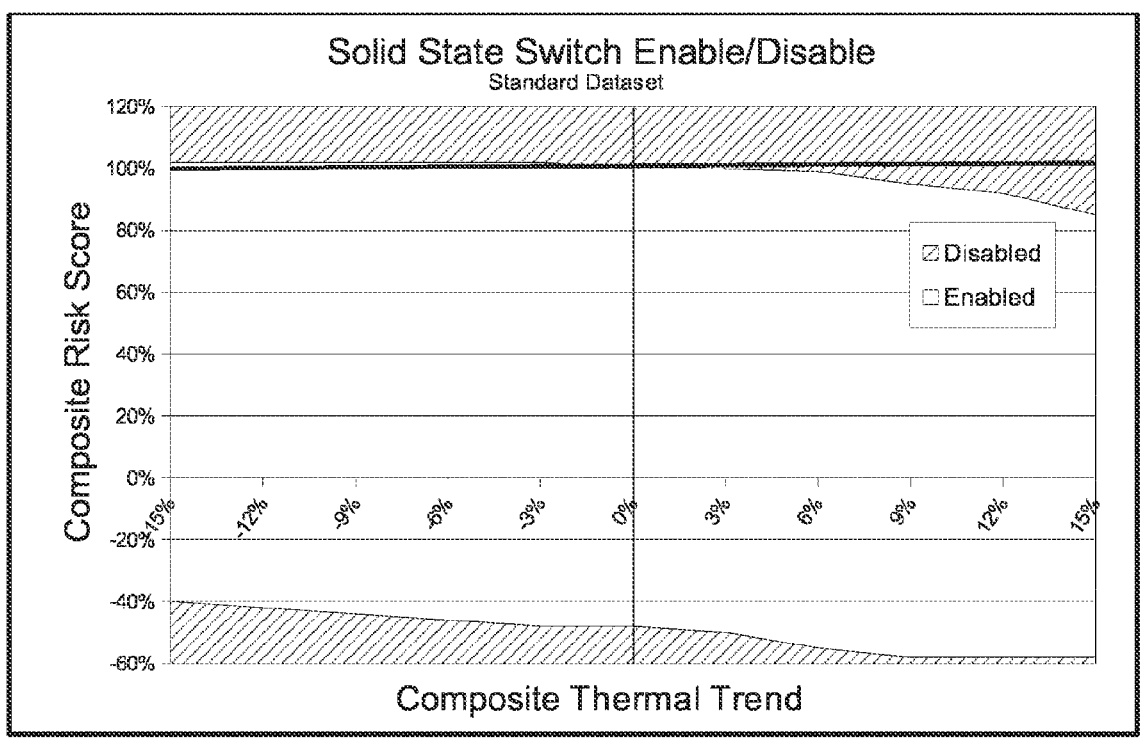
FIG. 39 illustrates one example of a baseline (standard) solid state switch mitigation dataset, whereby the composite risk score and composite thermal trend of a respective thermal isolation chamber dictate whether the solid state switch of the vehicle battery protection device is enabled or disabled.

Referring to FIG. 39, in certain implementations of the vehicle battery protection device 100, the thermal safety algorithm 208 may comprise enabling or disabling the solid state switch 126 based on (a) the first chamber composite risk score and the first chamber composite thermal trend; or (b) the second chamber composite risk score and the second chamber composite thermal trend.

Figures 13A, 13B:
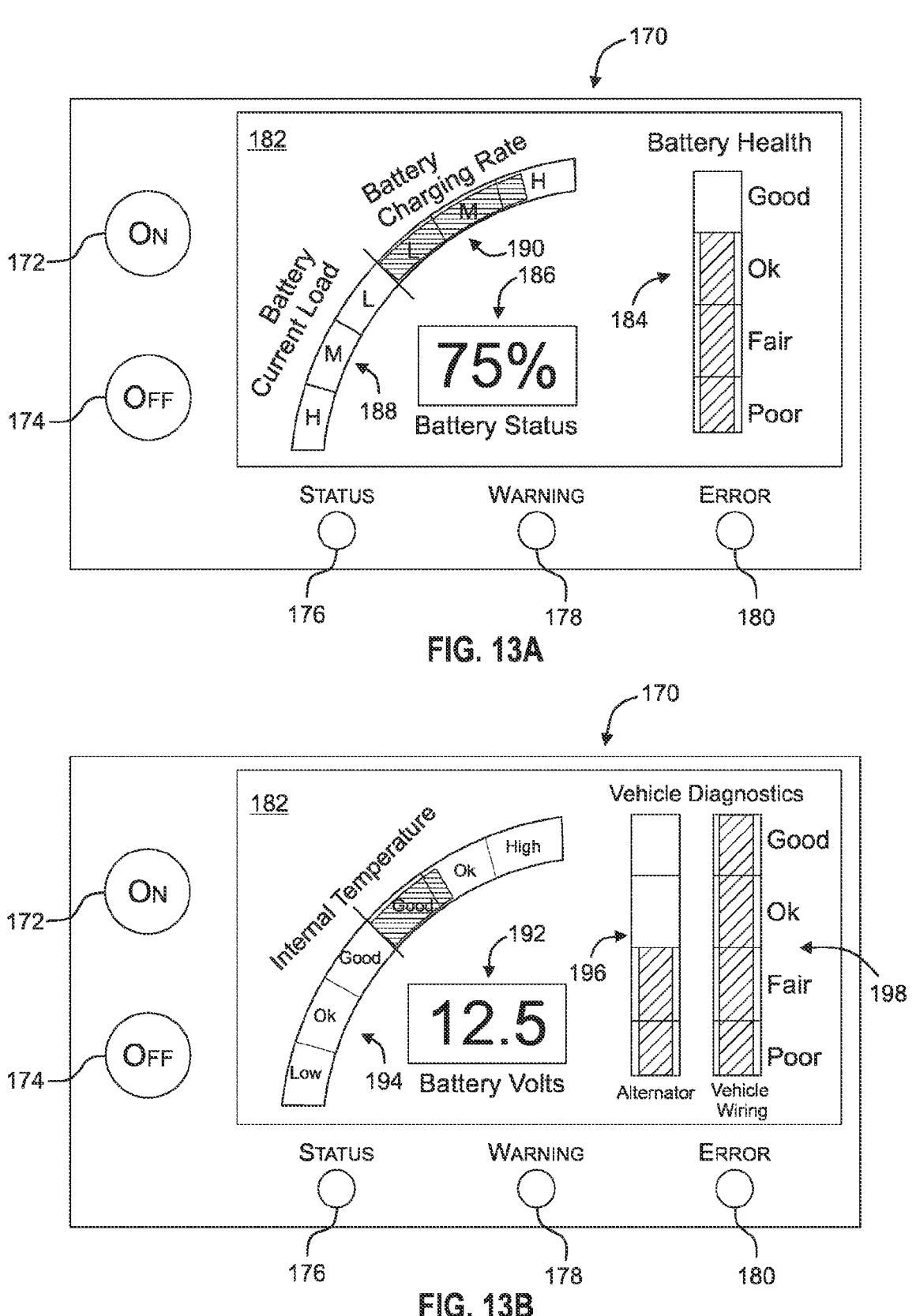
FIG. 13A is a diagrammatic view of one non-limiting example of a user interface operably associated with a vehicle battery protection device in accordance with the present disclosure.
FIG. 13B is a diagrammatic view of a second non-limiting example of a user interface operably associated with a vehicle battery protection device in accordance with the present disclosure.
Figure 14A:
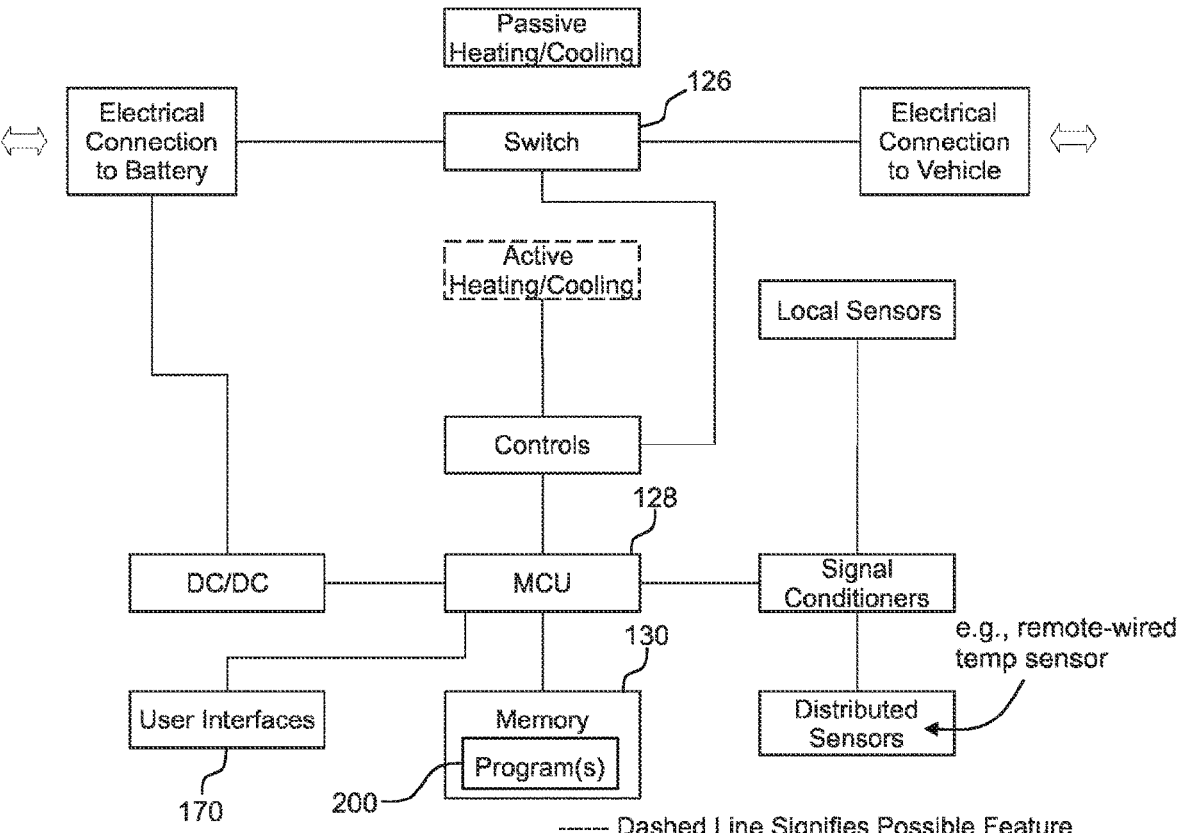
FIG. 14A is a diagrammatic view of a hardware architecture block diagram corresponding to one example vehicle battery protection device in accordance with the present disclosure.
Figure 14B:
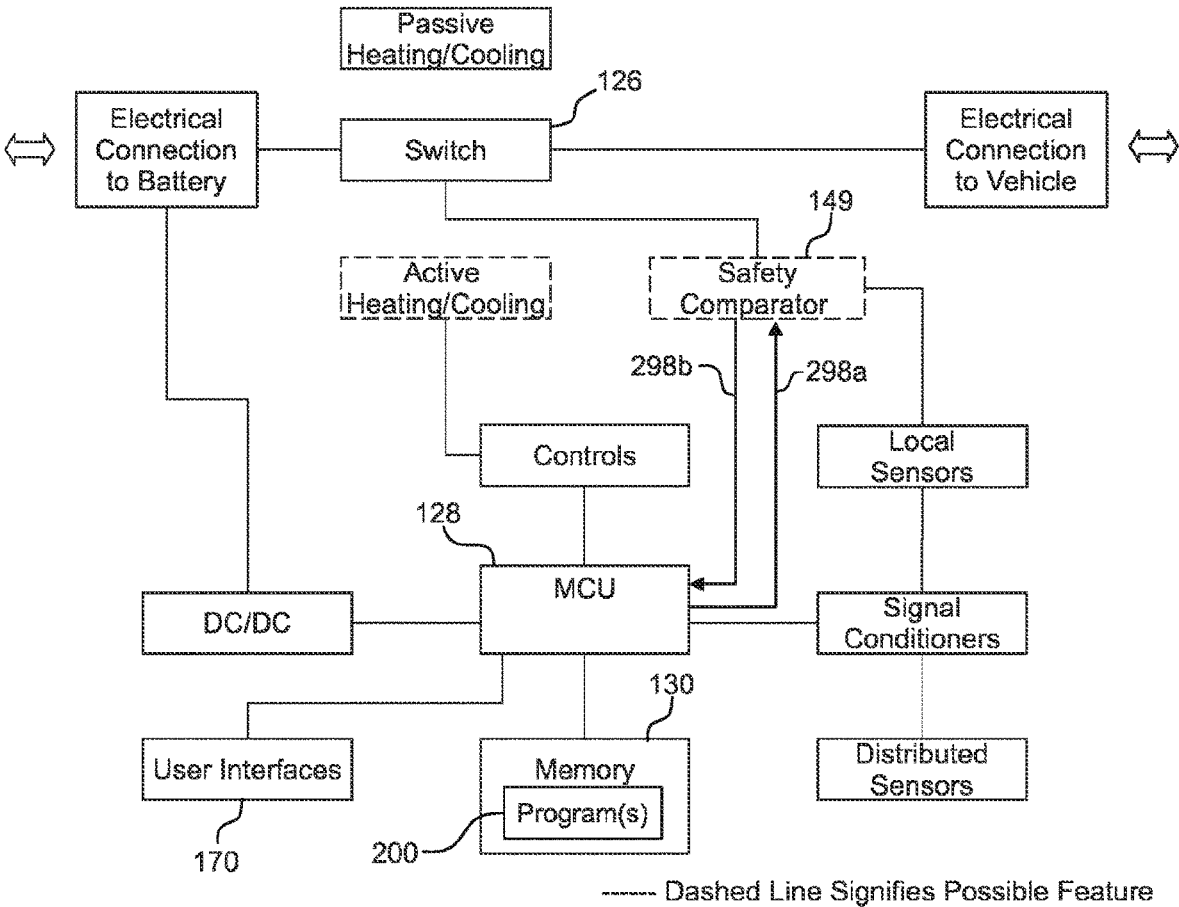
FIG. 14B is a diagrammatic view of a hardware architecture block diagram corresponding to a second example vehicle battery protection device in accordance with the present disclosure.

Referring to FIGS. 13A and 13B, particular implementations of the vehicle battery protection device 100 may further comprise a user interface 170. The user interface 170 may be, for example, disposed in or on the main enclosure 121. Alternatively, or in addition, some or all of the user interface 170 may be disposed remotely from the main enclosure.

Figure 40:
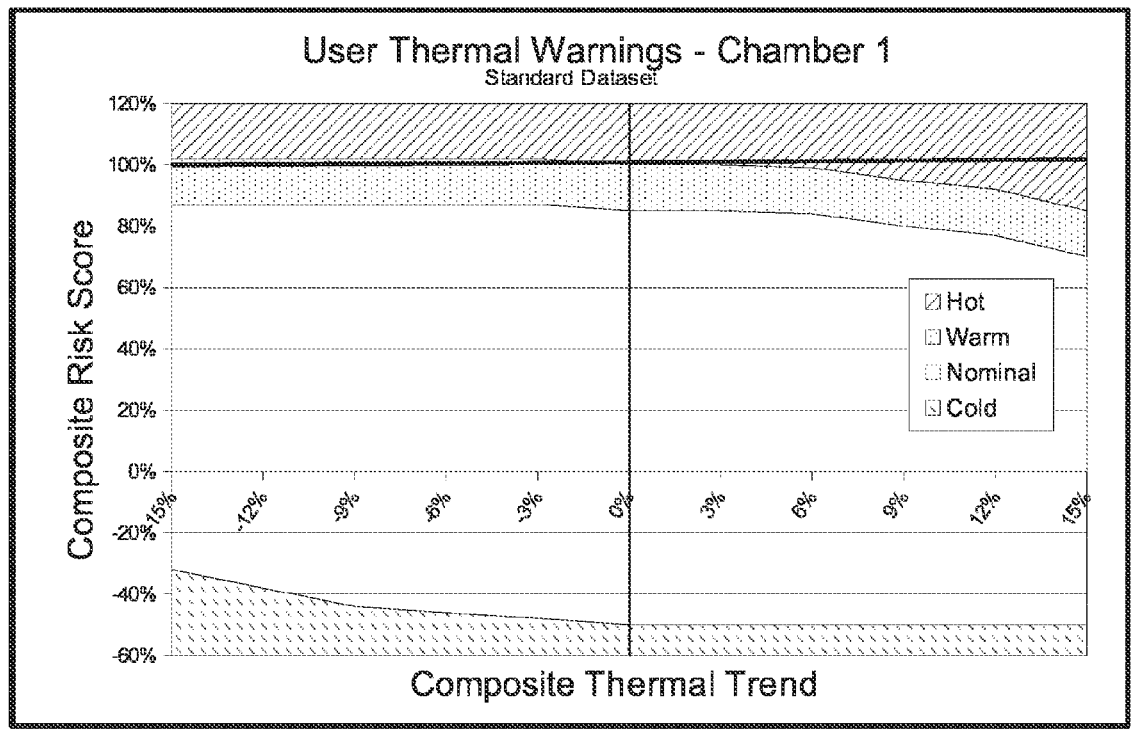
FIG. 40 illustrates one example of a baseline (standard) thermal warning mitigation dataset, whereby the composite risk score and composite thermal trend of a respective thermal isolation chamber dictates whether or not a thermal warning indication is displayed on the user interface of the vehicle battery protection device.
Figure 41:
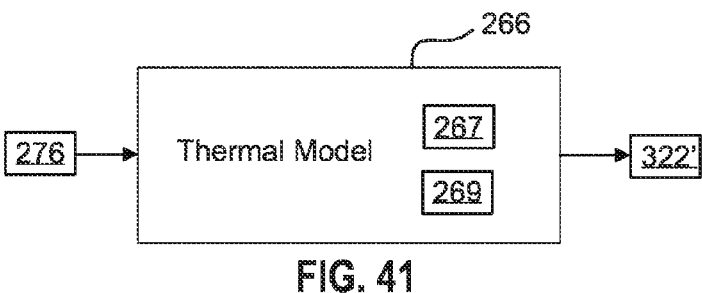
FIG. 41 illustrates one example of a process for generating heat flux values based on recent sensor data and the thermal model of the vehicle battery protection device.
Figure 42:
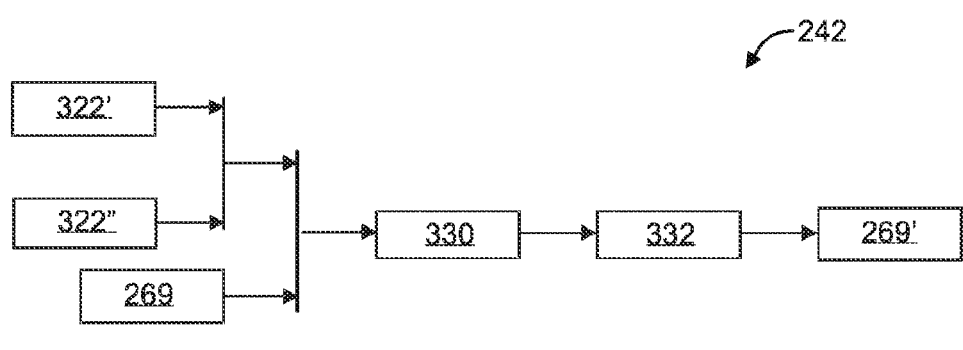
FIG. 42 illustrates one example of a process of verifying and updating thermal model error correction coefficients.

Referring to FIGS. 13A, 13B, and 40, in certain implementations of the vehicle battery protection device 100, the thermal safety algorithm 208 may comprise displaying one or more thermal warning indications (e.g., at a warning indicator 178) on the user interface based 170 on (a) the first chamber composite risk score and the first chamber composite thermal trend; or (b) the second chamber composite risk score and the second chamber composite thermal trend. In particular such implementations, at least one of the one or more thermal warning indications may be, for example, a hot indication, a warm indication or a cold indication.

Figure 45A:
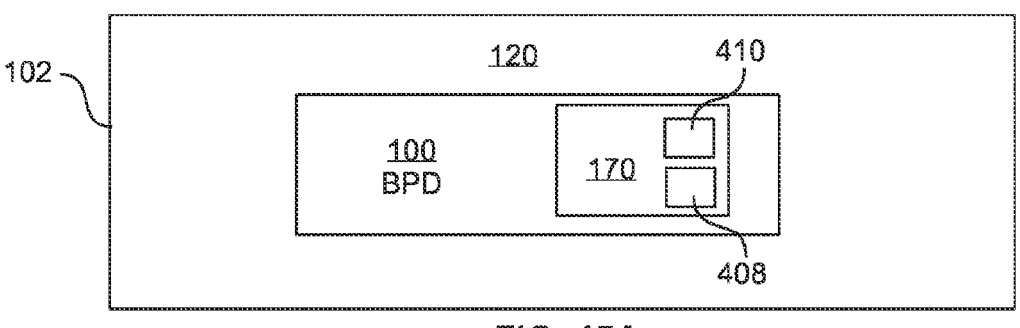
FIG. 45A illustrates one example of a user interface of a vehicle battery protection device, wherein the user interface is mechanically and electrically integrated with the remainder of the vehicle battery protection device installed in the vehicle.

Referring to FIGS. 13A, 13B and 45A, Particular Implementations of the user interface 170 may include a display screen 182 or illuminable indicators. Alternatively, or in addition, the user interface 170 may include a buzzer, a speaker or a vibration motor (see, e.g., 410 in FIG. 45A). Certain implementations of a user interface 170 may comprise a user-activatable touch-sensitive device or a button (e.g., buttons 172 and 174, which may for example be buttons located independently of the display screen 182 or represented on portions of a touch-sensitive version of the display screen 182).

Figure 45B:
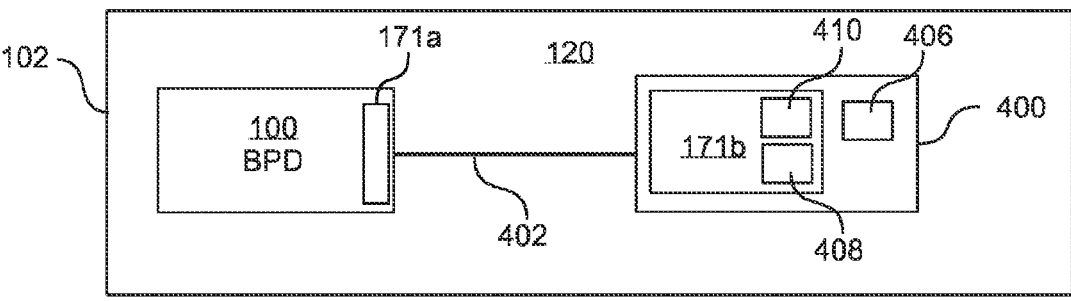
FIG. 45B illustrates a second example of a user interface of a vehicle battery protection device, wherein the user interface includes a remote portion which is electrically integrated with the remainder of the vehicle battery protection device installed in the vehicle.
Figure 45C:
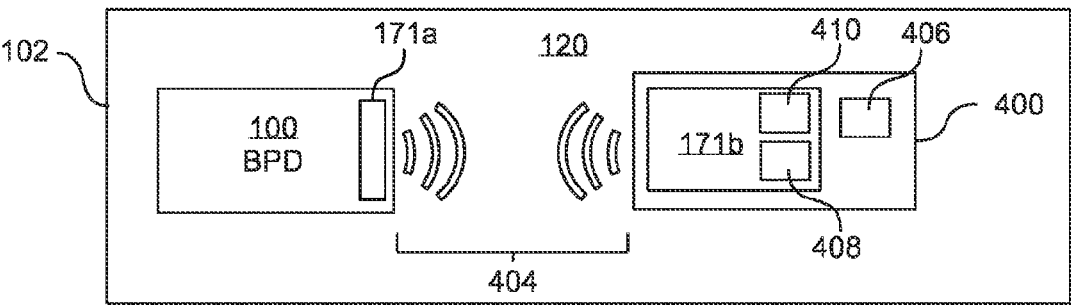
FIG. 45C illustrates a third example of a user interface of a vehicle battery protection device, wherein the user interface includes a remote portion configured to be in wireless communication with a local portion of the user interface from a separate position within the vehicle.
Figure 45D:
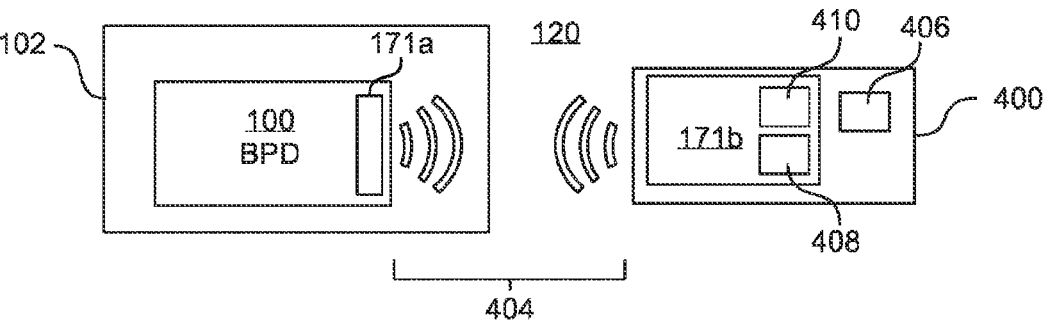
FIG. 45D illustrates a fourth example of a user interface of a vehicle battery protection device, wherein the user interface includes a remote portion configured to be in wireless communication with a local portion of the user interface from a position external to the vehicle.

Referring to FIGS. 45B-45D, in certain implementations of the vehicle battery protection device 100, wherein the user interface includes a wired or wireless remote control (e.g., a remote portion 171*b* of the user interface) to inform or interact with the user. For example, the remote portion 171*b* of a user interface may be configured to communicate by wire or wirelessly with a corresponding local portion 171*a* of the user interface. Moreover, the remote portion 171*b* may be housed in a remote housing 400 external to and remotely positionable from the main enclosure 121. In such case, the local portion of the user interface may be housed within the main enclosure 121. Notably, in certain implementations of a vehicle battery protection device 100 comprising a user interface 170 with a local portion 171*a* and a remote portion 171*b*, only the remote portion 171*b* may be configured to interface directly with the user. In such case, the local portion 171*a* may act largely or entirely as a communications interface between the remote portion 171*b* and the electronics (e.g., processor and memory) housed within the main enclosure 121.

Figure 46:
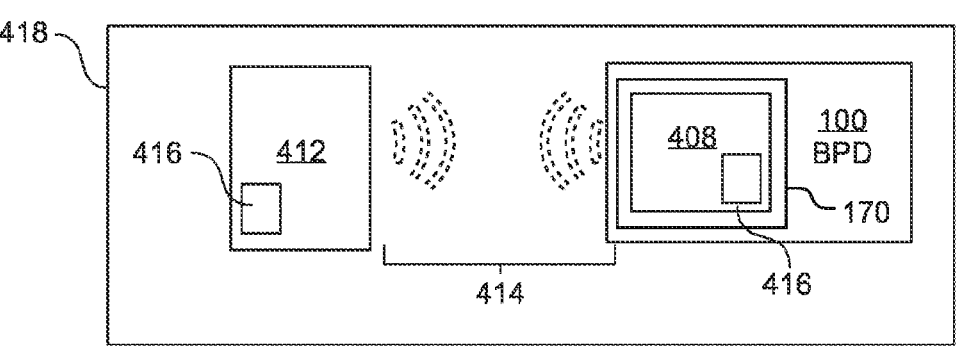
FIG. 46 illustrates one example system for a user NFC device communicating a unique number to a vehicle battery protection device to allow the user to, for example, enable or disable the vehicle battery protection device.
Figure 47:
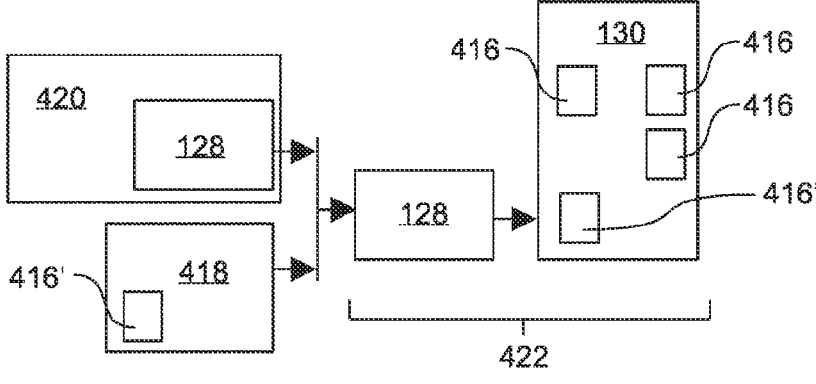
FIG. 47 illustrates one example method by which a processor of the vehicle battery protection device receives and stores a unique number from a user NFC device to memory as a key.
Figure 48:
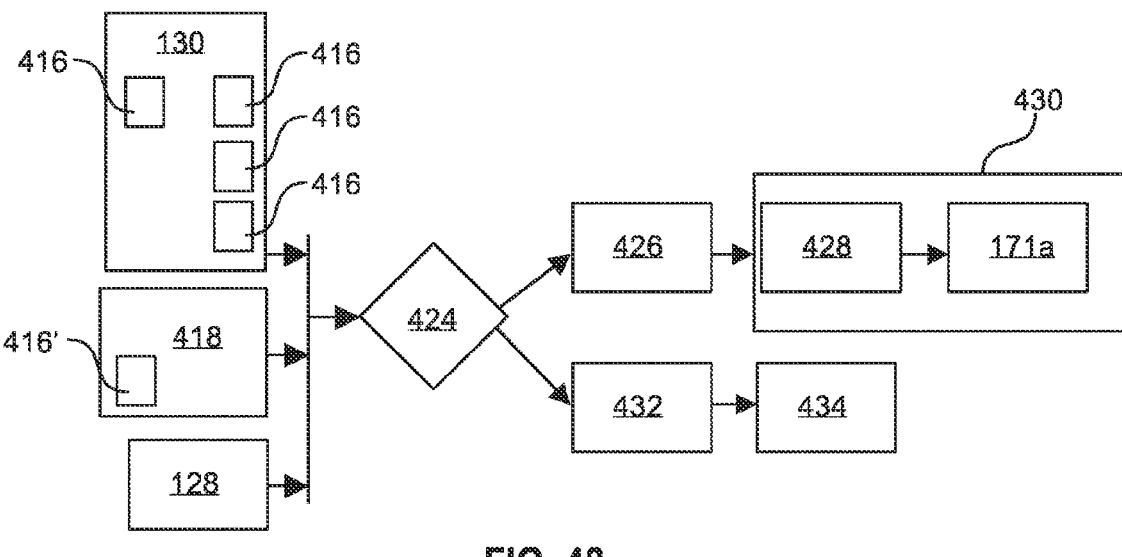
FIG. 48 illustrates one example method by which a processor of the vehicle battery protection device compares a new unique number received from a user NFC device to the keys stored in memory, thereby determining if a command from the user NFC device is authenticated and should be sent to the local portion of the user interface.

Referring to FIG. 46, in certain implementations of the vehicle battery protection device 100, the user interface 170 may include a local or remote sensor 408 configured to receive a near field communication (NFC) carrier frequency (e.g., represented by NFC wireless communication 414) to interact and share data with the user. Alternatively, or in addition, the user interface 170 may include a local or remote sensor 408 configured to receive a near field communication carrier frequency to allow the user to enable or disable the vehicle battery protection device 100. For example, with reference to FIGS. 46-48, the local or remote sensor 408 may be configured to read a unique number 416 and save this number into memory 130; and at least one of the one or more processors 128 may be configured to treat the unique number as a key for interactive control of the vehicle battery protection device by a user.

Battery Maintenance Hardware

Vehicle batteries involve a chemical energy storage medium. This storage medium naturally reduces energy over time even while not being used. Lead acid batteries typically lose between 2-3% energy in one month without some form of recharging. Depending on vehicle use, battery maintenance may require use of an auxiliary power source 502 to recharge or maintain the health of the battery, for example while the engine or primary motor is not used. An auxiliary power source 502 could be, for example, a battery charger, another battery, a portable battery, a jump pack, a solar panel, an AC electrical connection, a usb adapter, some combination thereof or the like.

Figure 14C:
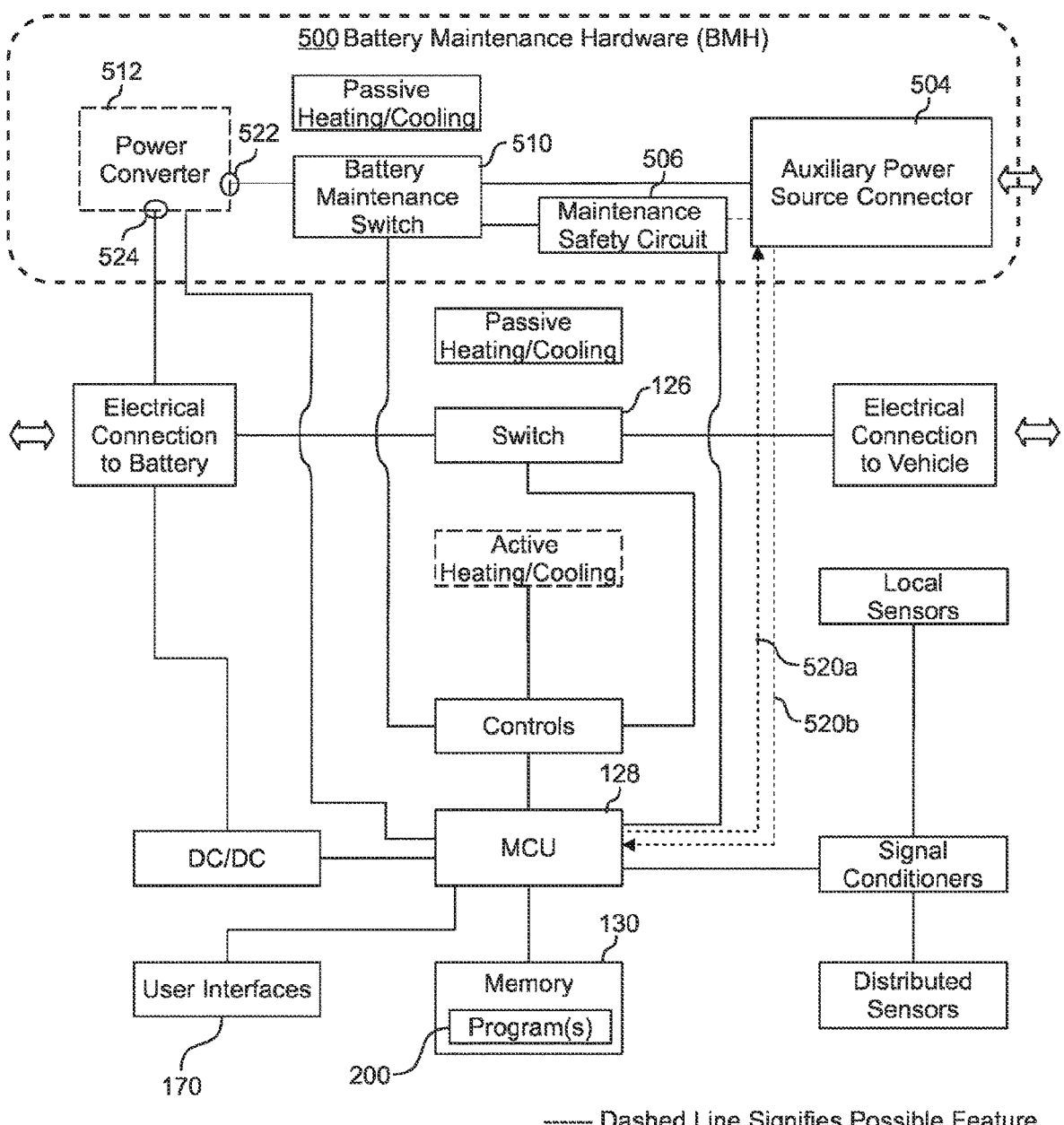
FIG. 14C is a diagrammatic view of a hardware architecture block diagram corresponding to a third example vehicle battery protection device in accordance with the present disclosure.
Figure 14D:
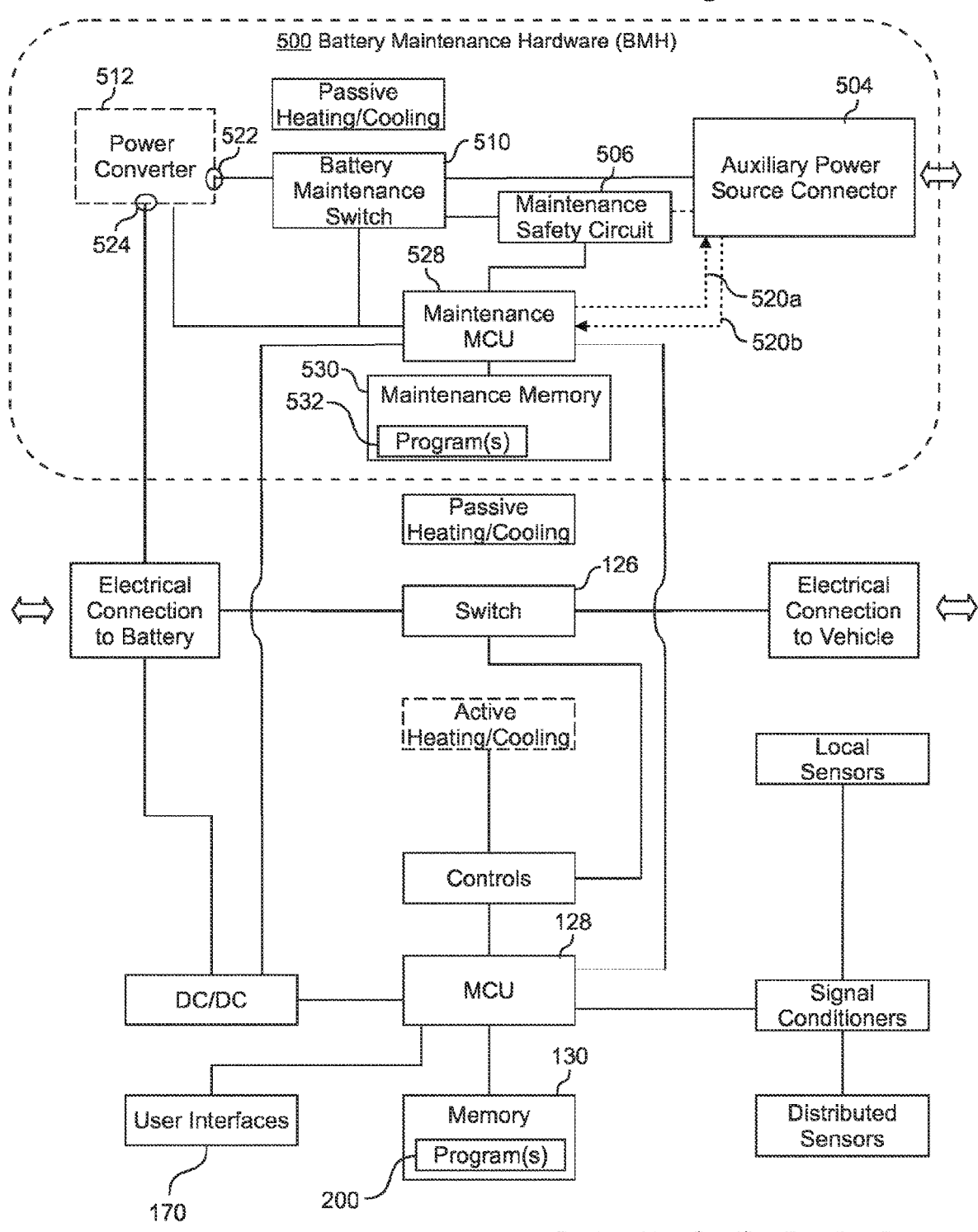
FIG. 14D is a diagrammatic view of a hardware architecture block diagram corresponding to a fourth example vehicle battery protection device in accordance with the present disclosure.
Figure 51A:
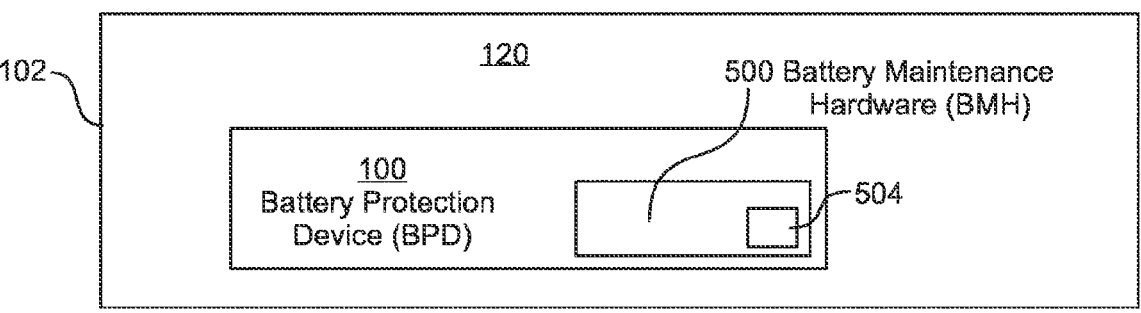
FIG. 51A is a diagrammatic view of one non-limiting configuration of a vehicle battery protection device with battery maintenance hardware, wherein battery maintenance hardware is integrated within the vehicle battery protection device installed in the vehicle.
Figure 51B:
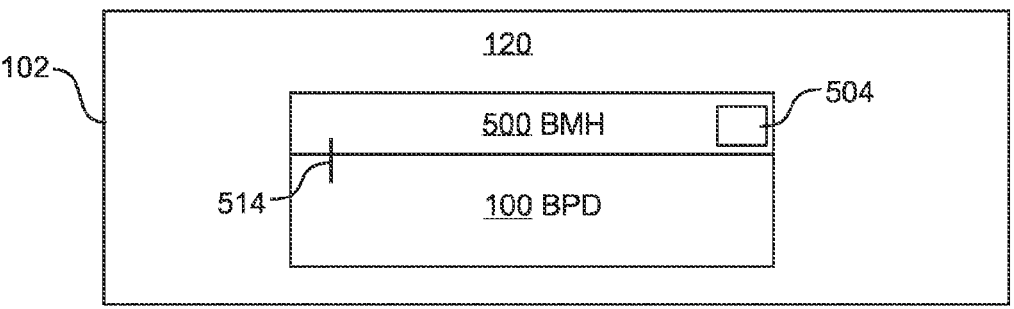
FIG. 51B is a diagrammatic view of a second non-limiting configuration of a vehicle battery protection device with battery maintenance hardware, wherein battery maintenance hardware is mounted to the vehicle battery protection device installed in the vehicle.
Figure 51C:
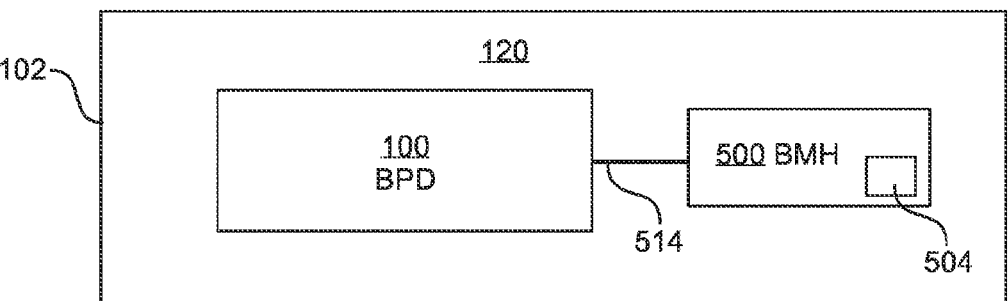
FIG. 51C is a diagrammatic view of a third non-limiting configuration of a vehicle battery protection device with battery maintenance hardware, wherein battery maintenance hardware is electrically connected to the battery protection device, wherein the battery maintenance hardware is disposed within the vehicle separately from the vehicle battery protection device.
Figure 51D:
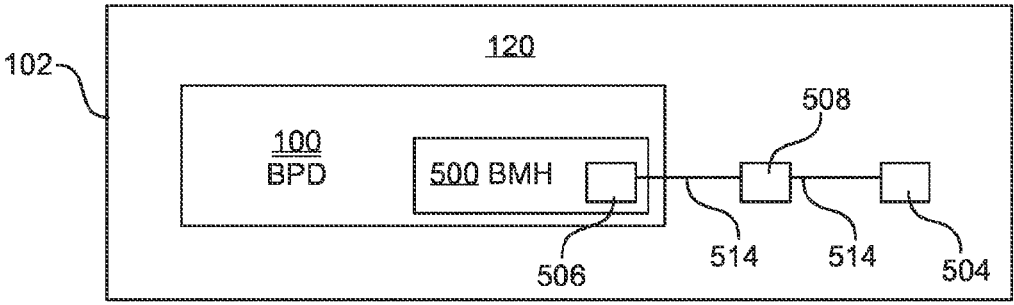
FIG. 51D is a diagrammatic view of a fourth non-limiting configuration of a vehicle battery protection device with battery maintenance hardware, wherein a portion of the battery maintenance hardware is integrated within the vehicle battery protection device installed in the vehicle, and a portion of the battery maintenance hardware is electrically connected to the battery protection device and is disposed within the vehicle separately from the vehicle battery protection device.

In particular embodiments of the vehicle battery protection device 100, dedicated battery maintenance hardware 500 (otherwise referred to herein as "BMH") may be included to facilitate vehicle battery maintenance and vehicle battery conditioning without, for example, the engine running (see, for example, FIGS. 14C-14D). Depending upon the particular implementation, the BMH 500 may be separated into one or more groups and partially or fully installed inside or outside the BPD 100. Referring to FIG. 51A, an auxiliary power source connector 504 may be included to simplify the connection to an APS 502. The APS connector 504 may, for example, be mounted to the BPD 100 or disposed remotely to the BPD 100 and linked electrically by wire 514 (see, for example, FIGS. 51A-51D).

The BMH 500 may have one or more dedicated maintenance processors 528, memory 530, and program(s) 532, or may share resources with the BPD (see, for example, FIGS. 14C-14D). A maintenance safety circuit 506 may be inline with the APS connector 504. The maintenance safety circuit 506 may be comprised of: a safety fuse 508 (see, e.g., FIG. 51D), a resettable or adjustable fuse type circuit, reverse polarity protection, connection verification system, or a combination thereof. The maintenance safety circuit 506 is important to guarantee safety for the end user. The APS connector 504 may, for example, be electrically energized with a voltage potential equal to that of the vehicle battery 104 or greater if, for example, an engine with a working alternator is operating and charging the vehicle battery. If, for example, an end user incorrectly connects an APS 502 to an APS connector 504 and, for example, swaps the positive and negative cables, a potential outcome may be an explosive arc with +1,000 amps of energy. A safety circuit 506 with a safety fuse 508, or a resettable fuse type circuit, may be provided to limit the power of such a dangerous arc to 5 amps or less. A safety circuit with reverse polarity protection, may possibly prevent an arc altogether. A connection verification system may, for example, utilize the battery maintenance switch 510, and prevent the APS connector 504 from being energized, by the potential energy of the vehicle battery 104, until an APS 502 is identified as correctly and safely connected. The safety circuit maybe be mounted partially or fully: inside, on, or separated from the BMH 500 (see, for example, FIG. 51D). The form of electrical energy transferring between the auxiliary power source 502 and the APS connector 504 may be, for example, direct current, alternating current, or inductive. The movement of electricity from the APS 502 through the BPD 100 to the vehicle battery 104 may be interrupted or controlled by a battery maintenance switch 510 (see, for example, FIGS. 14C-14D). The battery maintenance switch 510 may require a passive heating or cooling solution. This solution may be separate or incorporated into the BPD Thermal Safety Algorithm 208.

The properties of the electrical energy flowing from the APS 502 to the APS connector 504 (voltage level, electrical current, duration, etc.) may be decided by the auxiliary power source, the BPD or coordination between the BPD and an auxiliary power source 502. If the BPD 100 is configured to coordinate with or command the APS 502 to output specific electrical energy properties, one of the processors, either processor 128 or maintenance processor 528, in the BPD 100, may be configured to relay data communications by wire to the APS 502 through the APS connector 504 via data communication line 520*a* and from the APS connector 504 via data communication line 520*b*, or through wireless communication 518 (see, for example, FIGS. 14C-14D). The specific properties of the electrical energy that recharges the vehicle battery 104 (voltage level, electrical current, duration, etc.) may be altered by a power converter 512.

Figure 52A:
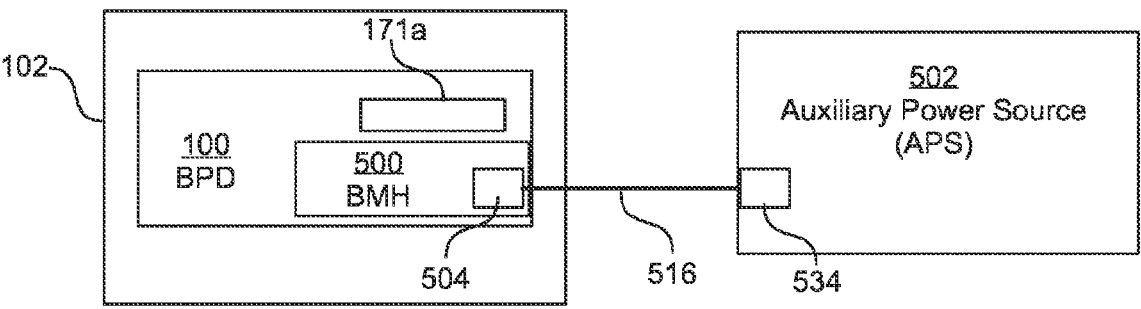
FIG. 52A is a diagrammatic view of a fifth non-limiting configuration of a vehicle battery protection device with battery maintenance hardware, wherein the battery maintenance hardware within the vehicle is electrically connected to an auxiliary power source external to the vehicle.
Figure 52B:
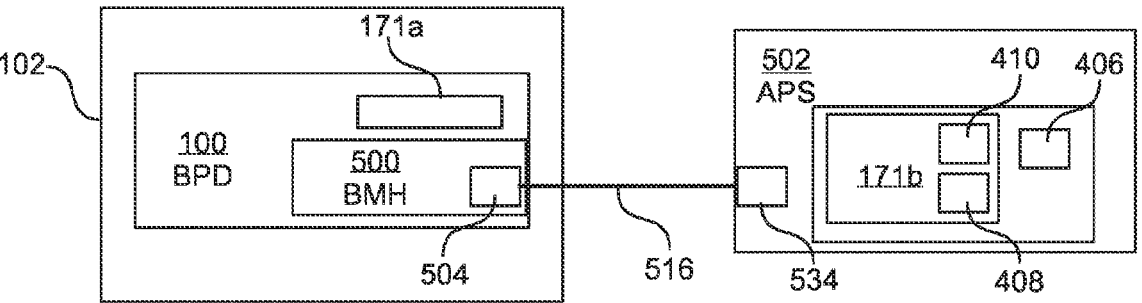
FIG. 52B is a diagrammatic view of a sixth non-limiting configuration of a vehicle battery protection device with battery maintenance hardware, wherein the battery maintenance hardware within the vehicle is electrically connected to an auxiliary power source external to the vehicle, and the user interface includes a remote portion configured to be in wired communication with a local portion of the user interface from a position external to the vehicle.
Figure 52C:
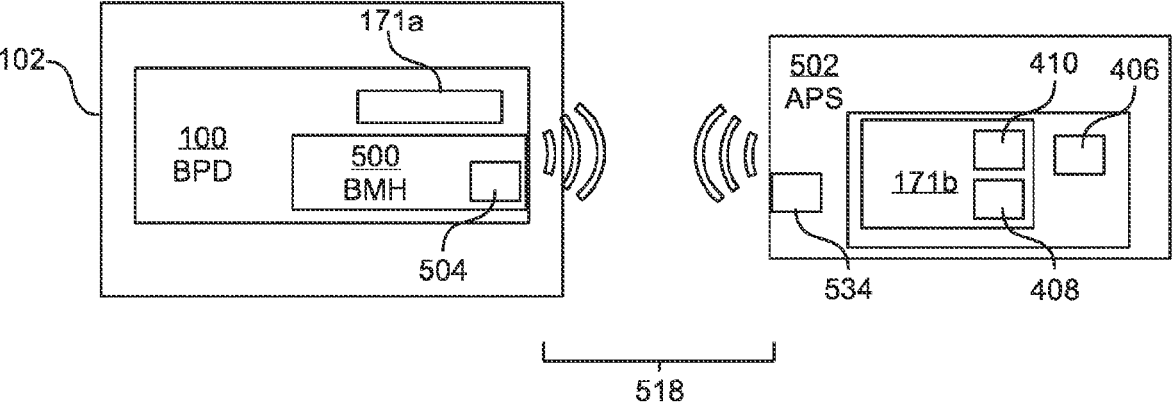
FIG. 52C is a diagrammatic view of a seventh non-limiting configuration of a vehicle battery protection device with battery maintenance hardware, wherein a user interface includes a remote portion integrated in an auxiliary power source configured to be in wireless communication with a local portion of the user interface from a position external to the vehicle.

Data communication and exchange between the auxiliary power source 502 and the BPD 100 may be, for example, via wired 516 communications (see, for example, FIG. 52B) or wireless communication 518 (see, for example, FIG. 52C).

A BPD 100 may share data with an auxiliary power source 502 relating to the vehicle battery 104, BPD 100, and the vehicle 102. The shared data could be live data, gathered or processed data in memory, or derived data in memory (see, for example, FIGS. 52B-52C and 53A-53B). Also referring to FIGS. 52B-52C and 53A-53B, one or more BPDs 100 may treat one or more auxiliary power sources 502 as a remote user interface 171*b*. (e.g., allowing user interactions, information exchange, control, etc.) This type of remote user interface may be useful for a variety of applications, for example diagnostic troubleshooting or fleet vehicle management.

Referring to FIGS. 14C-14D and 51A-53B, particular implementations of a vehicle battery protection device 100 may further comprise an auxiliary power source connector 504 configured to receive electricity from an auxiliary power source 502 to condition and replenish the state of charge of the vehicle battery 104. A dedicated connector allows for the possibility of several safety and user advantages. For example, an APS connector 504 may be configured to house multiple conductors or may be designed with an asymmetrical pattern or shape. Both examples may simplify or possibly eliminate user connection errors. Power transfer with galvanic isolation may be more economically achievable through a dedicated APS connector 504, if for example, an inductive power transfer coil was fully embedded and integrated into the APS connector 504. Galvanic isolation may allow for zero spark or zero static discharge while still allowing for power or data transfer.

Referring to FIGS. 14C-14D, certain implementations of a battery protection device 100 with an auxiliary power source connector 504 may further comprise a maintenance safety circuit 506 for controlling a maintenance current between auxiliary power source connector 504 and the vehicle battery 104. The maintenance safety circuit 506 may be configured to, for example, (a) interrupt the maintenance current when the maintenance current exceeds a maintenance amperage threshold; (b) prevent the maintenance current if voltage polarity is reversed at the auxiliary power source connector 504; (c) prevent current flow from the vehicle battery 104 to the auxiliary power source 502; or (d) interrupt the maintenance current to prevent overcharging of the vehicle battery 104. The vehicle battery protection device 100 may further comprise a battery maintenance switch 510 electrically disposed between the auxiliary power source connector 504 and the vehicle battery 104. The battery maintenance switch 510 may be commandable by the maintenance safety circuit 506 or by one of the processors, either processor 128 or maintenance processor 528. A maintenance amperage threshold may be defined during product development and hard coded to match the current carrying limitations of the conduction path. A maintenance amperage threshold may also be an adjustable threshold and may be dictated by one of the processors 128 or 528 to satisfy any one of a number of scenarios. One example could be to prevent overcharging the vehicle battery 104 as it nears full capacity. Also, it is not uncommon for a manufacturer of batteries, depending on the battery chemistry, to recommend using constant current charging until the charging battery reaches roughly 80% capacity and then switching to a constant voltage type charging strategy. In this example, a maintenance amperage threshold may be adjusted by one of the processors 128 or 528, possibly while in use, to maintain alignment with a battery manufacture's prescribed charging strategy.

Referring to FIGS. 14C-14D, particular implementations of a battery protection device 100 with an auxiliary power source connector 504 may further comprise a power converter 512 having a converter input 522 and a converter output 524. The converter input 522 may be configured to be in electrical communication with the auxiliary power source connector 504. The converter output 524 may be configured to be in electrical communication with the vehicle battery 104. The power converter 512 may be configured to (a) receive voltage from the auxiliary power source 502 by way of the converter input 522; (b) modify the received voltage; and (c) provide the modified voltage at the converter output 524. The power converter 512, could allow for the possibility of significantly faster battery charging speeds. Two limitations on charging speeds are the charging current and charging voltage that an APS 502 can output. A contributing factor to the reduced charging current offered by APSs 502, is the increased resistance in the smaller more flexible charging cables. Some customers prefer smaller more flexible charging cables, so this limitation is difficult to eliminate. Manufacturers of APSs 502 may also be limited to voltage outputs in the range of 12-15volts in order to protect the vehicle batteries 104 the APSs 502 are intending to recharge. An integrated power converter 512 may be configured to accept higher voltages, for example, 24 volts or 48 volts, and may convert them down to the safe 12-15 volts for the vehicle battery 104. This shift of voltage management may allow for larger charging power transfer and may allow significantly faster charging without an increase in electrical current. The power converter 512 may also be utilized to implement compatibility with the universal serial bus power delivery (USB-PD) standard. USB-PD is a standard that is designed to coordinate customizable power transfer through the universal serial bus connectors with a variety of voltages and a variety of power transfer rates. The power converter 512 may be configured to receive the full specification of USB-PD voltages and convert them to the acceptable range a vehicle battery 104 would require. Sixty hertz 120 volt alternating current and fifty hertz 230 volt alternating current are two common household AC voltages available worldwide. The power converter 512, may be configured to receive alternating current and convert the energy to direct current on output to the vehicle battery 104. For a BMH 500 to be compatible with an APS 502 outputting alternating current electricity, unique design considerations and adjustments may be required to the APS connector 504, the safety circuit 506, or the maintenance switch 510.

Referring to FIGS. 52A-52C, in certain implementations of the vehicle battery protection device 100, the auxiliary power source connector 504 may be configured to be electrically connected to one or more auxiliary power sources 502.

Figure 53A:
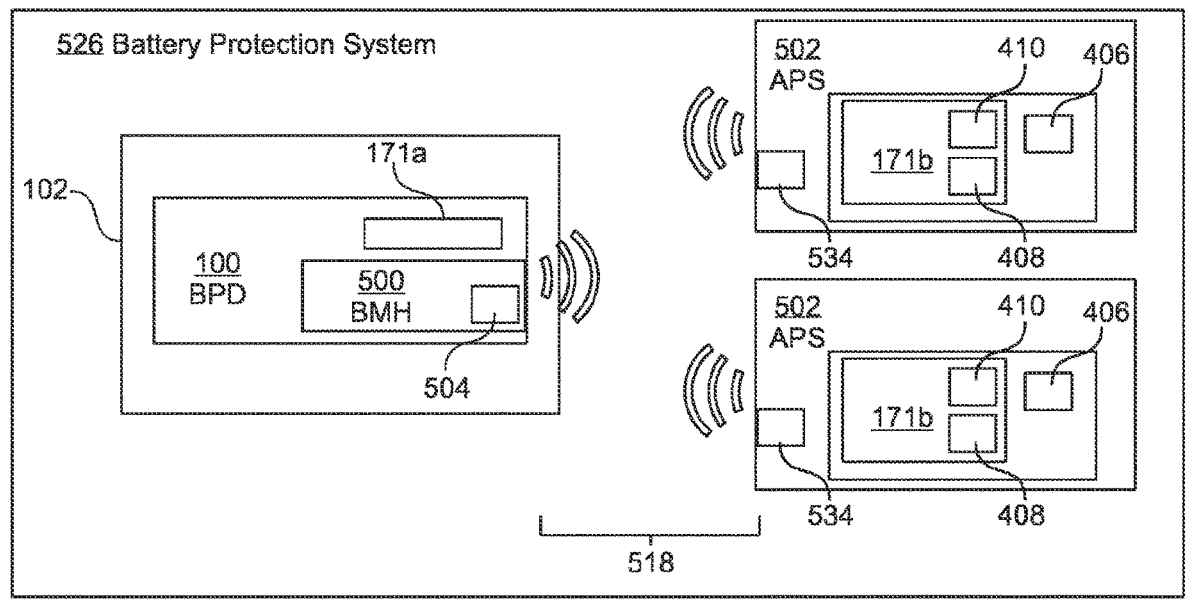
FIG. 53A is a diagrammatic view of a non-limiting configuration of a vehicle battery protection system with a vehicle battery protection device, wherein a user interface includes one or more wireless remote controls configured to communicate with the vehicle battery protection device to inform or interact with the user, at least one wireless remote control being integrated with an auxiliary power source.
Figure 53B:
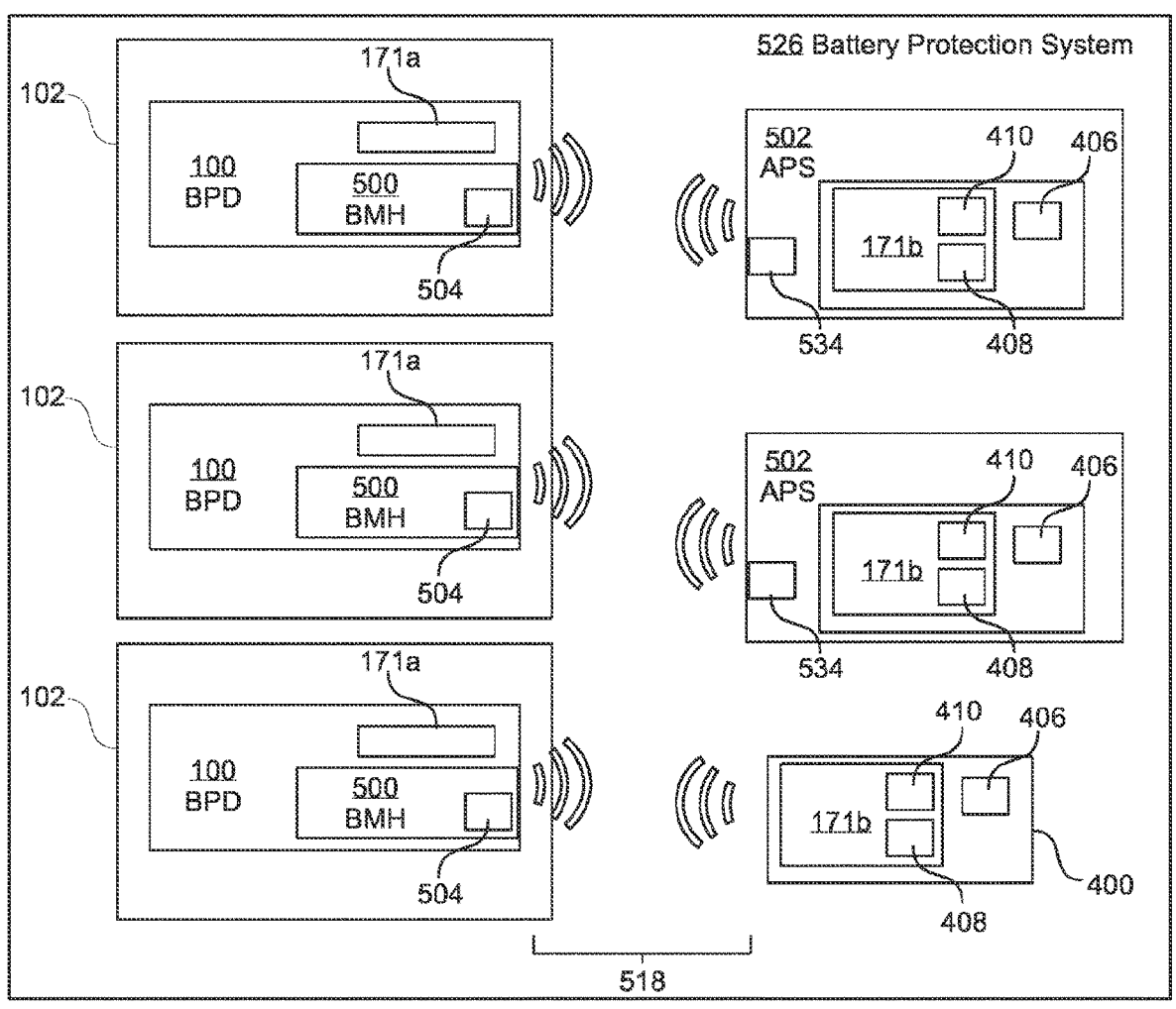
FIG. 53B is a diagrammatic view of a non-limiting configuration of a vehicle battery protection system with a plurality of vehicle battery protection devices, wherein a user interface includes one or more wireless remote controls configured to communicate with the plurality of vehicle battery protection devices to inform or interact with the user, at least one wireless remote control being integrated with an auxiliary power source.

Referring to FIG. 53B, particular implementations of a vehicle battery protection system 526 may comprise a plurality of vehicle battery protection devices 100. A user interface 170 may include a wireless remote control 171b configured to communicate with the plurality of vehicle battery protection devices 100 to inform or interact with the user. In such implementations, the user interface 170 may include a local or remote sensor 408 configured to receive a near field communication carrier frequency 414 to interact with and share data with the user. Additionally or in the alternative, the user interface 170 may include a local or remote sensor 408 configured to receive a near field communication carrier frequency 414 to allow the user to enable or disable the vehicle battery protection devices 100. Moreover, the local or remote sensor 408 may be configured to read a unique number 416 and save this number into memory 130, and at least one of the one or more processors 128 may be configured to treat the unique number as a key for interactive control of the vehicle battery protection devices 100 by a user. In preferred implementations, the vehicle battery protection system 526 unlocks a diverse feature set that may be extremely useful to fleet managers or businesses that manage a pool of vehicles. The ability to enable and disable, or interact with multiple BPDs 100 from a distance may be utilized by dealerships, colleges, or large corporations that have regular theft and maintenance concerns.

Referring to FIGS. 53A and 53B, certain implementations of a vehicle battery protection system are shown generally at 526. The system 526 may comprise at least one vehicle battery protection device 100 including an auxiliary power source connector 504 configured to receive electricity from an auxiliary power source 502 to condition and replenish the state of charge of the vehicle battery 104. The system 526 may also comprise at least one auxiliary power source 502.

Referring again to FIGS. 53A and 53B, particular implementations of the system 526, may comprise a multiplicity of auxiliary power sources 502. Each of that multiplicity of auxiliary power sources 502 may include a remote portion 171b of a user interface 170 and being configured to communicate wirelessly with each of the one or more vehicle battery protection devices 100 to inform or interact with the user by way of the remote portion 171b. In certain implementations, the vehicle battery protection system 526 may be utilized to expand the repair and diagnostic capabilities of a vehicle repair center. If a vehicle repair center had, for example, multiple APSs 502 with integrated remote user interfaces 171b, they may be able to automate the diagnostic analysis on vehicles with preauthorized BPDs 100 installed. In a fleet repair or maintenance shop, for example, this type of wireless diagnostic ability may significantly reduce manpower hours, logistical burdens, and cost.

Referring again to FIGS. 53A and 53B, certain implementations of the system 526 may comprise a plurality of vehicle battery protection devices 100. In such implementations, one of the at least one auxiliary power source 502 may have a remote portion 171*b* of a user interface 170 and may be configured to simultaneously wirelessly communicate with the plurality of battery protection devices 100 to inform or interact with the user by way of the remote portion 171*b*. The vehicle battery protection system 526 may be used to reduce the stress and burden of managing vehicle batteries 104 in multiple vehicles and possibly multiple types of vehicles. A BPD 100 may be installed in a variety of types of vehicles from motorhomes and classic cars to motorcycles and boats. All of these vehicles have their own unique maintenance requirements, but they all have vehicle batteries 104 that require attention and proactive maintenance. The vehicle battery protection system 526 is a novel solution that may be configured to support a variety of vehicles and through coordinated wired and wireless communication with multiple remote user interfaces 171*b* may potentially resolve the headache and proactive requirement of battery maintenance. A remote user interface 171*b* may, for example, alert a user that one of their vehicles may require recharging and use of an APS 502. A remote user interface 171*b* may also, for example, alert a user that one of their vehicles may have failed a diagnostic run by an installed BPD 100, and may require electrical repair by a trained technician.

The following listing matches certain terminology used within this disclosure with corresponding reference numbers used in the non-limiting examples illustrated in the several FIG.

100 vehicle battery protection device (i.e., BPD)
102 vehicle (e.g., car, truck, boat)
104 vehicle battery (e.g., lead-acid type)
106 vehicle electrical system
108 positive connector (of BPD)
110 negative connector (of BPD)
112 positive terminal (of vehicle battery)
114 negative terminal (of vehicle battery)
116 primary vehicle connector (of BPD)
118 secondary vehicle connector (e.g., of BPD)
119*a* vehicle terminal (of vehicle electrical system; e.g., positive)
119*b* vehicle terminal (of vehicle electrical system; e.g., negative)
120 ambient environment
121 main enclosure
122 first portion of main enclosure (e.g., electrically nonconductive)
123 contact support (e.g., part of first portion of main enclosure)
124 second portion of main enclosure (e.g., thermally-conductive heatsink base plate)
125 solid state device (e.g., MOSFET)
126 solid state switch (e.g., bank of solid state devices, e.g., MOSFETs)
127*a* first solid state device grouping (e.g., first MOSFET group)
127*b* second solid state device grouping (e.g., second MOSFET group)
128 processor (e.g., microcontroller unit or MCU)
130 memory
132 switch temperature sensor (e.g., mounted on power board 160 or wired to 160)
134 processor temperature sensor
136 battery voltage sensor
138 current sensor
140 environmental temperature sensor element (e.g., local or remote temp sensors)
142 ambient temperature sensor
144 DC/DC & signal conditioners
146 logic circuit board
148 circuit board spacer
149 safety comparator
150 first thermal chamber (e.g., filled with potting solution)
152 second thermal chamber (e.g., filled with potting solution)
153 wall alignment channel (e.g., disposed between adjacent thermal chambers)
154*a* thermal insulation member
154*b* thermal insulation member
154*c* thermal insulation member
156 thermal bank
158 Peltier device
160 power circuit board
162 first cable mounting block (e.g., first brass adapter)
164 second cable mounting block (e.g., second brass adapter)
165 set screw
166 wire (e.g., 16 gauge; this is either 108 or 110 depending upon the connection polarity of 116 to vehicle)
168 ribbon wire (e.g., 18-gauge)
170 user interface (e.g., with display screen, indicator LEDs, buttons, switches)
171*a* local portion of the user interface
171*b* remote portion of the user interface
172 on button
174 off button
176 device status indicator (e.g., LED)
178 device warning indicator (e.g., LED)
180 device error indicator (e.g., LED)
182 display screen
184 battery health indicator
186 battery status indicator
188 battery current load indicator
190 battery charging rate indicator
192 battery voltage indicator
194 device internal temperature indicator
196 vehicle alternator diagnostics indicator
198 vehicle wiring diagnostic indicator
200 programs (e.g., software modules)
202 decision-making group
204 hardware integration group
206 electrical management system
208 thermal safety algorithm
210 sensor management module
212 hardware control module
214 user interface module
216 data management module
218 collect sensor data process
220 emergency function (of thermal safety algorithm)
222 switch derating process (e.g., switch derating and safe operating area assessment function of thermal safety algorithm)
224 thermal analysis calibration (of thermal safety algorithm)
226 vehicle profile function (of thermal safety algorithm)
228 reconciliation function (of thermal safety algorithm)
230 process of comparing temperatures to emergency thresholds
232 process of taking immediate action if required (e.g., shutdown of solid state switch)

234 process of calculating switch derating 236 process of updating safety thresholds and setting flags 238 process of referencing thermal properties model dataset 240 process of calculating heat flux values (e.g., for each thermal isolation chamber)

242 process of verifying and updating thermal model error correction coefficients 244 vehicle profiling process (e.g., based on historic use of the vehicle employing the BPD)

246 vehicle-use model (resulting from vehicle profiling process)

248 currently-occurring and immediately previously-occurring state event types 250 process of predicting future vehicle states (with corresponding probabilities)

252 process of generating future thermal loads for high-probability future states 254 composite risk analysis 256 selecting a mitigation strategy 258 process of informing the user and taking action 260 time series database (e.g., including sensor data)

262 vehicle state event type statistics database 264 vehicle event pattern database 266 thermal model (e.g., includes thermal properties model dataset and variables for error correction coefficients)

267 thermal properties model dataset (e.g., constants-come from materials, etc.)

268 thermal loads prediction database 269 error correction coefficients

269' updated error correction coefficients 269a error correction coefficient-chamber-specific 269b error correction coefficient-material-specific 270 event pattern 270' present event pattern 271 event pattern dataset 271' present event pattern dataset 272 event type statistics dataset 274 vehicle state event type 274' present vehicle state event type 274" predicted next state event types (e.g., state event types with non-zero probability of occurring next)

274''' sequentially preceding vehicle state event types (i.e., two or more of the most recent preceding state event types)

276 most recent sensor data 278 maximum current threshold 280 number of occurrences (of a respective event pattern)

282 identification of vehicle state events based on time series data 284 event history dataset (e.g., vehicle state event log recorded in memory)

286 safe operating area database (includes a collection of multiple temperature-specific SOA datasets for a specific component)

288 safe operating area dataset (i.e., SOA dataset; per component/temperature)

288' selected safe operating area dataset 290 switch temperature 292 battery voltage 294 switch current 296 processor temperature 297 sequence of vehicle state events 298a communications pathway (processor to safety comparator)

298b communications pathway (safety comparator to processor)

300 vehicle state event

300' present vehicle state event 302 chamber thermal safety threshold 302a first chamber temperature safety threshold 304 thermal risk dataset (e.g., shown in graphical form)

306 composite risk dataset (e.g., shown in graphical form)

308 mitigation dataset selection chart 310 battery charge status 312 ambient temperature 314 state sensor parameters 316 example of enable active thermal standard dataset for chamber 1

318 example of enable active thermal proactive dataset for chamber 1

320a example of transition point for enabling full active thermal in standard dataset (@), 0% thermal trend)

320b example of transition point for enabling full active thermal in proactive dataset (@0% thermal trend)

322 heat flux values (e.g., calculated based on thermal model and temperature sensor data)

322' latest heat flux values (e.g., calculated based on updated thermal analysis and latest temperature sensor data)

322" preceding heat flux values (e.g., immediately prior to latest heat flux values)

324 heat flux differential 326 calculation of heat flux differential 328 state sensor parameter database 330 error correction coefficients anomaly log (logging of data anomalies)

332 calculate updated error correction coefficients 334 baseline thermal risk score 336 thermal risk prediction (e.g., value in %)

336' thermal risk prediction (for example state event type "H")

338 predicted thermal load

338' predicted thermal load (in chamber 1 for example state event type "H")

340 probability (of state occurring immediately following present event pattern)

340' probability (for example state event type "H" following present event pattern)

342 thermal trend prediction (e.g., value in %)

342' thermal trend prediction (for example state event type "H")

344 confidence level 346 composite risk score 347 composite thermal trend 348 implementation time interval 350 operating period (of the BPD)

350a first operating period 350b second operating period 352 baseline mitigation setting (e.g., also referred to herein as a "standard" setting)

354 proactive mitigation setting 400 housing of remote portion of the user interface 402 electrical connection (e.g., between local and remote portions of user interface)

404 wireless connection (e.g., between local and remote portions of user interface)

406 distributed sensor (e.g., a remote temperature sensor)

408 NFC sensor for user interfacing 410 buzzer, speaker or vibrating motor 412 user NFC device 414 NFC wireless communication

416 unique number

416' new unique number

418 process of user NFC device communicating unique number

420 process of preparing a processor to receive unique number as a key

422 process of microprocessor storing unique number to memory as a key

424 process of microprocessor comparing new unique number to stored keys

426 a stored key matches new unique key

428 user interaction accepted

430 user command sent to local portion of the user interface

432 no stored keys match new unique key

434 user interaction canceled

500 battery maintenance hardware (BMH)

502 auxiliary power source (APS) (e.g., battery charger, secondary battery, jump pack, portable battery, solar cell, usb connector, ac cord, etc)

504 auxiliary power source connector (APS connector)

506 maintenance safety circuit (e.g., a safety fuse, a fuse type circuit, reverse polarity protection, connection verification system, etc.)

508 safety fuse

510 battery maintenance switch

512 power converter

514 electrical connection (e.g., between local and remote portions of BMH and BPD)

516 electrical connection (e.g., between BPD and APS)

518 wireless communication (e.g., between BPD and APS)

520*a* data communication from MCU to APS Connector

520*b* data communication from APS Connector to MCU

522 converter input

524 converter output

526 battery protection system

528 maintenance processor (e.g., microcontroller unit or MCU)

530 maintenance memory

532 maintenance programs (e.g., software modules)

534 auxiliary power source output connector (APS output connector)

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle battery protection device electrically connectable between a vehicle battery and a vehicle electrical system for preserving the state of charge of the vehicle battery, the vehicle battery protection device comprising:

a positive connector configured to be placed in electrical communication with a positive terminal of the vehicle battery;

a negative connector configured to be placed in electrical communication with a negative terminal of the vehicle battery;

a primary vehicle connector configured to be placed in electrical communication with a vehicle terminal of the vehicle electrical system;

a solid state switch commandable between an on state and an off state, the on state allowing current to flow between the vehicle battery and the vehicle electrical system through the solid state switch, and the off state preventing current from flowing between the vehicle battery and the vehicle electrical system through the solid state switch;

a switch temperature sensor configured to measure switch temperature at the solid state switch;

a battery voltage sensor configured to measure battery voltage between the positive connector and the negative connector;

a current sensor configured to measure switch current defined by the current flowing through the solid state switch;

one or more processors; and a memory storing one or more programs configured to be executed by the one or more processors, the one or more programs including instructions for executing a thermal safety algorithm, the thermal safety algorithm comprising a switch derating process including the steps of:

selecting, from a plurality of distinct safe operating area datasets pertaining to the solid state switch, a safe operating area dataset corresponding to the switch temperature; and limiting the on state based on the selected safe operating area dataset, the battery voltage, and the switch current;

wherein the vehicle battery protection device further comprises a main enclosure having one or more thermal chambers defined therein, each thermal chamber being in thermal communication with a corresponding sensor configured to obtain chamber temperature data from the thermal chamber; and wherein the thermal safety algorithm further comprises a thermal analysis calibration including referencing a thermal model, the thermal model being defined at least in part by materials-based and geometry-based thermal properties of the vehicle battery protection device; and calculating, for each of the one or more thermal chambers, heat flux values based on the thermal model; and the chamber temperature data.

2. The vehicle battery protection device of claim 1, wherein a first said thermal chamber houses the solid state switch and the switch temperature sensor;

a second said thermal chamber houses at least one of the one or more processors and a processor temperature sensor;

the switch temperature sensor is the sensor configured to obtain the chamber temperature data from the first thermal chamber; and the processor temperature sensor is configured to measure processor temperature of at least one of the one or more processors; and the sensor configured to obtain the chamber temperature data from the second thermal chamber.

3. The vehicle battery protection device of claim 2, wherein the calculating of the heat flux values is further based on ambient temperature of an environment external to the main enclosure.

4. The vehicle battery protection device of claim 3, wherein the one or more processors are configured to derive the ambient temperature from the chamber temperature data obtained from the second thermal chamber.

5. The vehicle battery protection device of claim 3 further comprising an ambient temperature sensor for measuring the ambient temperature.

6. The vehicle battery protection device of claim 5, wherein the thermal analysis calibration further includes calculating, for each of the thermal chambers, a heat flux differential by comparing the heat flux values calculated during a first operating period to heat flux values calculated during a second operating period; and updating one or more error correction coefficients of the thermal model based on the heat flux differentials.

7. The vehicle battery protection device of claim 6, wherein the thermal analysis calibration further includes flagging the switch temperature sensor, the processor temperature sensor, or the ambient temperature sensor if the flagged temperature sensor produces data outside of a rated range for the flagged temperature sensor; or a computed operating range for the flagged temperature sensor, the computed operating range being dependent upon the concurrent temperature data of one or more non-flagged temperature sensors.

8. The vehicle battery protection device of claim 7, wherein the thermal analysis calibration further includes disabling the vehicle battery protection device if the switch temperature sensor is flagged;

disregarding measured processor temperature if the processor temperature sensor is flagged; and disregarding measured ambient temperature if the ambient temperature sensor is flagged.

9. The vehicle battery protection device of claim 6, wherein at least one thermal insulation member is disposed between the first thermal chamber and the second thermal chamber.

10. The vehicle battery protection device of claim 6, wherein the thermal safety algorithm further comprises a vehicle profiling process including:

generating a time series database, the time series database including sensor measurements from a plurality of sensors during an implementation time interval;

referencing state sensor parameters corresponding to a plurality of distinct vehicle state event types;

identifying vehicle state events by comparing the time series database to the state sensor parameters, each vehicle state event being defined by an occurrence of one of the vehicle state event types;

recording the vehicle state events in an event history dataset;

detecting, from the event history dataset, occurrences of event patterns, each event pattern being defined by a distinct combination of a fixed number of sequential vehicle state event types; and generating an event pattern database including, for each event pattern detected within the event history dataset, an event pattern dataset including number of occurrences of the event pattern; and relative probabilities for each of the vehicle state event types to occur immediately after the event pattern.

11. The vehicle battery protection device of claim 10, wherein the vehicle profiling process further includes establishing a confidence level for each event pattern, the confidence level being based on number of occurrences of the respective event pattern.

12. The vehicle battery protection device of claim 11, wherein the vehicle profiling process further includes generating an event type statistics database including, for each of the vehicle state event types occurring in the event history dataset, an event type statistics dataset comprising average duration of the vehicle state event type;

average switch current; and maximum switch current.

13. The vehicle battery protection device of claim 12, wherein the vehicle profiling process further includes determining a present event pattern, the present event pattern being defined by a combination of a present vehicle state event type and two or more sequentially preceding vehicle state event types, the sequentially preceding vehicle state event types being defined as a sequence of vehicle state event types which occurred immediately prior to the present vehicle state event type;

referencing the event pattern dataset corresponding to the present event pattern; and identifying predicted next state event types, the predicted next state event types being defined by state event types in the referenced event pattern dataset having a non-zero probability of occurring immediately after the present event pattern.

14. The vehicle battery protection device of claim 13, wherein the thermal safety algorithm comprises a thermal loads prediction process including referencing the event type statistics datasets corresponding to each of the predicted next state event types; and generating a thermal loads prediction database based on the referenced event type statistics datasets and the thermal model, the thermal loads prediction database including, for each of the thermal chambers, a predicted thermal load corresponding to each of the predicted next state event types.

15. The vehicle battery protection device of claim 14, wherein the thermal safety algorithm comprises a composite risk analysis including generating, for the first thermal chamber, a first baseline thermal risk score defined by a ratio of the switch temperature to a first chamber temperature safety threshold;

generating, for the first thermal chamber, a first thermal risk dataset comprising for each of the predicted next state event types, (i) a thermal risk prediction defined by a ratio of the sum of the switch temperature and the predicted thermal load to the first chamber temperature safety threshold;

(ii) the probability of the state event type occurring immediately after the present event pattern; and (iii) a thermal trend prediction defined by the difference between the thermal risk prediction and the first baseline thermal risk score;

setting, for the first thermal chamber, a first composite risk score based on (i) the first thermal risk dataset; and (ii) the confidence level corresponding to the present event pattern; and generating, for the first thermal chamber, a first composite thermal trend defined by the difference between the first composite risk score and the first baseline thermal risk score.

16. The vehicle battery protection device of claim 15, wherein the composite risk analysis further includes

39 generating, for the second thermal chamber, a second baseline thermal risk score defined by a ratio of the processor temperature to a second chamber temperature safety threshold;

generating, for the second thermal chamber, a second thermal risk dataset comprising for each of the predicted next state event types, (i) a thermal risk prediction defined by a ratio of the sum of the processor temperature and the predicted thermal load to second chamber temperature safety threshold;

(ii) the probability of the state event type occurring immediately after the present event pattern; and (iii) a thermal trend prediction defined by the difference between the thermal risk prediction and the second baseline thermal risk score;

setting, for the second thermal chamber, a second composite risk score based on (i) the second thermal risk dataset; and (ii) the confidence level corresponding to the present event pattern; and generating, for the second thermal chamber, a second composite thermal trend defined by the difference between the second composite risk score and the second baseline thermal risk score.

17. The vehicle battery protection device of claim 16, wherein confidence levels for the event patterns are divisible into at least a level one, a level two, a level three and a level four, the level one being the lowest confidence level and the level four being the highest confidence level; and in setting the first composite risk score, if the confidence level of the present event pattern is a level one, the first composite risk score is equivalent to the highest thermal risk prediction of all of the predicted next state event types in the first thermal risk dataset;

if the confidence level of the present event pattern is a level two, the first composite risk score is the average of the two highest thermal risk predictions of all of the predicted next state event types in the first thermal risk dataset;

if the confidence level of the present event pattern is a level three, the first composite risk score is the average of the two thermal risk predictions of the predicted next state event types having the two highest probabilities of occurring immediately after the present event pattern in the first thermal risk dataset; and if the confidence level of the present event pattern is a level four, the first composite risk score is equivalent to the thermal risk prediction of the predicted next state event type having the highest probability of occurring immediately after the present event pattern in the first thermal risk dataset.

18. The vehicle battery protection device of claim 17, wherein in setting the second composite risk score, if the confidence level of the present event pattern is a level one, the second composite risk score is equivalent to the highest thermal risk prediction of all of the predicted next state event types in the second thermal risk dataset;

if the confidence level of the present event pattern is a level two, the second composite risk score is the average of the two highest thermal risk predictions of all of the predicted next state event types in the second thermal risk dataset;

if the confidence level of the present event pattern is a level three, the second composite risk score is the average of the two thermal risk predictions of the predicted next state event types having the two highest probabilities of occurring immediately after the present event pattern in the second thermal risk dataset; and if the confidence level of the present event pattern is a level four, the second composite risk score is equivalent to the thermal risk prediction of the predicted next state event type having the highest probability of occurring immediately after the present event pattern in the second thermal risk dataset.

19. The vehicle battery protection device of claim 16 further comprising one or more activatable thermal devices, wherein the thermal safety algorithm comprises limiting activation of at least one of the one or more activatable thermal devices in the first thermal chamber based on the first chamber composite risk score and the first chamber composite thermal trend.

20. The vehicle battery protection device of claim 19, wherein the thermal safety algorithm comprises selecting a mitigation strategy including selecting between a baseline mitigation setting and a proactive mitigation setting based upon the state of charge of the vehicle battery and present measured ambient temperature;

applying a baseline set of thermal activation thresholds to the activation limiting when the baseline mitigation setting is selected; and applying a proactive set of thermal activation thresholds to the activation limiting when the proactive mitigation setting is selected.

21. The vehicle battery protection device of claim 19, wherein the one or more activatable thermal devices are selected from the group consisting of a Peltier module, a cooling fan, a microelectromechanical-system cooler, and a resistive heater.

22. The vehicle battery protection device of claim 16, wherein the thermal safety algorithm comprises allowing or preventing a deep sleep state in at least one of the one or more processors based on (a) the first chamber composite risk score and the first chamber composite thermal trend; or (b) the second chamber composite risk score and the second chamber composite thermal trend.

23. The vehicle battery protection device of claim 16, wherein the thermal safety algorithm comprises enabling or disabling the solid state switch based on (a) the first chamber composite risk score and the first chamber composite thermal trend; or (b) the second chamber composite risk score and the second chamber composite thermal trend.

24. The vehicle battery protection device of claim 16 further comprising a user interface.

25. The vehicle battery protection device of claim 24, wherein the thermal safety algorithm comprises displaying one or more thermal warning indications on the user interface based on (a) the first chamber composite risk score and the first chamber composite thermal trend; or (b) the second chamber composite risk score and the second chamber composite thermal trend.

26. The vehicle battery protection device of claim 25, wherein at least one of the one or more thermal warning indications are selected from the group consisting of hot, warm and cold.

27. The vehicle battery protection device of claim 24, wherein the user interface includes a display screen or illuminable indicators.

28. The vehicle battery protection device of claim 24, wherein the user interface includes a buzzer, a speaker or a vibration motor.

29. The vehicle battery protection device of claim 24, wherein the user interface includes a user-activatable touch-sensitive device or a button.

30. The vehicle battery protection device of claim 24, wherein the user interface includes a wired or wireless remote control to inform or interact with the user.

31. The vehicle battery protection device of claim 24, wherein the user interface includes a local or remote sensor configured to receive a near field communication carrier frequency to interact and share data with the user.

32. The vehicle battery protection device of claim 24, wherein the user interface includes a local or remote sensor configured to receive a near field communication carrier frequency to allow the user to enable or disable the vehicle battery protection device.

33. The vehicle battery protection device of claim 32, wherein the local or remote sensor can read a unique number and save this number into memory; and at least one of the one or more processors is configured to treat the unique number as a key for interactive control of the vehicle battery protection device by a user.

34. The vehicle battery protection device of claim 10, wherein the implementation time interval is defined as being within the time the vehicle battery protection device is electrically connected between the vehicle battery and the vehicle electrical system.

* * * * *